United States Patent
Jitaru et al.

(10) Patent No.: US 12,462,973 B2
(45) Date of Patent: Nov. 4, 2025

(54) MAGNETIC STRUCTURES FOR LOW LEAKAGE INDUCTANCE AND VERY HIGH EFFICIENCY

(71) Applicant: Rompower Technology Holdings, LLC, Milford, DE (US)

(72) Inventors: Ionel Jitaru, Tucson, AZ (US); Andrei Stefan Savu, Buchare (RO)

(73) Assignee: Rompower Technology Holdings, LLC, Milford, DE (US)

( * ) Notice: Subject to any disclaimer, the term of this patent is extended or adjusted under 35 U.S.C. 154(b) by 0 days.

(21) Appl. No.: 19/227,373

(22) Filed: Jun. 3, 2025

(65) Prior Publication Data

US 2025/0292958 A1    Sep. 18, 2025

Related U.S. Application Data

(63) Continuation-in-part of application No. 18/368,513, filed on Sep. 14, 2023, now Pat. No. 12,322,541, which is a continuation of application No. 17/845,609, filed on Jun. 21, 2022, now Pat. No. 11,763,984, which is a continuation of application No. 17/189,096, filed on Mar. 1, 2021, now Pat. No. 11,367,565, which is a continuation-in-part of application No. 16/368,186, filed on Mar. 28, 2019, now Pat. No. 10,937,590, which is a continuation of application No. 14/660,901, filed on Mar. 17, 2015, now abandoned.

(60) Provisional application No. 63/133,076, filed on Dec. 31, 2020, provisional application No. 61/955,640, filed on Mar. 19, 2014.

(51) Int. Cl.
*H01F 27/28* (2006.01)
*H01F 27/245* (2006.01)
*H01F 30/06* (2006.01)

(52) U.S. Cl.
CPC ........... *H01F 30/06* (2013.01); *H01F 27/245* (2013.01)

(58) Field of Classification Search
CPC ...... H01F 27/40; H01F 27/2804; H01F 27/29; H01F 2027/408; G11C 11/06
USPC ...................................................... 336/105
See application file for complete search history.

(56) References Cited

U.S. PATENT DOCUMENTS

2005/0006364 A1 * 1/2005 Blankenship .......... B23K 9/091
219/130.1
2006/0187684 A1 * 8/2006 Chandrasekaran . H02M 3/3376
363/21.01

* cited by examiner

*Primary Examiner* — Shawki S Ismail
*Assistant Examiner* — Kazi S Hossain
(74) *Attorney, Agent, or Firm* — Thomas W. Galvani, P.C.; Thomas W. Galvani

(57) ABSTRACT

A power converter formed by a multitude of power cells, wherein each of the power cells is implemented on a four-legged magnetic core placed on a multilayer PCB. Each cell contains rectifier means and resonant capacitors. The cells can be interleaved with the proper delay for reduction of a ripple current through output capacitors. The power cells can be interleaved for the purpose of splitting a high input voltage bus to reduce the voltage stress on the switching elements of the cells.

14 Claims, 54 Drawing Sheets

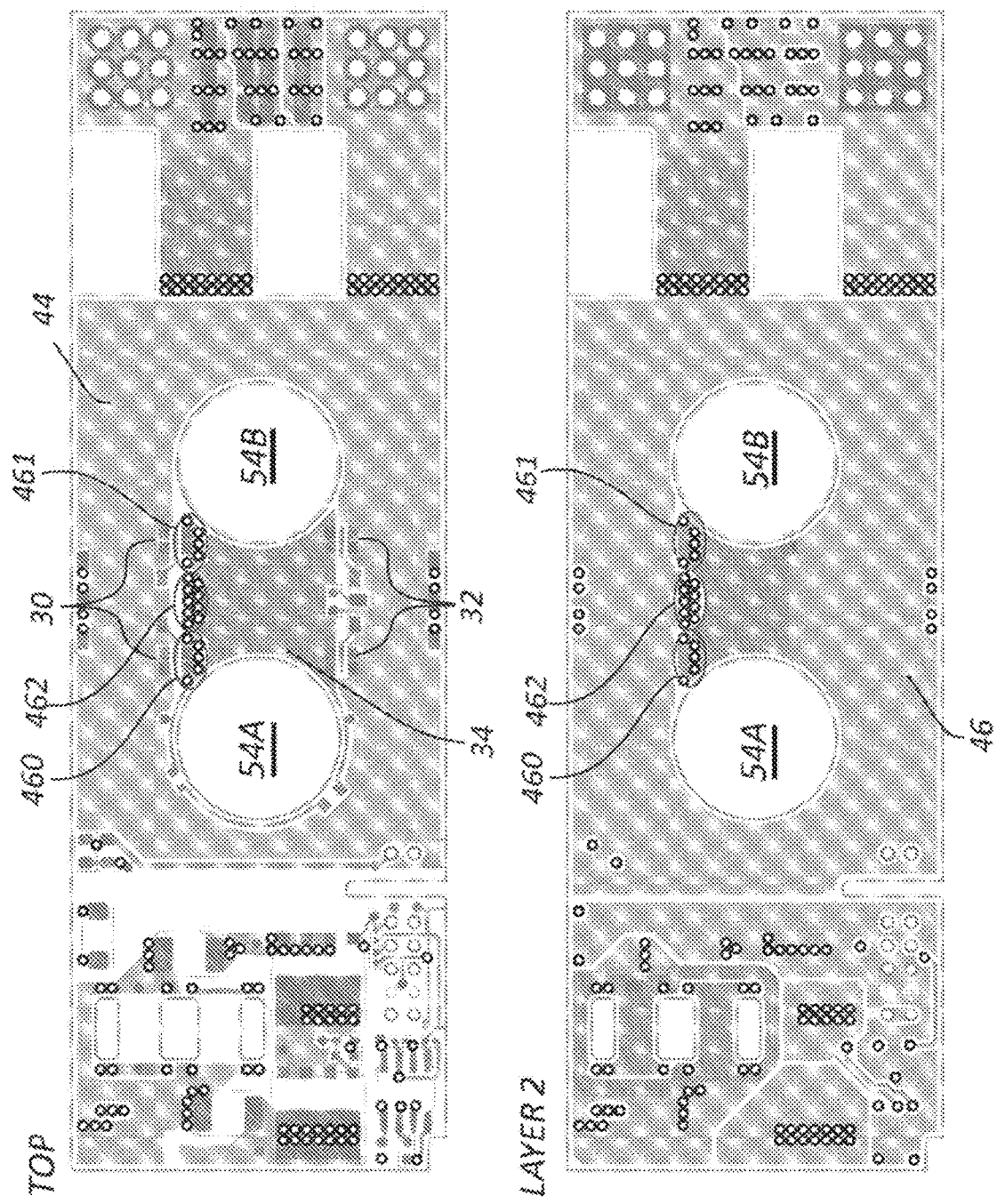

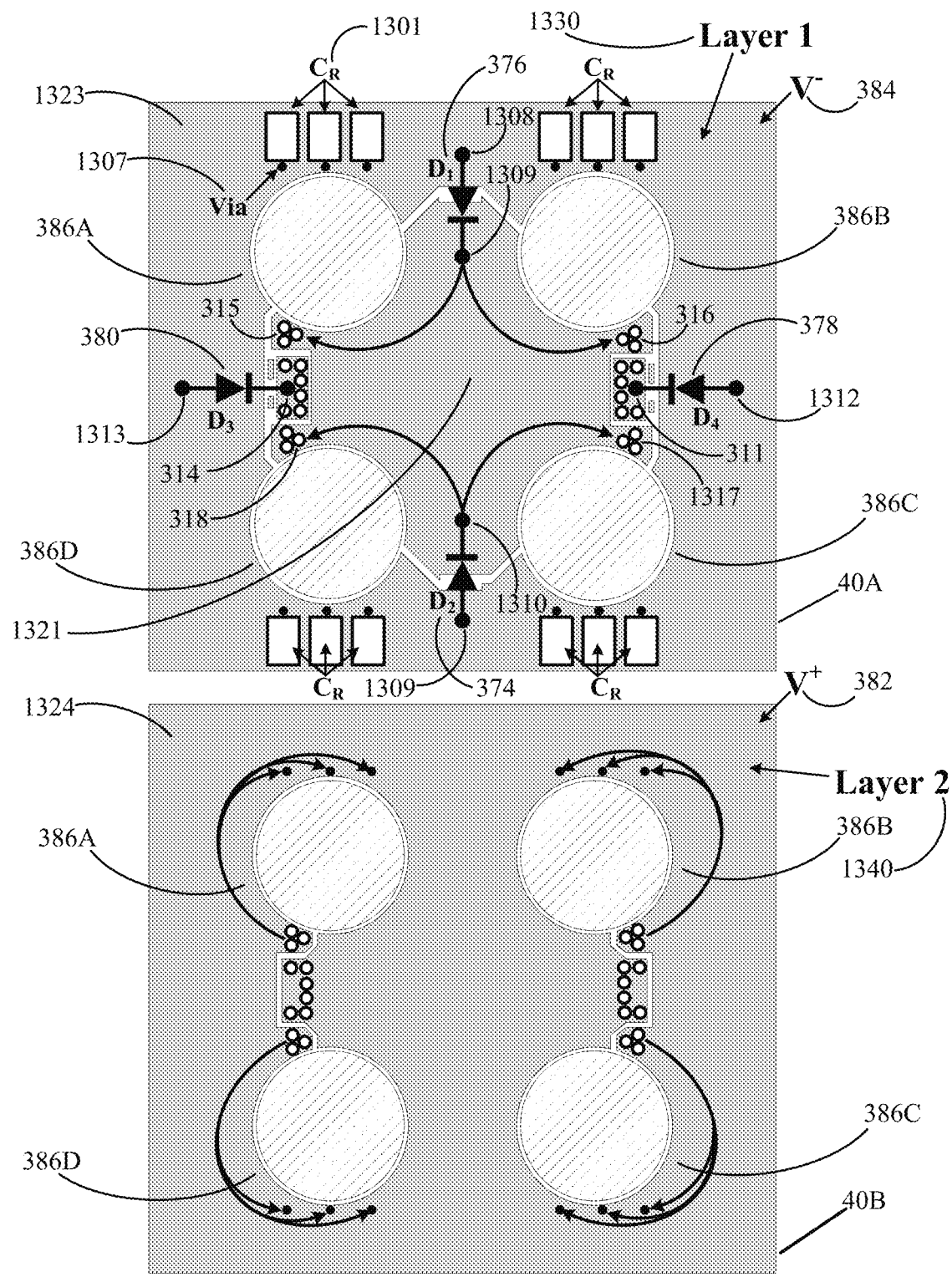
Fig. 33C    Phase A

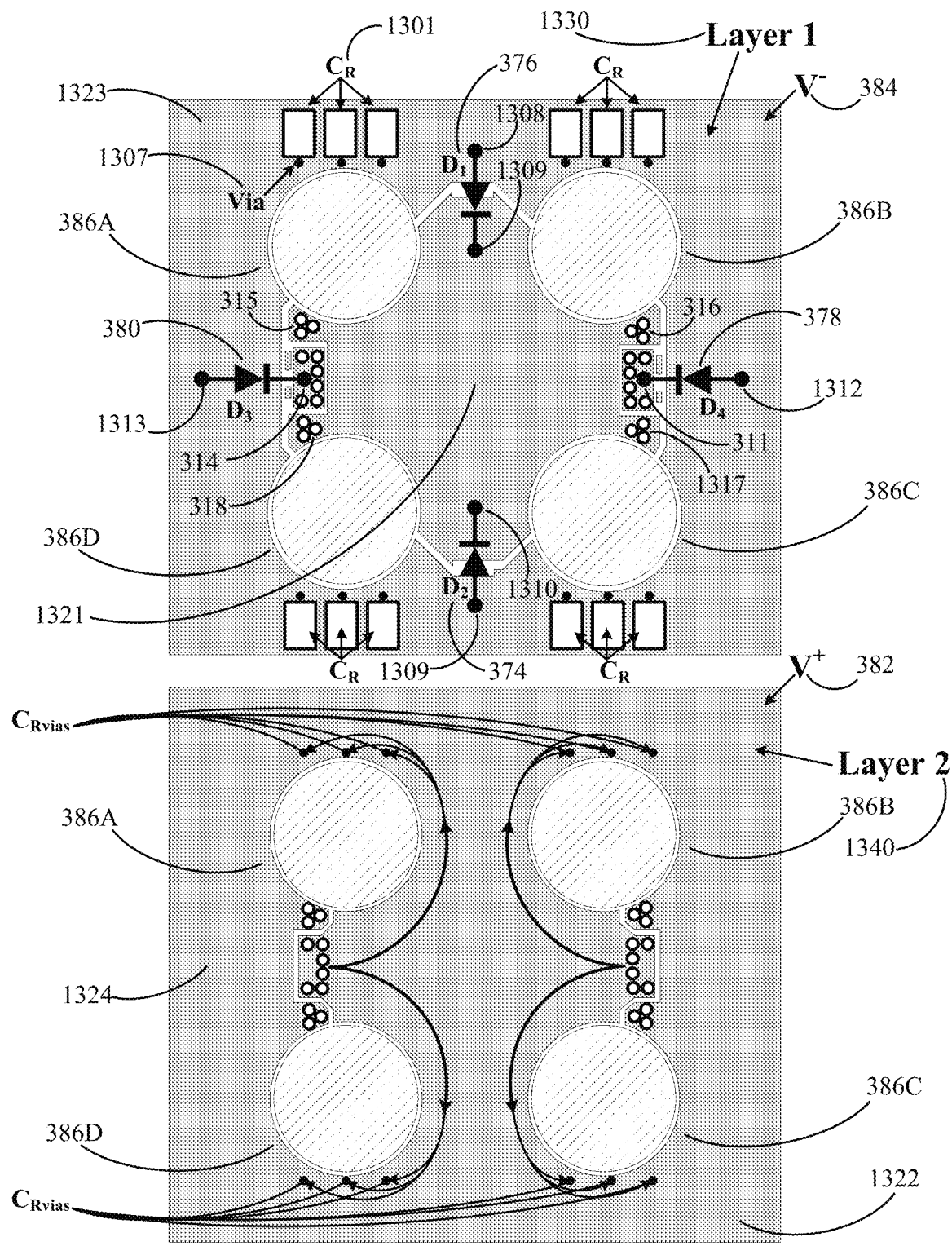
Fig. 33D    Phase B

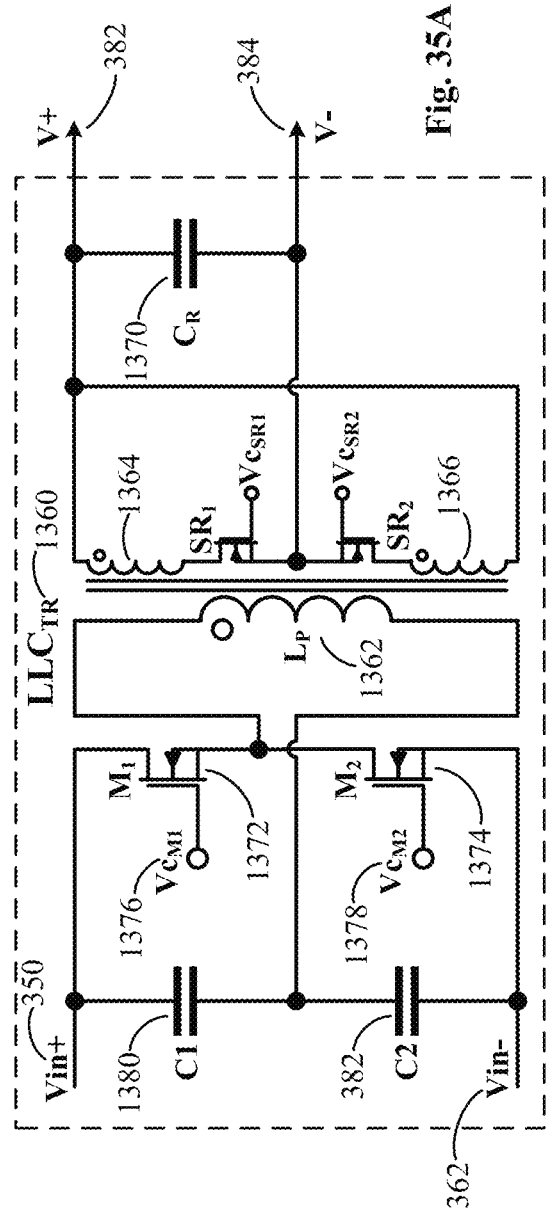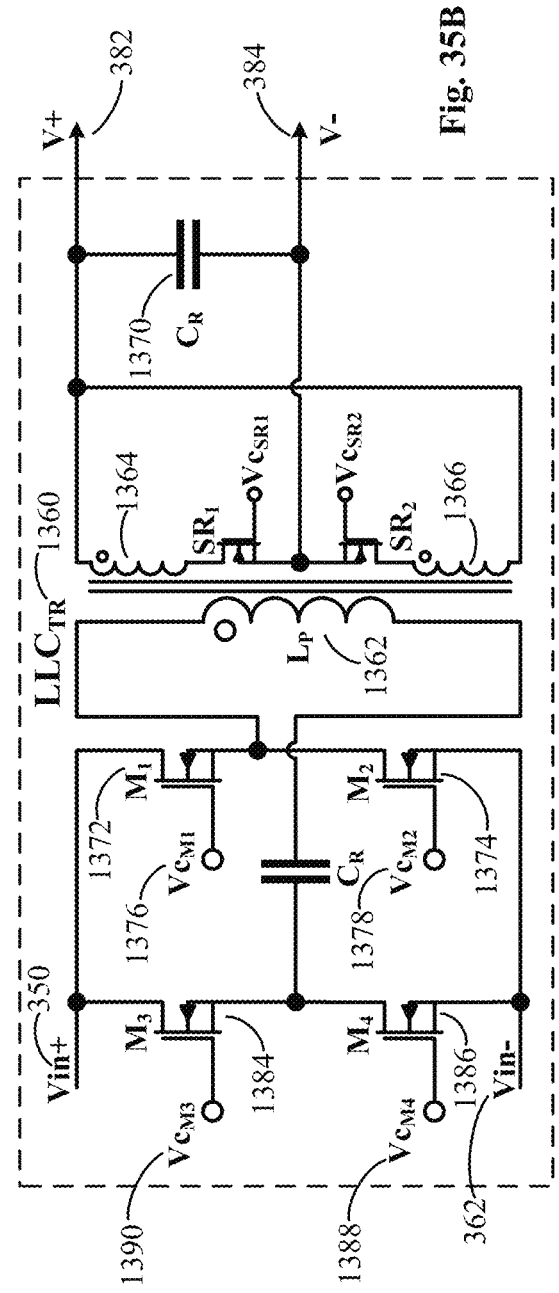
Fig. 35A
Fig. 35B

MAGNETIC STRUCTURES FOR LOW LEAKAGE INDUCTANCE AND VERY HIGH EFFICIENCY

CROSS-REFERENCE TO RELATED APPLICATIONS

This application is a continuation-in-part of and claims the benefit of prior U.S. patent application Ser. No. 18/368,513, filed Sep. 14, 2023, which is a continuation of and claims the benefit of prior U.S. patent application Ser. No. 17/845,609, filed Mar. 21, 2022, which is a continuation of and claims the benefit of prior U.S. patent application Ser. No. 17/189,096, filed Mar. 1, 2021, which is a continuation-in-part of and claims the benefit of prior U.S. patent application Ser. No. 16/368,186, filed Mar. 28, 2019, which is a continuation of and claims the benefit of prior U.S. patent application Ser. No. 14/660,901, filed Mar. 17, 2015, which claims the benefit of U.S. Provisional Application No. 61/955,640, filed Mar. 19, 2014, all of which are hereby incorporated by reference in their entireties. Prior U.S. patent application Ser. No. 17/189,096 also claims the benefit of U.S. Provisional Application No. 63/133,076, filed Dec. 31, 2020, which is hereby incorporated by reference in its entirety.

FIELD

The present invention relates generally to electronic devices, and more particularly to magnetic structures in power converters.

BACKGROUND

There is an industry demand for smaller size and lower profile power converters, which require smaller and lower profile magnetic elements such as transformers and inductors. For better consistency in production for magnetic elements, the windings are often embedded into multilayer PCB structures. In such applications, copper thickness is limited. To be able to use thinner copper and limited numbers of layers for higher current applications, there are several solutions. One solution is to split the current and process each section of it before the output. The progress in semiconductor industry wherein the footprint of some power devices became very small and the on resistance very small has also shifted the direction in the magnetic technology. The semiconductor devices are capable to process very high currents in a small footprint due to a significant reduction of the on resistance. This requires magnetic structures capable of handling very high current in a very small footprint. To reduce the power dissipation in the copper, especially in the multilayer construction in which very thin copper is used, the length of the magnetic winding is often reduced. FIG. 1 shows two prior art methods of splitting the current. One is described in U.S. Pat. No. 4,665,357, in which there are multiple independent transformers with the primary in series, referred also as a Matrix transformer. Another methodology is described in U.S. Pat. No. 7,295,094.

SUMMARY

In an embodiment, a magnetic and electrical circuit element including magnetic-flux-conducting posts, and a multi-layer structure formed with an electrically-conductive material. The multi-layer structure includes multiple layers forming a stack of layers along a length of the posts, said multi-layer structure configured as primary and secondary windings of a transformer. The primary winding is embedded in the multi-layer structure and wound around the magnetic-flux-conducting posts in such a way that a magnetic field induced in each of the magnetic-flux-conducting posts has a magnetic field polarity opposite to a polarity of the respective magnetic field of the magnetic-flux-conducting post adjacent the respective magnetic-flux-conducting post. Around each of the magnetic-flux-conducting posts, there is a respective one of the secondary windings connected to a semiconductor device. The magnetic-flux-conducting posts are connected magnetically together by continuous magnetic-flux-conducting plates, each of which is shaped to ensure a continuous flow of the magnetic field successively through adjacent magnetic-flux-conducting posts.

In some embodiments, a current flowing through the secondary windings cancels the magnetic field induced in the magnetic-flux-conducting posts by a current flowing through the primary winding.

In some embodiments, the primary winding is connected to a semiconductor device.

In some embodiments, a continuous ring, made of a conductive material, encircles from outside all of the magnetic-flux-conducting posts. The current flows through the semiconductor devices to the continuous ring, and each semiconductor device is connected to copper pads placed between adjacent magnetic-flux-conducting posts, wherein the current flowing through the semiconductor devices encircles each of the magnetic-flux-conducting posts.

In some embodiments, a ring, made of conductive material, encircles all of the magnetic-flux-conducting posts. The current flows through the semiconductor devices to the continuous ring, and each semiconductor device is connected to copper pads placed between two adjacent magnetic-flux-conducting posts, wherein the current flowing through the semiconductor devices encircles both of the adjacent magnetic-flux-conducting posts.

In some embodiments, the copper pads are contained in at least two layers of the multi-layer structure, and the current flows through the copper pads.

In some embodiments, the current flows through electrically conductive pads freely to form an optimum path to cancel the magnetic field induced in the magnetic-flux-conducting posts by the current flowing through the primary winding.

In some embodiments, a current injection winding is wound around each of the magnetic-flux-conducting posts on the optimum path of the current flowing through the semiconductor devices.

In an embodiment, a magnetic circuit element includes at least two identical magnetic-flux-conducting posts, and a multi-layer structure formed with an electrically-conductive material. The multi-layer structure includes multiple layers forming a stack of layers along a length of the posts, said multi-layer structure configured as windings of an inductor. The windings of the inductor are wound around the magnetic-flux-conducting posts in such a way that a magnetic field induced in each of the magnetic-flux-conducting posts has a magnetic field polarity opposite to a polarity of the respective magnetic field of the magnetic-flux-conducting post adjacent the respective magnetic-flux-conducting post. The magnetic-flux-conducting posts are connected magnetically together by two continuous magnetic-flux-conducting plates, each shaped to ensure a continuous flow of the magnetic field successively through adjacent magnetic-flux-conducting posts.

In some embodiments, around each of the magnetic-flux-conducting posts, there is an auxiliary winding connected to the respective semiconductor device.

In some embodiments, the auxiliary winding is a current injection winding.

In an embodiment, a magnetic and electrical circuit element includes at least two identical inner posts placed in a line, and at least two outer posts placed in the line outside of the inner posts, flanking the inner posts in the line. The inner and outer posts each have a cross-section, wherein the cross-section of the outer posts ranges from half of to equal to the cross-section of the inner posts. A multi-layer structure is formed with an electrically-conductive material; the multi-layer structure includes multiple layers forming a stack of layers along a length of the posts, and the multi-layer structure is configured as primary and secondary windings of a transformer. The primary winding is embedded in the multi-layer structure and wound around the inner posts in such a way that the magnetic field induced in each of the inner posts has a magnetic field polarity opposite to a polarity of the respective magnetic field of the post adjacent the respective inner post. Around each of the inner posts, there is a secondary winding connected to a semiconductor device. The inner and outer posts are connected magnetically together by two continuous magnetic-flux-conducting plates, each shaped to ensure a continuous flow of the magnetic field successively through adjacent inner and outer posts. A current flowing through the secondary windings cancels the magnetic field induced in the inner posts by the current flowing through the primary winding.

In some embodiments, the primary winding is connected to a semiconductor device.

In some embodiments, the secondary windings are wound around at least a pair of the inner posts in opposite directions and are in parallel.

In some embodiments, the primary winding is wound around at least a pair of the inner posts in opposite directions and is in parallel.

In some embodiments, the secondary windings are wound around at least a pair of the inner posts in opposite directions and are in parallel.

In an embodiment, a magnetic circuit element includes at least two identical inner posts placed in a line, and at least two outer posts placed in the line outside of the inner posts, flanking the inner posts in the line. The inner and outer posts each have a cross-section, wherein the cross-section of the outer posts ranges from half of to equal to the cross-section of the inner posts. A multi-layer structure is formed with an electrically-conductive material. The multi-layer structure includes multiple layers forming a stack of layers along a length of the posts, said multi-layer structure configured as windings of an inductive element. The inductive element winding is embedded in the multi-layer structure and wound around the inner posts in such a way that the magnetic field induced in each of the inner posts has a magnetic field polarity opposite to a polarity of the respective magnetic field of the post adjacent the respective inner post.

The inner and outer posts are connected magnetically together by two continuous magnetic-flux-conducting plates, each shaped to ensure a continuous flow of the magnetic field successively through adjacent inner and outer posts.

In some embodiments, around each of the posts, there is a current injection winding connected to a semiconductor device.

In an embodiment, a power cell is disclosed that includes a differential input and a differential output. The power cell operates at a frequency with a period T, where the period T is the inverse of the frequency. The power cell includes a magnetic element formed by four identical magnetic flux conductive posts arranged equidistantly between two continuous magnetic flux conductive plates, with each plate shaped to ensure continuous magnetic field flow through adjacent posts. A multilayer structure formed of electrically conductive material includes multiple layers stacked along the length of the posts and configured as primary and secondary windings of a transformer. The primary winding is embedded in the multilayer structure and is wound around the magnetic flux conductive posts so that the magnetic field induced in each post has a polarity opposite to the magnetic field polarity of the adjacent post. At least two layers of the multilayer structure form the secondary winding and are referred to as secondary layers. Semiconductor devices are positioned on at least one of the secondary layers and are located radially between the magnetic flux conductive posts. Resonant capacitors are electrically connected to the secondary windings and the semiconductor devices. Each of the secondary layers includes a continuous conductive ring made of conductive material that encircles all the magnetic flux conductive posts from the outside. Copper pads are placed between adjacent magnetic flux conductive posts and are connected to the semiconductor devices. During operation, a current flows through the semiconductor devices, resonant capacitors, continuous conductive ring, and copper pads, and this current encircles each magnetic flux conductive post with a portion of the conduction path passing through the continuous conductive rings.

In embodiments of the power cell, the resonant capacitors are placed uniformly on the conductive rings that encircle the magnetic flux conductive posts, and the difference in radius for each resonant capacitor does not vary by more than thirty percent.

In an embodiment, a power converter is described that includes at least two power cells, each power cell including the differential input and output, the magnetic element with equidistant posts and conductive plates, the multilayer winding structure, the embedded primary winding with opposing polarity, secondary layers, radially positioned semiconductor devices, resonant capacitors, continuous conductive rings, and copper pads, and is configured such that current flows through the listed components and encircles the magnetic flux conductive posts.

In embodiments, the power converter includes an input voltage and an output voltage, with the differential inputs and differential outputs of the power cells connected together so that the power is processed in parallel. In another configuration, the input voltage and output voltage are present, with the differential inputs connected together and the differential outputs connected in series such that the total output voltage equals the sum of the output voltages of the power cells. Another configuration includes series-connected differential inputs and parallel-connected differential outputs for processing power in parallel. Yet another configuration includes both the differential inputs and outputs connected in series, resulting in a total output voltage equal to the sum of the individual cell output voltages.

In embodiments, the power converter can also include an input voltage and output voltage and two totem pole input capacitors placed across the input voltage, where the first and second power cells are connected with their differential inputs across the input capacitors and their differential outputs in parallel so that the output voltage equals the output voltage of each power cell. In this configuration, the second power cell is operated with a delay of T divided by four relative to the first power cell, which minimizes the RMS current through the resonant capacitors of the power cells.

In embodiments, the differential outputs of the first and second power cells are connected in series rather than in parallel, and the output voltage equals the sum of the output voltages of the two cells. The second power cell in this case is also delayed by T divided by four relative to the first cell, minimizing the RMS current through the resonant capacitors.

In embodiments, the power converter includes a chain of totem pole input capacitors across the input voltage and a chain of power cells with their differential inputs connected across the capacitors and their differential outputs connected in parallel, where the converter's output voltage equals the output voltage of each power cell. In this case, each power cell in the chain is delayed by a fractional period T relative to the preceding power cell in the chain so that the RMS current through the resonant capacitors of the chain is minimized.

In embodiments, each power cell is operated with a delay of a fractional period T relative to the immediately preceding cell to minimize the RMS current through the resonant capacitors of the chain.

In an embodiment, a power cell includes a differential input and a differential output. The power cell includes a frequency of operation and a period T, wherein the period is the reverse of the frequency. The power cell includes a magnetic element formed by four identical magnetic flux conductive posts placed equidistant between two continuous magnetic flux conductive plates, each plate shaped to ensure a continuous flow of magnetic field through adjacent magnetic flux conductive posts. The power cell includes a multilayer structure formed with an electrically conductive material, the multilayer structure including multiple layers forming a stack along the length of the posts and the multilayer structure configured as primary and secondary windings of a transformer. The primary winding is embedded in the multilayer structure and wound around the magnetic flux conductive posts in such a way that a magnetic field induced in each of the magnetic flux conductive posts has a magnetic field polarity opposite to a polarity of the respective magnetic field of the magnetic flux conductive post adjacent the respective magnetic flux conductive post. The power cell includes at least two layers of the multilayer structure forming the secondary winding referred to as secondary layers. On at least one of the secondary layers are placed semiconductor devices placed on the radius in between the magnetic flux conductive posts. The power cell includes resonant capacitors, wherein the resonant capacitors are electrically connected to the secondary windings and the semiconductor devices. On each of the secondary layers there is a continuous conductive ring made of conductive material which encircles from outside all the magnetic flux conductive posts. Copper pads are placed between adjacent magnetic flux conductive posts and connected to the semiconductor devices. The current flowing through the semiconductor devices and through the resonant capacitors and through the continuous conductive ring and through the copper pads encircles each of the magnetic flux conductive posts wherein a part of the conduction path is through the continuous conductive rings.

In embodiments, the resonant capacitors are placed uniformly on the conductive rings encircling from outside the magnetic flux conductive posts wherein the difference of the radius for each capacitor does not vary more than 30 percent.

In an embodiment, a power converter has an input voltage and an output voltage and has at least two power cells wherein the differential inputs and differential outputs are connected together wherein the power is processed by two power cells in parallel.

In embodiments, a power converter has an input voltage and an output voltage and has at least two power cells wherein the differential inputs are connected together while the differential outputs are connected in series wherein the total output voltage of the converter is the summation of the output voltage of the two cells.

In embodiments, a power converter has an input voltage and an output voltage and has at least two power cells wherein the differential inputs are connected in series and differential outputs are connected together wherein the power is processed by two power cells in parallel.

In embodiments, a power converter has an input voltage and an output voltage and has at least two power cells wherein the differential inputs are connected in series and differential outputs are connected in series wherein the total output voltage of the converter is the summation of the output voltage of the two cells.

In embodiments, a power converter has an input voltage and an output voltage and two totem pole input capacitors are placed across the input voltage and two power cells, a first power cell and a second power cell, are placed with the differential inputs across each input capacitor and the differential output in parallel wherein the output voltage of the power converter is the same as the output voltage across each differential output of the power cells.

In embodiments, a power converter includes a second power cell wherein the period T of the second power cell is delayed by T divided by four in relation to the period of the first cell in such a way that the RMS current through the resonant capacitors of the power cells is minimized.

In embodiments, a power converter has an input voltage and an output voltage and two totem pole input capacitors are placed across the input voltage and two power cells, a first power cell and a second power cell, are placed with the differential inputs across each input capacitor and the differential output in series wherein the output voltage of the power converter is the summation of the output voltage of the power cells.

In embodiments, a power converter includes a second power cell wherein the period T of the second power cell is delayed by T divided by four in relation to the period of the first cell in such a way that the RMS current through the resonant capacitors of the power cells is minimized.

In embodiments, a power converter has an input voltage and an output voltage and has a chain of totem pole input capacitors placed across the input voltage and a chain of power cells placed with the differential inputs across each input capacitor and the differential output in parallel wherein the output voltage of the power converter is the same as the output voltage across each differential output of the power cells.

In embodiments, a power converter includes a chain of power cells having the period T wherein each power cell is delayed by a fraction of T in relation to the power cell ahead of it in the chain in such a way that the RMS current through the resonant capacitors of the power cells is minimized.

BRIEF DESCRIPTION OF THE DRAWINGS

Referring to the drawings:

FIGS. 6A through 6D show metal etch layers having winding in the transformer using the U core implementation described in FIGS. 3A and 3B;

FIG. 33C depicts a multilayer implementation of the double ended resonant power train in a four-legged magnetic configuration with secondary winding implemented in two layers, with current flow in phase A;

FIG. 33D depicts a multilayer implementation of the double ended resonant power train in a four-legged magnetic configuration with secondary winding implemented in two layers, with current flow in phase B;

FIG. 35A depicts a half bridge LLC topology.

FIG. 35B depicts a full bridge LLC topology;

DETAILED DESCRIPTION

Embodiments of FIGS. 1-17

Figure 1:
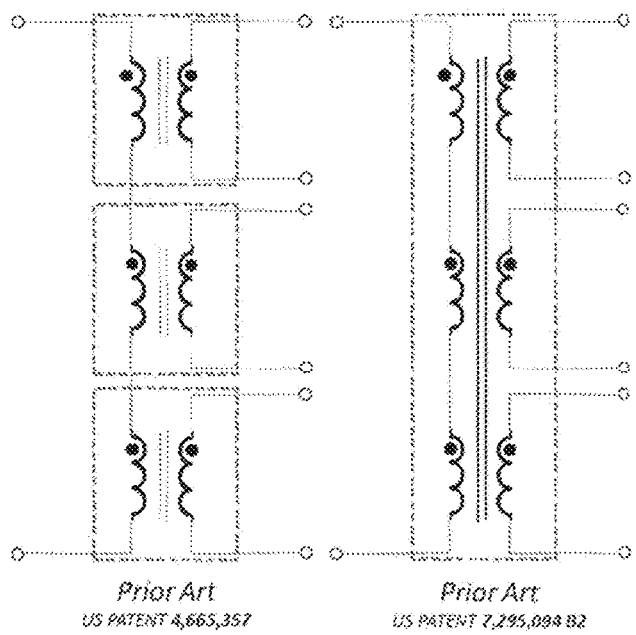
FIG. 1 shows prior art distributed magnetic structures using a multitude of the magnetic elements wherein the primaries are placed in series.
Figure 2:
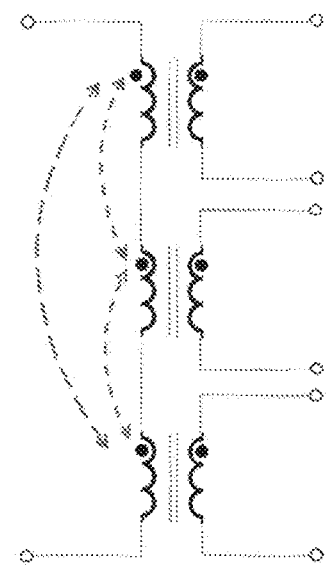
FIG. 2 shows an equivalent schematic of a preferred embodiment wherein the magnetic elements are coupled.
Figure 3A:
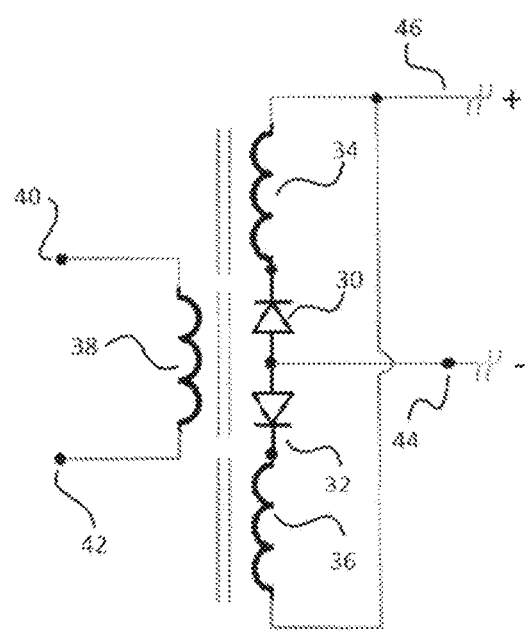
FIG. 3A depicts a transformer, employing a center tap including the rectifiers.
Figure 3B:
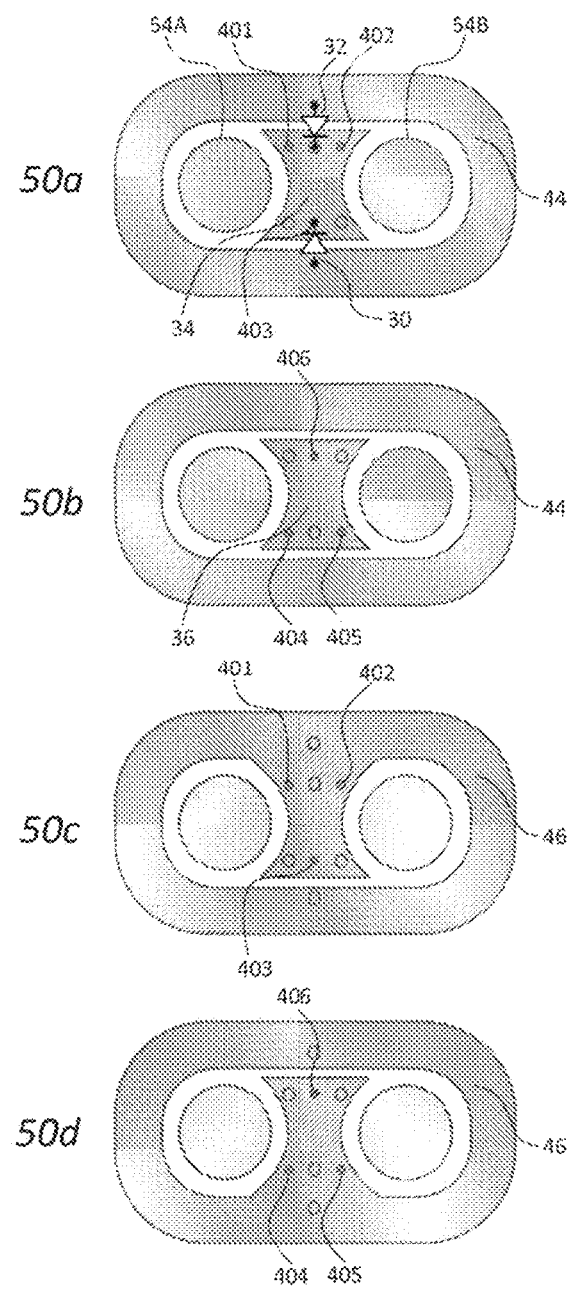
FIG. 3B shows the secondary winding implementation of the transformer presented in FIG. 3A, with a transformer structure using a U core.

Presented in FIG. 3A is a center tap transformer structure having a primary winding 38, and two identical secondary windings 34 and 36. In the secondary side, there are two rectifier means, 30 and 32. The secondary rectifier means can be Schottky diodes, synchronous rectifier using silicon power Mosfets, GANs or other technologies. There is a positive output 46, and a negative output 44. Typically, the negative output it might be connected to the output ground. In the primary, an AC signal is applied to the primary winding between 40 and 42, which can be generated, by a full bridge configuration, half bridge or other topologies. In one of the polarities generated by the signal applied to the primary winding 38, one of the rectifiers means conducts and when the polarity changes the other rectifier means will conduct. Because only one of the secondary winding is conducting current during each polarity the copper in the secondary is not fully utilized. This is one of the major disadvantages of the center tap topology. In addition to that, in center tap topologies there is a leakage inductance between the two secondary windings, which will delay the current flow from a winding to another. In the present embodiment described in FIG. 3B these two drawbacks associated with center tap are minimized. In FIG. 3B are presented four layers of a multilayer structure, from 50a through 50d, wherein the secondary winding is implemented. A U core shape magnetic core penetrates through the multilayer PCB through the cutout 54A and 54B. In between the legs of the magnetic core there is a conductive material, usually copper connected to the cathodes of the rectifier means, one on layer 50A connected to the cathode of 30 and another one placed on layer 50b connected to the rectifier means 32. On layer 50c and 50d there, the cutouts 54A and 54B are surrounded by conductive material, which is connected to 46. On layer 50a and 50 b there is a ring of conductive material, which is connected to the anode of the rectifier, means 44.

During one of the polarities when the rectifier means 30 conducts the current flows through the conductive material between the legs of the U core from the anode connected to 44 and through the rectifier means, 30, and further through the vias 401 and 402 on layer 50c to the 46. Another path for current flow is through the rectifier means 30 and via 403 and further towards 46. During the polarity wherein rectifier means 32 is conducting, the current will flow from 44, through 32, and further on layer 50b through the conductive material, 36, placed between the cutouts, 54A and 54B, and further through via 404 and 405 to layer 50d towards 46. Another path for the current flowing through 32 is through via 406 to layer 50d and through the conductive material in between the cutouts 54A and 54B towards 46. Though one turn secondary for this magnetic structure will circle the 54A and 54B, the portion of the secondary wherein the current is flowing in only one direction is reduced the conductive material between the cutouts, 54A and 54B, such as 34 and 36. For the rest of the one turn secondary such as the portion of 44 and 46, which surrounds the cutouts 54A, and 54B the current is flowing in both directions. This means that the copper utilization it improved by comparison with more traditional winding technique wherein the entire secondary winding is conducting during only during one polarity.

Another advantage of the winding structure presented in FIG. 3B is the fact that the copper is placed over the entire section of the primary windings allowing the current to flow in order to cancel the magnetic field produced by the primary winding. In addition to that, the rectifier means 32 and 30 are placed as the part of the secondary winding eliminating the end effect losses and reducing the stray inductance.

In Figure, 4A is presented a transformer structure using full bridge rectification. It is composed by a primary winding 138, a secondary winding 137, four rectifier means 133,135, 134, and 135. The rectified voltage is connected to 141 and 142. The primary winding terminations 139 and 140 are connected to an AC source, which can be generated, by a full bridge, half bridge or any other topologies. In FIG. 4B is presented the secondary winding arrangement for one turn secondary. For one of the polarities the current is flowing through 136, the copper section, 137A and 137B placed in between the cutouts 54A and 54B, and further through 133, through the via 407 to the layer 410B towards 141. During the other polarities the current will flow from 142, through 135 and further through the copper section, 137A and 137B placed between the cutouts 54A and 54B, and further through rectifier means 134 and through via 408 to the layer 410B, towards 141. In this topology the secondary copper utilization, it is inherently very good because the secondary winding 137 does conduct during both polarities. The winding structure presented in FIG. 4B however does incorporate the rectifier means, 133,136,134 and 135 as part of the secondary winding eliminating the end effects and reducing the stray inductance.

Figure 5A:
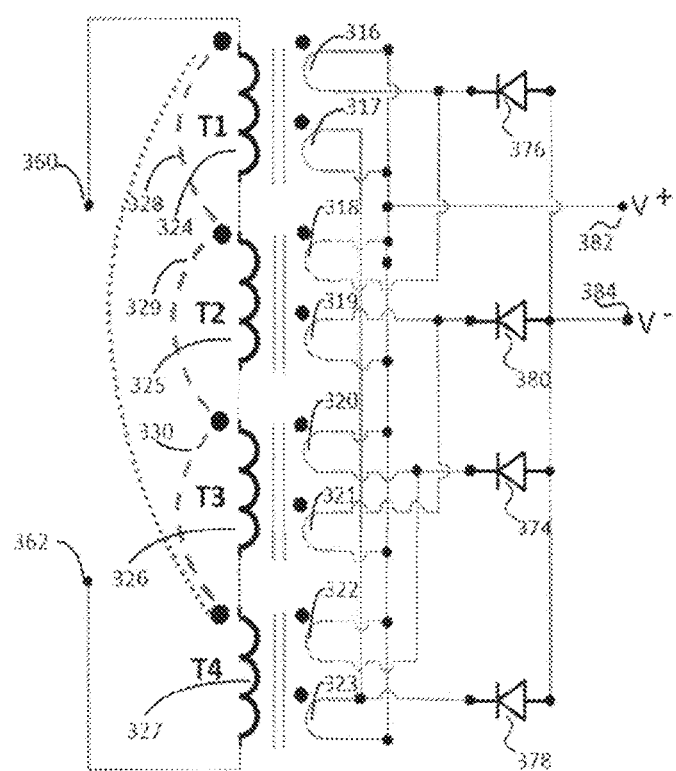
FIG. 5A shows the equivalent schematic of the four-legged magnetic structure with center tap.

In FIG. 5A is presented the equivalent circuit of one embodiment of this specification wherein a four legged magnetic core structure is used. There are four transformers T1, T2, T3 and T4, which are coupled to each other in series. The T1 is coupled with T2, T2 is coupled with T3 and T3 is coupled with T4 and further T4 is coupled with T1. In FIG. 5C is presented the definition of each transformer from T1 to T4. Each transformer is represented as an E core transformer having as a center post the entire cylindrical leg and two outer posts, which are half of the cylindrical legs in its direct vicinity. The shape of the four legs however can be rectangular or any other shape. Because the transformers T1, T2, T3 and T4 doe share sections of the same cylindrical posts, there is a coupling between them.

Figure 5B:
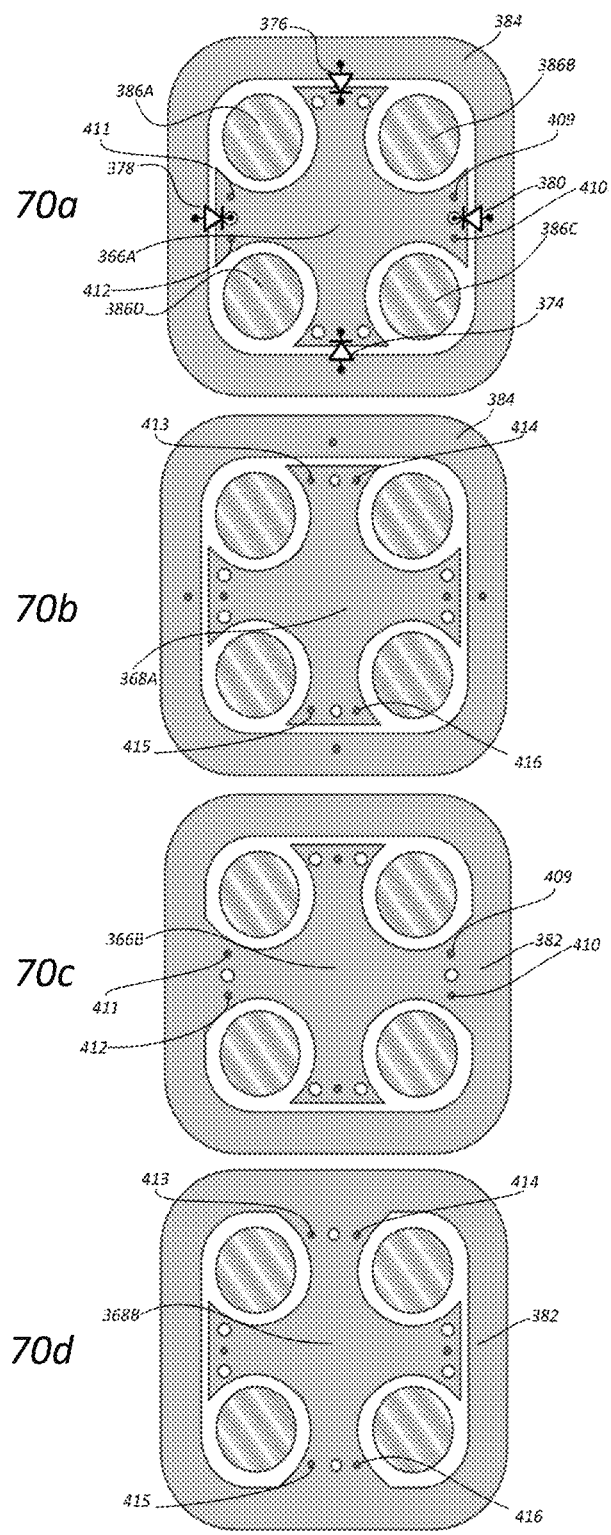
FIG. 5B shows the secondary winding implementation of the four-legged transformer presented in FIG. 5A.
Figure 5C:
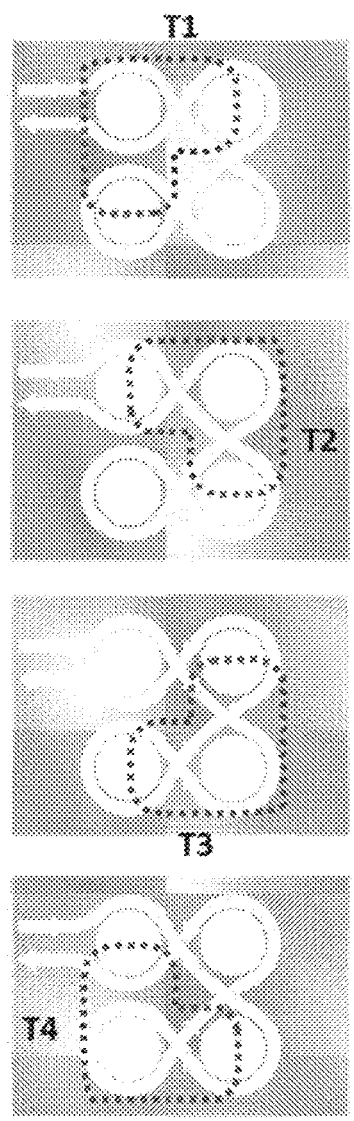
FIG. 5C shows the equivalent four transformers that are part of the four-legged transformer.

The equivalent schematic of the magnetic structure implemented in FIG. 5B is presented in FIG. 5A. An AC signal is applied between 360 and 362, which can be generated by a full bridge, a half bridge structure, or any other double-ended topology. When a signal with positive polarity at 360 versus 362 is applied the rectifier 376 and 374 are activated and the current flows from the negative voltage V−, 384, which in many applications is connected to the ground, further through the copper section shaped as a cross, 366A, located on the layer 70a, towards the via connection 411, 412 and 409, 410. Through the via 411, 412 and 409, 410 the current flows further on the layer 70C towards the 382. A parallel path for the current during this polarity is through the rectifier means 376 and 374, on the layer 70C further through 366B towards 382. During the other polarity the other rectifier means 380 and 378 are activated and the current will flow further on layer 70b through the copper section shaped as a cross 368A towards via 413, 414 and 415, 416 and further to the layer 70d towards 382. Another path for the current flowing through 378 and 380 is through 368B on layer 70d towards 382.

The current flowing through 384,382, which surrender the four-lagged magnetic structure, and through 366A, 368B, 366B and 368B is aimed to cancel the magnetic field produced by the primary winding. The fact that the primary winding is split in four sections surrounding the four lagged magnetic core legs 115A, 115B, 115C and 115D from FIG. 10, and on each leg we have current flow into the secondary to suppress the magnetic field created by the primary winding, the leakage inductance in the magnetic structure presented in this patent application, it is very low. The copper arrangement depicted in FIG. 5B does allow a very low impedance current flow and in addition to this the rectifier means 376,380,374 and 378 are part of the secondary winding eliminating in this way the end effects and the stray inductance. The end effect is characterized by the ac losses in the copper after the secondary winding leaves the transformer to make the connection to the secondary means. In this embodiment, there are no end effects because the secondary winding does not leave the magnetic structure, each rectifier means being part of the secondary winding.

Figure 10:
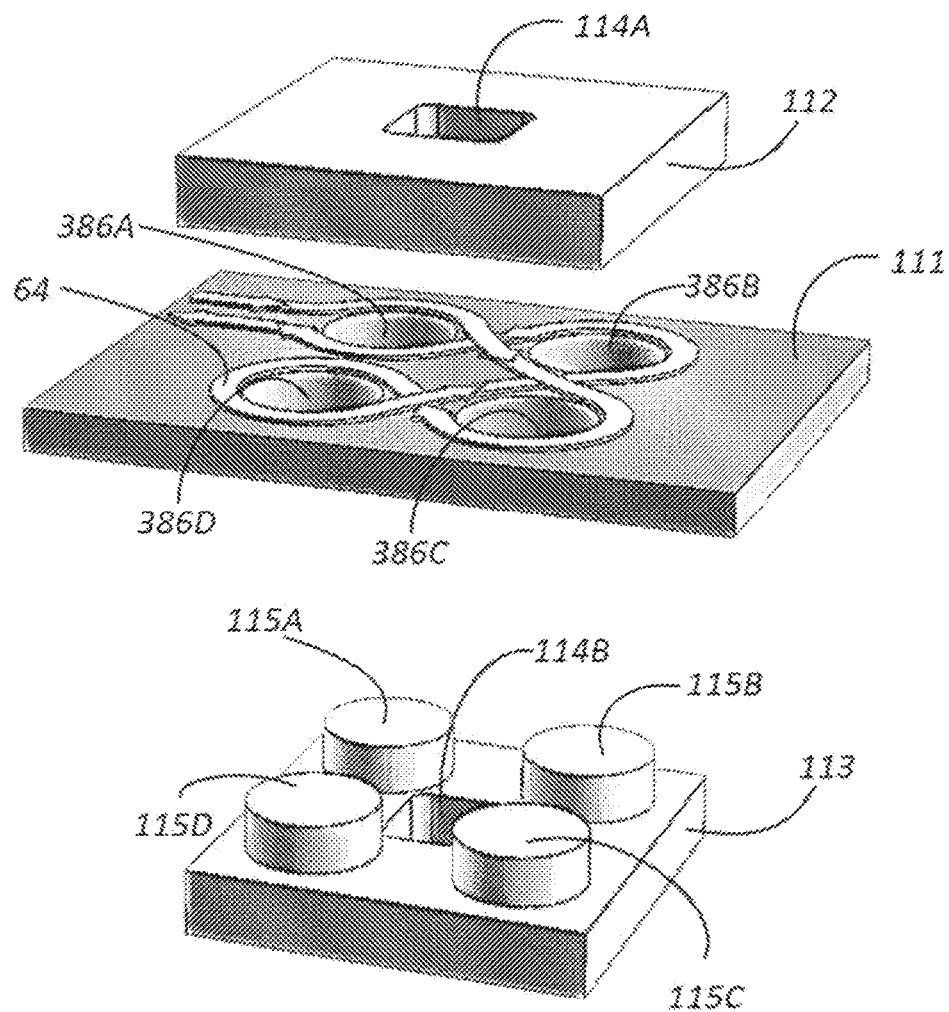
FIG. 10 shows three-dimensional drawing of the four-legged magnetic structure.

The magnetic structure depicted in FIG. 5B does have several advantages over the conventional magnetic using an E core and even U shape cores. First of all the leakage inductance is significantly reduced. In addition to this, the ac losses in the windings are further reduced because the magnetic field intensity between primary and secondary is four times reduced by comparison to one magnetic core structure. In addition to this, the core volume of this configuration is it smaller than smaller than one core configuration. The placement of the rectifier means as a part of the secondary ending eliminated the end effects and the stray inductance between the secondary winding and the rectifier means. The coupling between the four equivalent transformers as depicted in FIG. 5A reduces the thickness of the ferrite plates 112 and 113, which are placed on top of the four cylindrical legs 115A, 115B, 115C and 115D as depicted in FIG. 10.

Figure 6B:
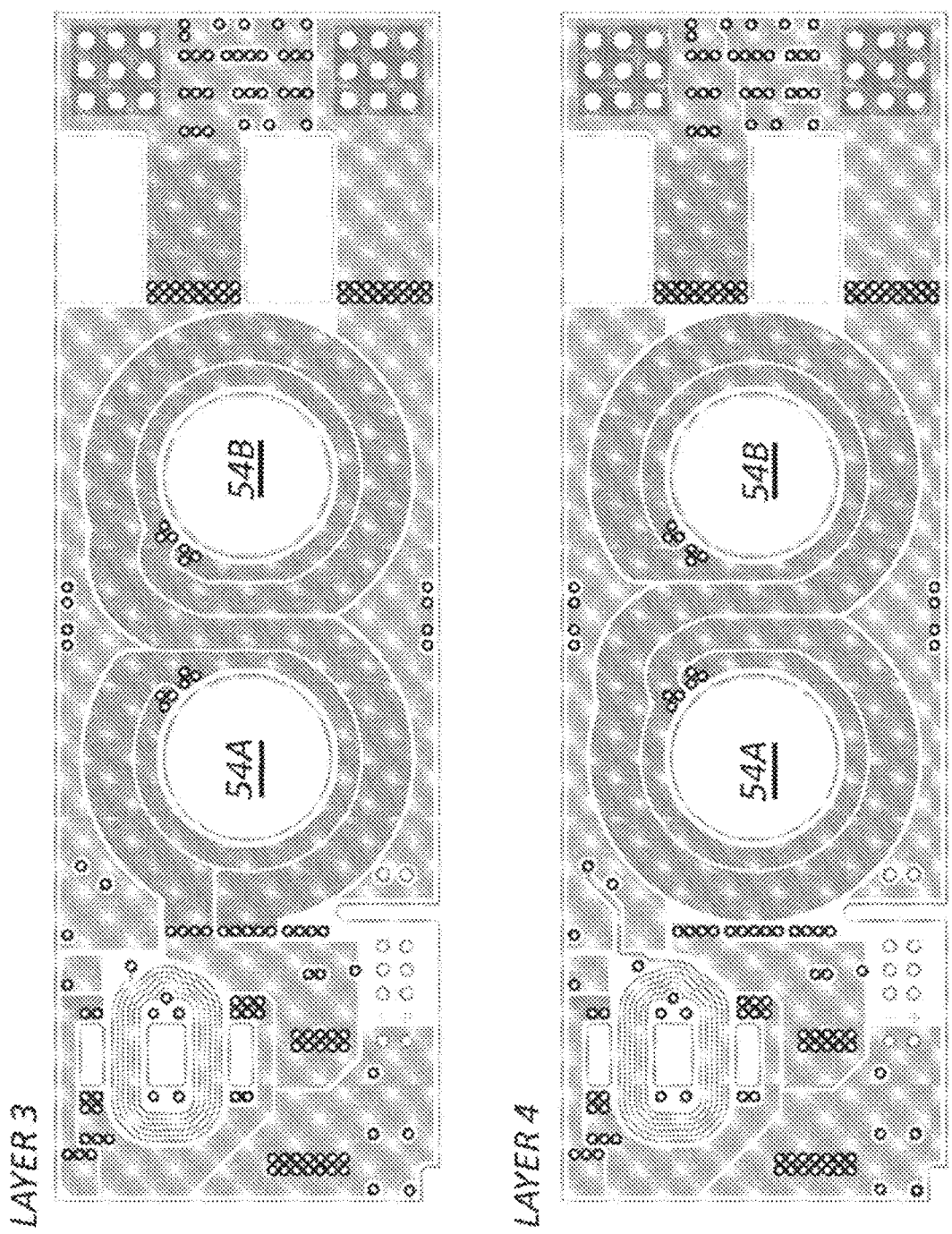
Figure 6C:
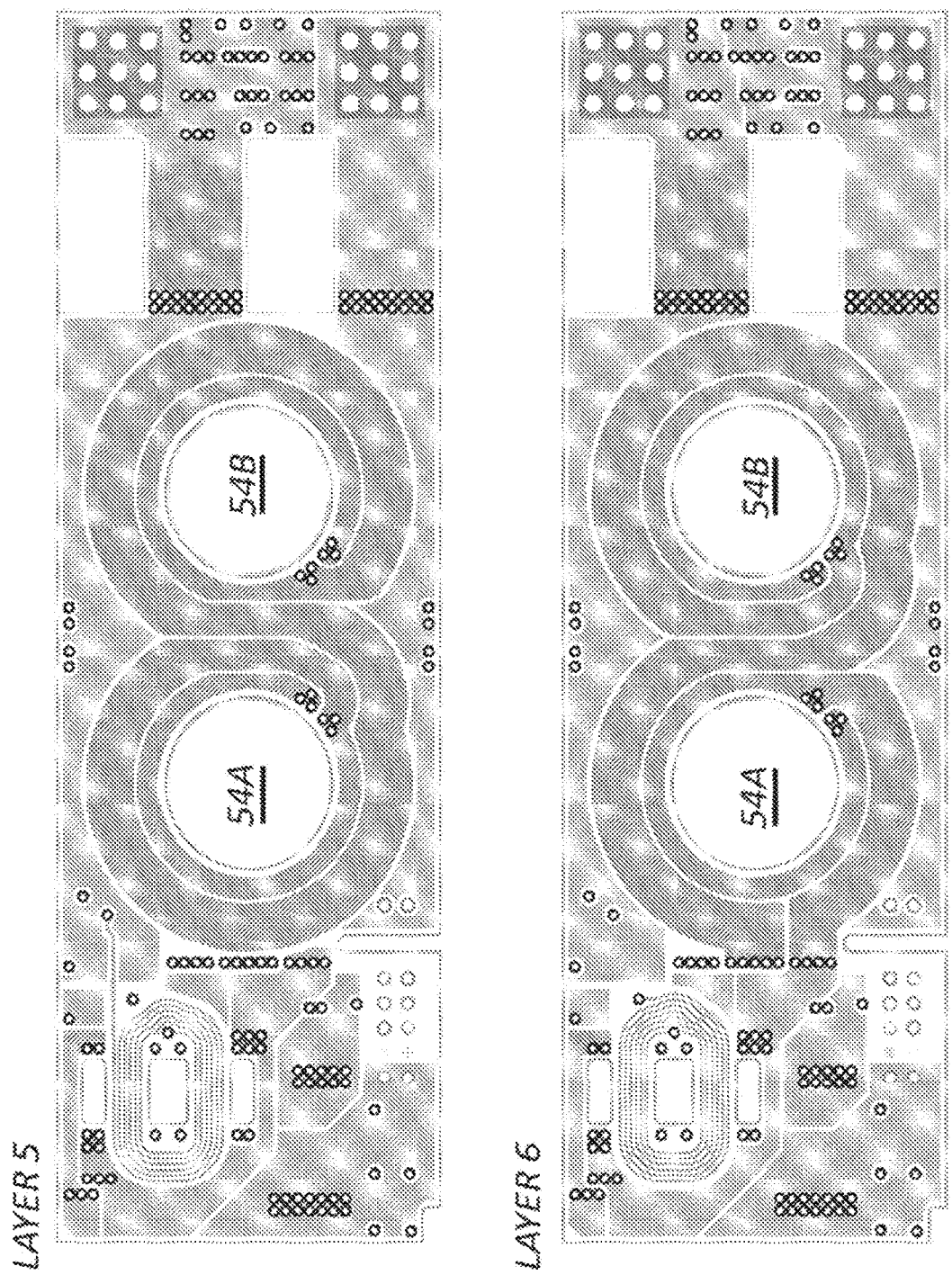
Figure 6D:
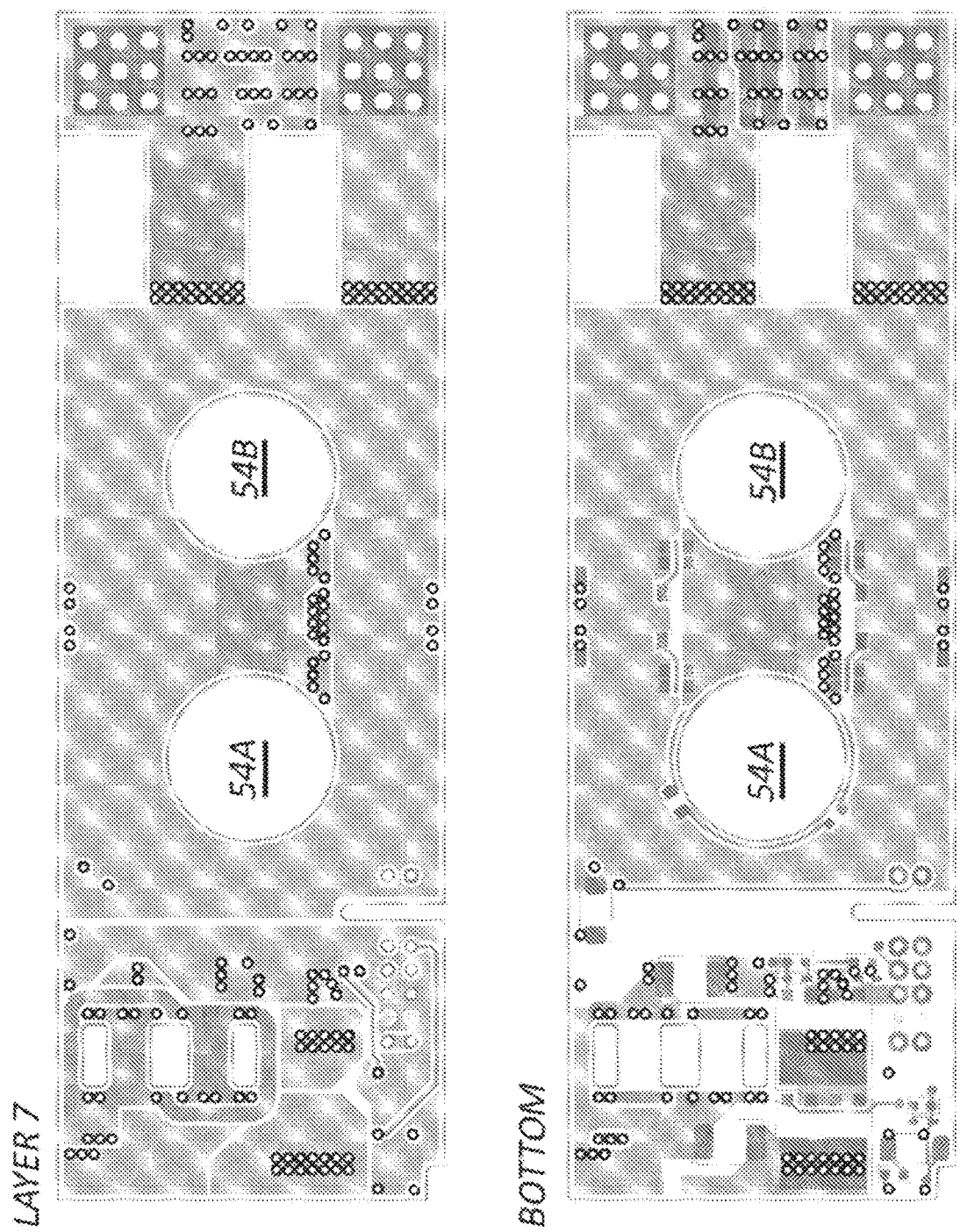

In FIG. 6A through 6D are presented metal etch layers having windings for the transformer structure presented in FIG. 3A. The winding implementation of FIG. 6A through 6D is optimized in respect of layers utilization for the purpose of industrialization. In FIG. 3B we are using four layers while in FIG. 6A we are using just two layers. In FIG. 6A is presented the top layer and layer 2. On the top layer the cutouts for the magnetic core, 54A and 54B are surrender by a copper connected to ground which is FIG. 3A is labeled 44. On the layer 2, the cutouts for the magnetic core, 54A and 54B are surrender by copper connected to 46, as per FIG. 3A. The rectifier means 30 and 32 from FIG. 3A are implemented by using two synchronous rectifiers in parallel. The copper section, 34, placed between the cutouts 54A and 54B, is connected to the group of via 462. The drain of the rectifier means 30 is placed on two pads connected to the group of via 460 and 461. During the polarity wherein the rectifier means 32 are conducting the current is flowing from 44 through the rectifier means 32 further through 34 and through the via 462 to the layer 2 where the current flows to 46. During the polarity wherein the rectifier means 30 are conducting the current is flowing from 44 through the rectifier means 30 further through 460 and 461 to layer 2 and further through the copper placed between the cutouts, 54A and 54B, towards 46. On FIG. 6B, 6C are presented the primary windings, which are incorporated in layer 3, 4, 5 and 6. In FIG. 6D is presented the secondary winding together with the rectifier meas. These layers are identical to the layer 1, the top, and layer 2. However, on these layers, the winding configuration is placed in a mirror arrangement. The massive copper arrangement around the magnetic core legs allows the current to flow optimally and choose its own path in order to cancel the magnetic field produced by the primary winding. This helps in further reducing the leakage inductance in the transformer structure.

Figure 7A:
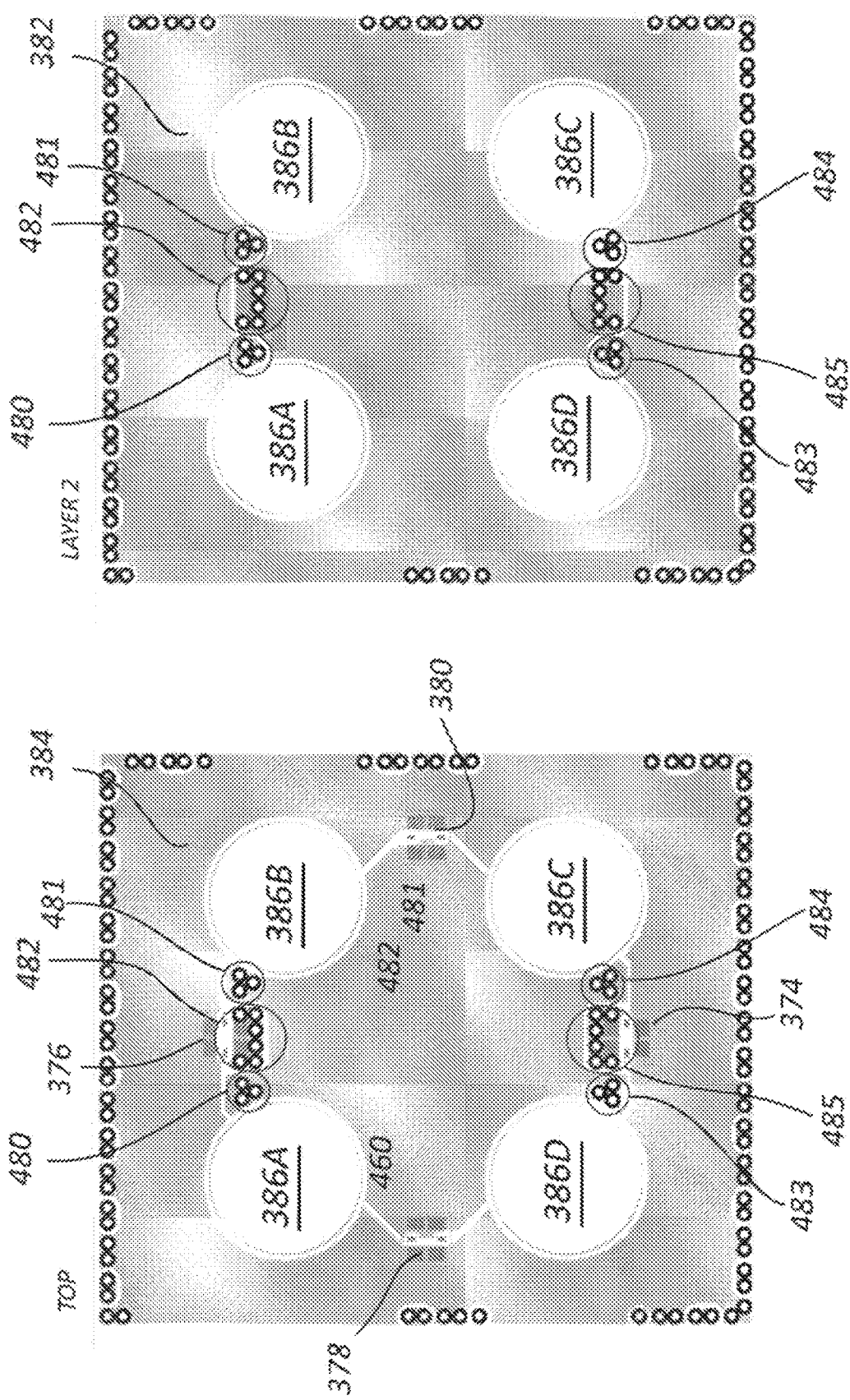
FIGS. 7A and 7B show metal etch having winding for the four-legged magnetic structure described in FIGS. 5A and 5B.

In FIG. 7 is presented an optimized implementation of the magnetic structure of FIG. 5B. In FIG. 7A the four legged magnetic structure is using just two layers for the secondary winding unlike four layers as depicted in FIG. 5B. This implementation is for industrialization wherein the cost effectiveness is very important.

For one of the polarities of the voltage applied to the primary transformer between 360 and 362, FIG. 5A, the rectifier means 376 and 374 conducts and the current will flow from 384 through 376,374 through the via 482 and 485 to the second layer. On the second layer, the current will continue to flow in both directions, one between the cutouts 386A and 386D and between cutouts 386B and 386C towards V+, 382. During the opposite polarity the current will flow from 384 through rectifier means 380 and 378 towards the via 480,481 and respectively 483 and 484, to the layer 2 and further to V+, 382.

Figure 7B:
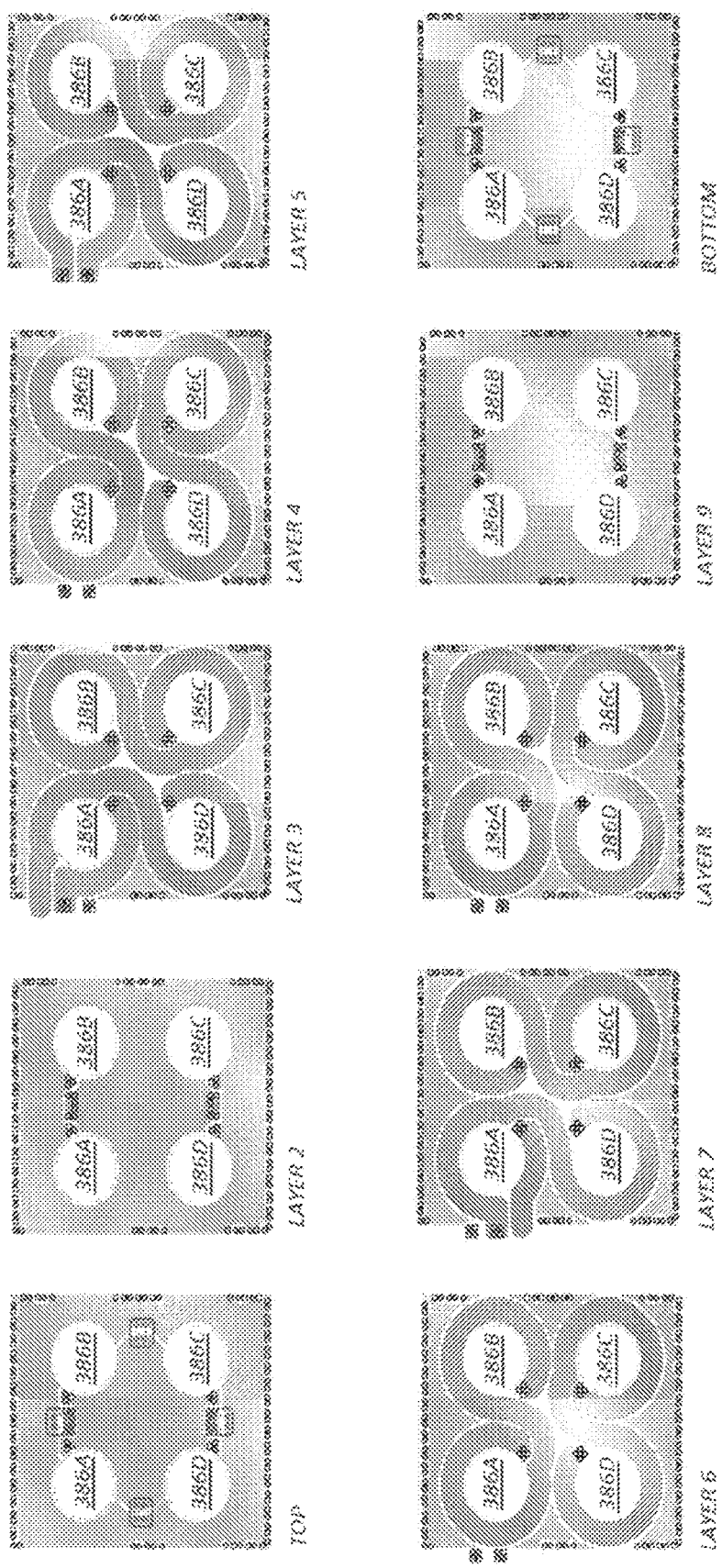

The implementation of the secondary winding depicted in FIG. 7A has the advantage of using just two layers. In FIG. 7B is presented all the layers, starting with to top two layers incorporated secondary winding and the bottom two layers, layer 9 and layer 10 wherein secondary windings are also implemented. The layer 1 and layer 2 and layers 9 and 10 are mirror imagine to each other. The primary windings are implemented on layers 3,4,5,6,7 and 8.

Figure 8A:
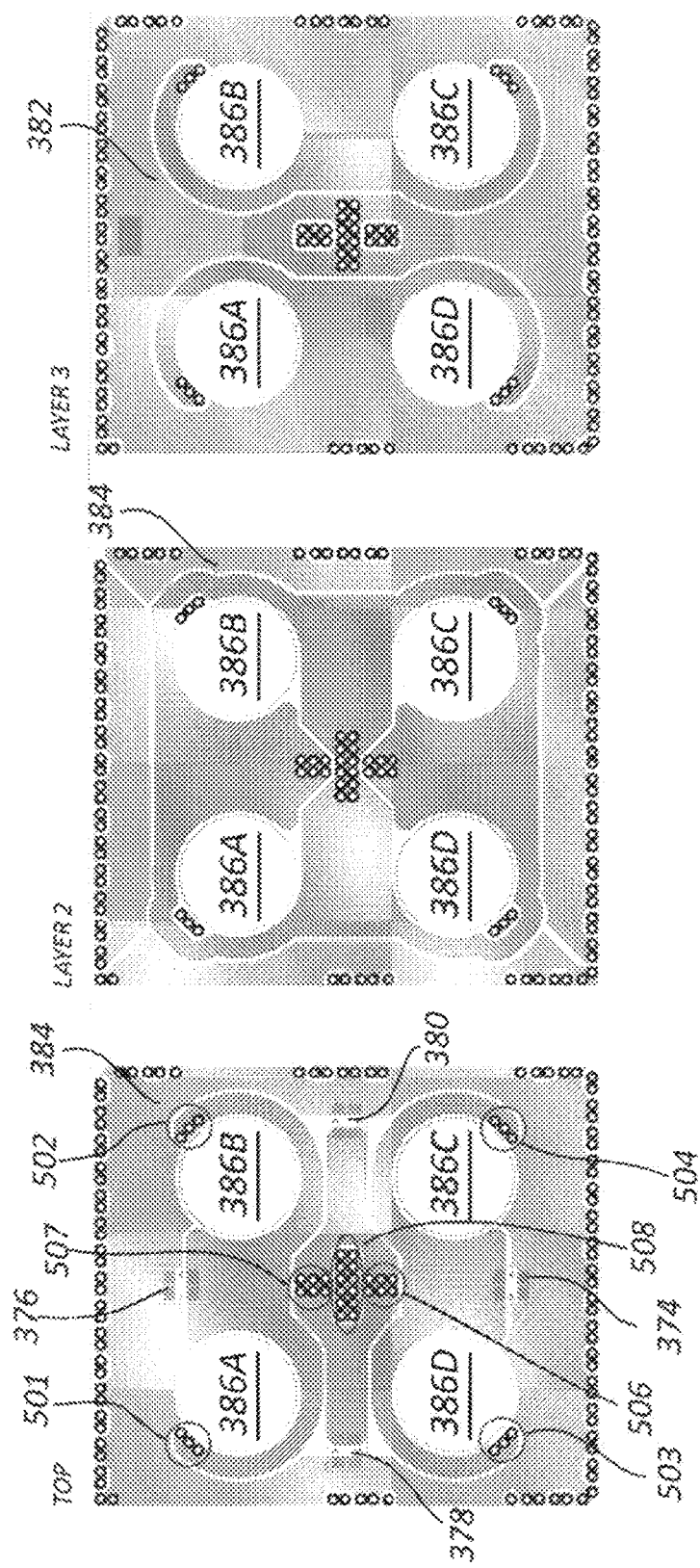
FIGS. 8A and 8B show metal etch having winding for the four-legged magnetic structure having two turns secondary winding.

In FIG. 8A is presented one of the embodiments of the four-legged magnetic structure wherein we have two turns in the secondary winding. During one of the voltage polarity injected between 360 and 362 the rectifier means 376 and 374 conduct and the current will flow from 384 through 376, 374 and further around the magnetic core cutout 386A, 386B and respectively 386C and 386D towards via 501,502 and respectively 503,504 further on the layer 3 where will flow towards V+, 382.

During the voltage polarity applied between 360 and 362 when the rectifier means 380 and 378 are conducting the current will flow from 384, through 380 and 378 and further through via 506 and 507 on layer 2 and further through via 508 on layer 3 towards 382.

Figure 8B:
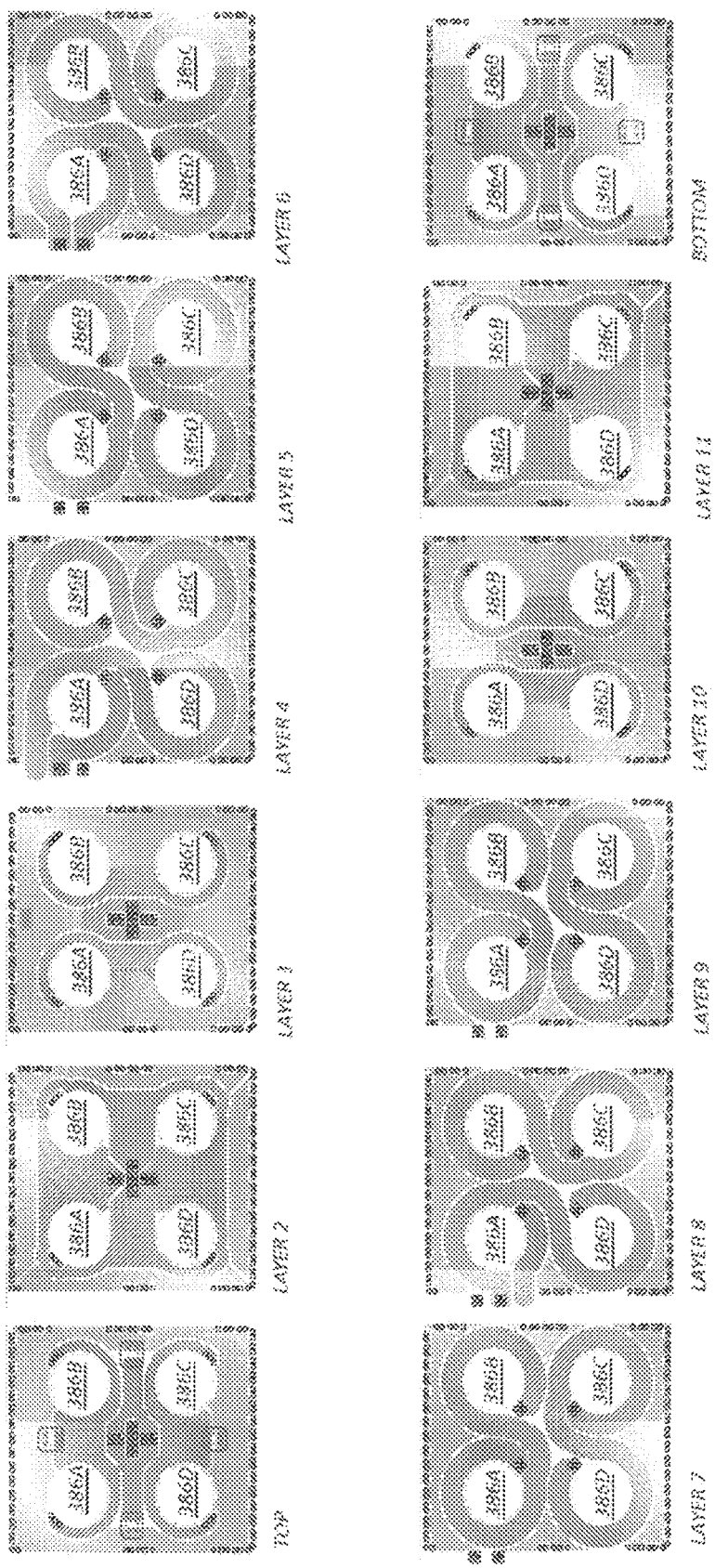

In FIG. 8B presented is the 12-layer-winding structure, in which the primary windings are implemented in six of the inner layers and the secondary windings are implemented in the top and bottom three layers.

Figure 9A:
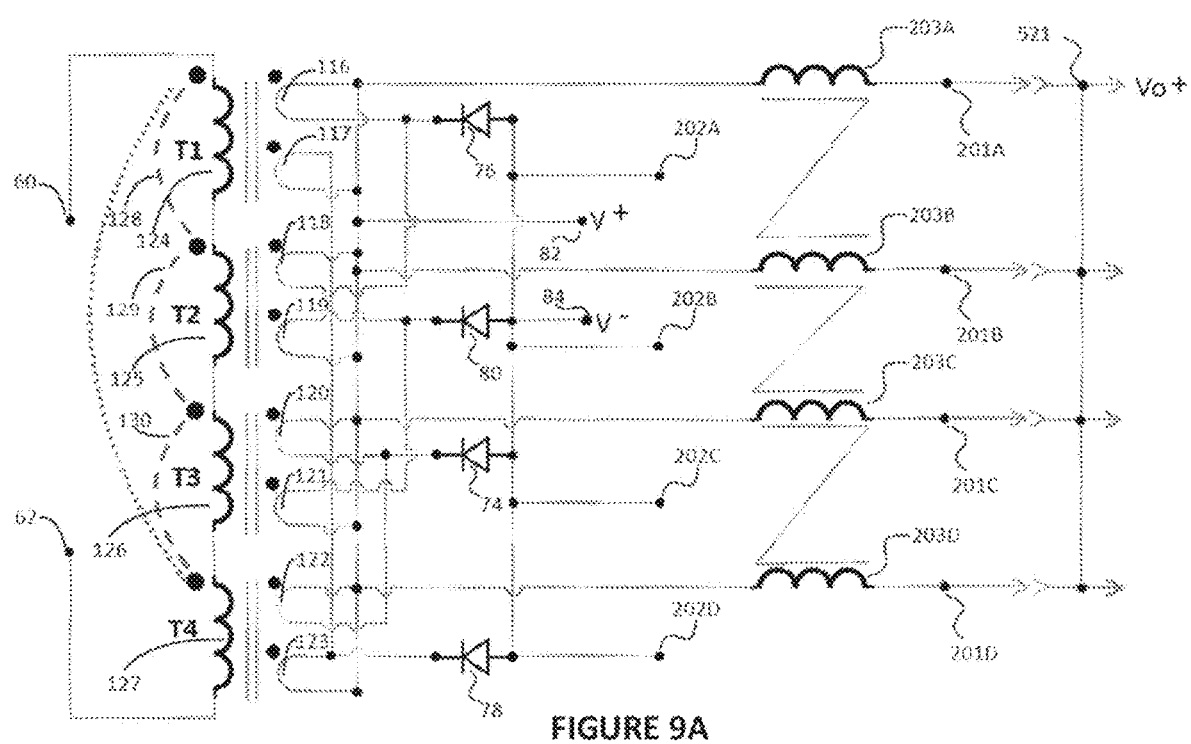
FIG. 9A shows an equivalent schematic of an implementation embodiment for the output inductor.
Figure 9B:
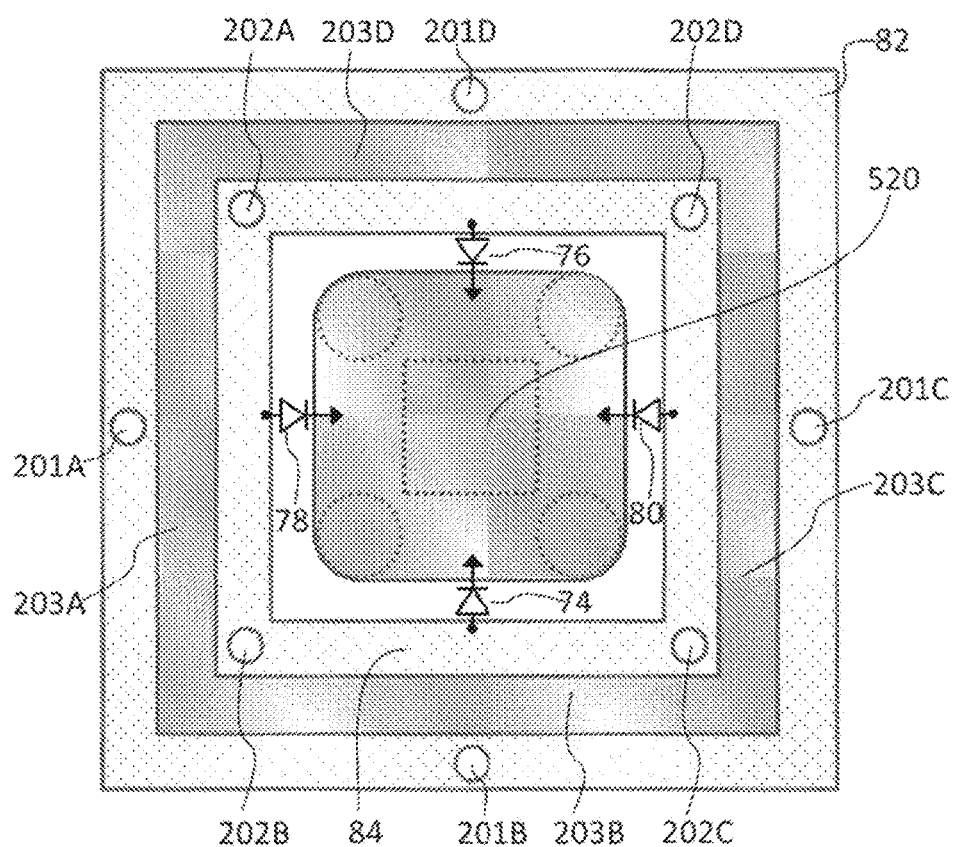
FIG. 9B shows an implementation of the four-legged magnetics structure from FIG. 9A together with an output inductor.

In FIG. 9A and FIG. 9B is presented another embodiment of this specification wherein there is a unique implementation of the output inductor. The entire four-legged magnetic structure, 520 which can be implemented in one of the configuration described in FIG. 5B, 7A, 7B or 8A, 8B or any other structure. The rectifier means 76, 74, 80 and 78 are rectifying the AC voltage injected in the primary winding. There are four pins, 202A, 202B, 202C and 202D, which are connected to the V−, 84. There are also four pins 201A, 201B, 201C and 201D whish are connected to V+, 82 as presented in FIG. 9A. There is a magnetic core composed by four sections 203A, 203B, 203C and 203D, which connected together. The entire structure can be formed by one magnetic core or four independent sections placed together. The current flowing towards 201A, 201B, 201C and 201D will flow under the magnetic core. The pins, 201A, 201B, 201C and 201D are connected further to the motherboard where they will form Vo+, 521. The pins connected to the V− 84, 202A, 202B, 202C and 202D are also connected to the motherboard. The implementation of the output choke using a continuous peace of ferrite material, which does not perforate the multiplayer PCB, 82 it, is unique. In this embodiment we split the output current and by connecting the V−, 84 pins, 202A, 202B,202C and 202C and V+,201A, 201B,201C and 201C pins to the mother board we create turns around the magnetic core formed by 203A,203B,203C and 203D. This embodiment is very suitable for very high current application where we reduce the current applied to each pins by a factor of four in this particular implementation. In the case, if we use more than four legs transformer, for example N legged transformer then we can split the current in N section and use N pins to connect to the motherboard the V+ and N pins to connect to V−. The arrow placed in the cathode of the rectifier means 76, 80, 74 and 78, in FIG. 9B symbolizes the connection to the winding structure of the four legged transformer as presented in FIGS. 5B, 7A and 7B and 8A and 8B.

Figure 11:
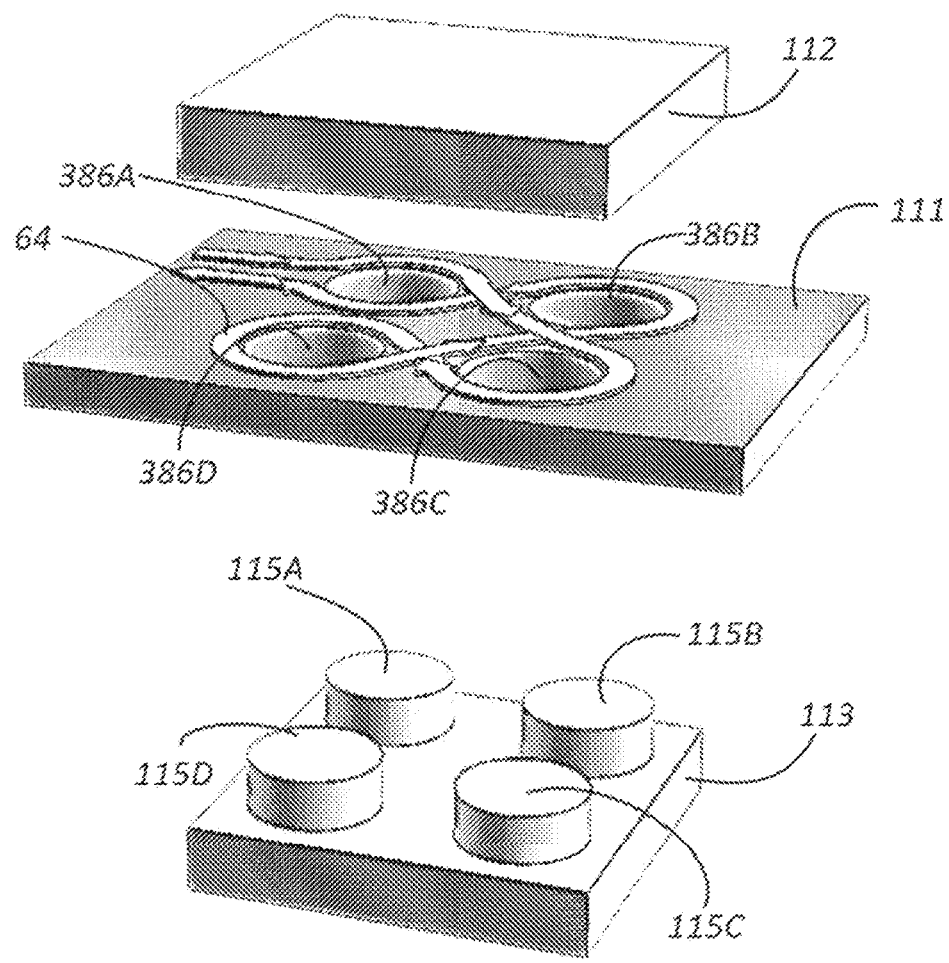
FIG. 11 shows three-dimensional drawing of the four-legged magnetic structure wherein the cutout in the upper and lower plate is removed.

In FIG. 10 presented is the four-legged magnetic configuration. The primary and secondary windings of the transformer are implemented on the multilayer PCB, 111. There is a four legged magnetic core formed by a magnetic plate 113 and four cylindrical posts, 115A, 115B, 115C and 115D. There is a cutout 114B in the plate 113. The four cylindrical posts penetrate through the holes 386A, 386B, 386C and 386D. A plate 112 with a cutout 114A is placed on top making contact with the cylindrical posts directly or using an interface gap. In FIG. 11 is presented the same structure with the difference that the cutout 114A and 114 B is eliminated. There is not a magnetic flux through that cutout but for simplicity of the implementation in case of industrialization, the cutouts can be eliminated.

Figure 12:
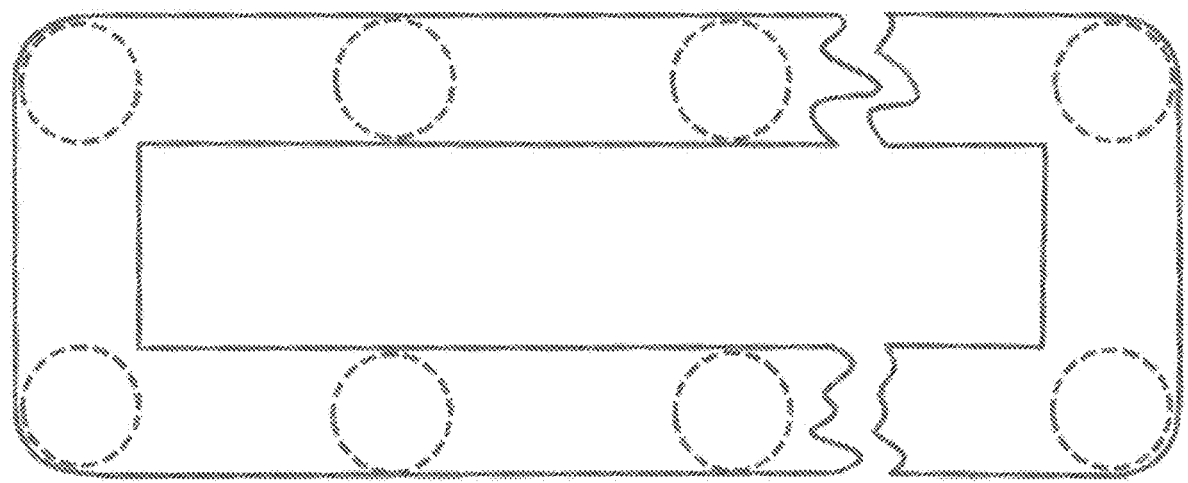
FIG. 12 shows an implementation of the multi legged magnetic structure.
Figure 13:
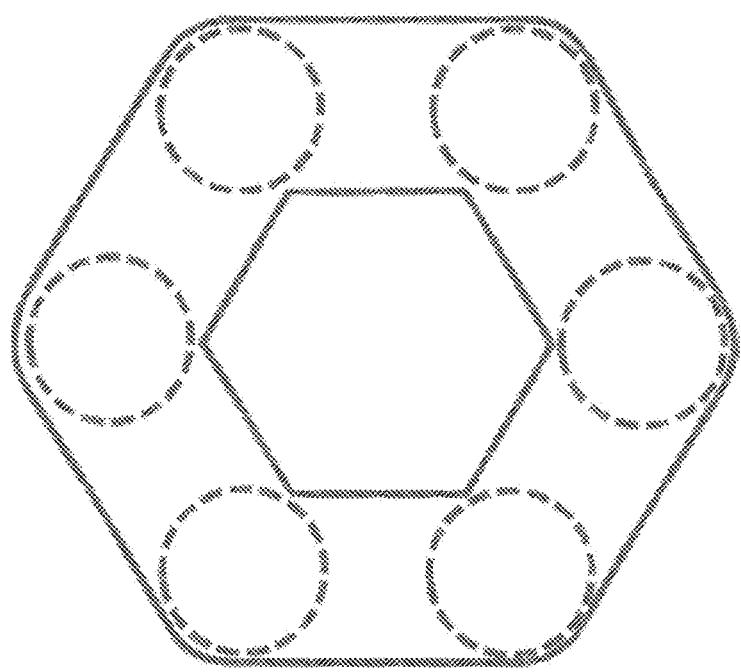
FIG. 13 shows another implementation of the multi legged magnetic structure.

In FIG. 12 is presented another arrangement of this multi-legged magnetic structure in a rectangular shape having a multitude of legs. There can be many shapes we can implement this structure, one of them is presented in FIG. 13. Each magnetic structure starting with the two legged transformer, four-legged transformer and generally N legged transformer can be multiplied and each section can share the same primary winding. They will form power-processing cells and if they share the same primary winding, the leakage inductance between the primary winding and the secondary winding can be further reduced. The multi-legged magnetic structures can be used as transformers or can be used as inductors. In the inductor implementation the gap can be placed on top of each cylindrical leg and create a very efficient distributed gap minimizing in this way the gap effect.

Figure 14:
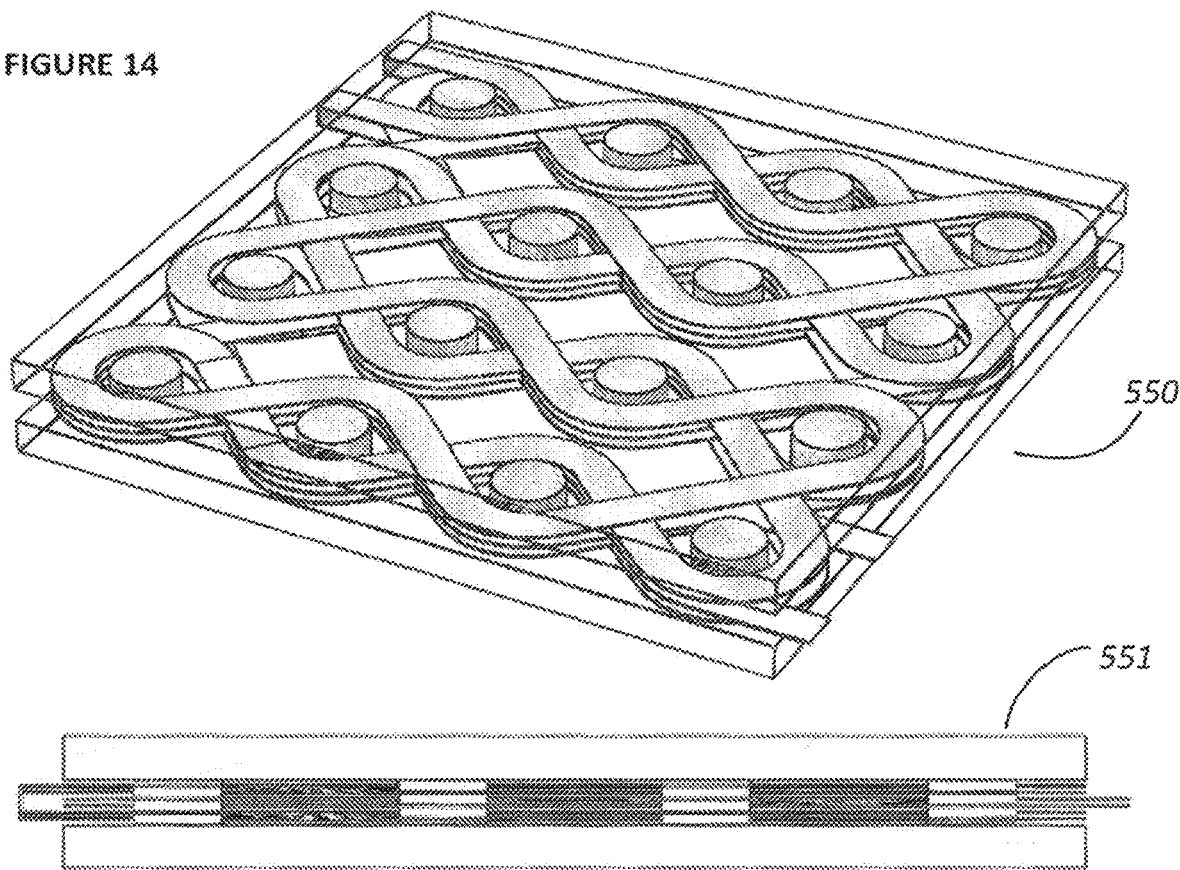
FIG. 14 shows an implementation of the multi-legged magnetic structure employing ferrite material for the posts and the horizontal plates.

In FIG. 14 is presented a general multi-legged magnetic structure. The windings are implemented in a multiplayer structure which can be embedded also in a multilayer PCB and there are cylindrical magnetic posts and two magnetic plates, one on top and one on the bottom, as depicted in 550 and 551.

Figure 15:
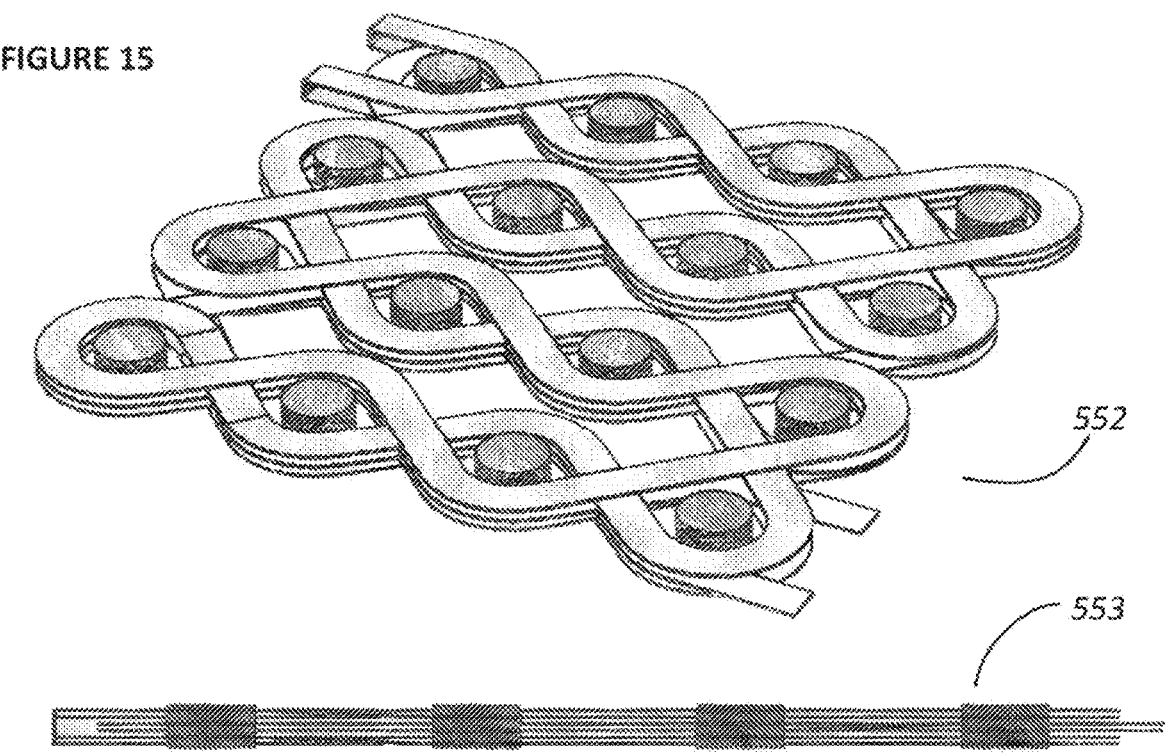
FIG. 15 shows an implementation of the multi-legged magnetic structure employing ferrite material for the posts and without horizontal plates.

In FIG. 15 is presented an implementation wherein the windings are placed in multilayer structure, which can be a multilayer PCB and the magnetic cylindrical post without the ferrite plates on top and bottom, as depicted in 552 and 553.

Figure 16:
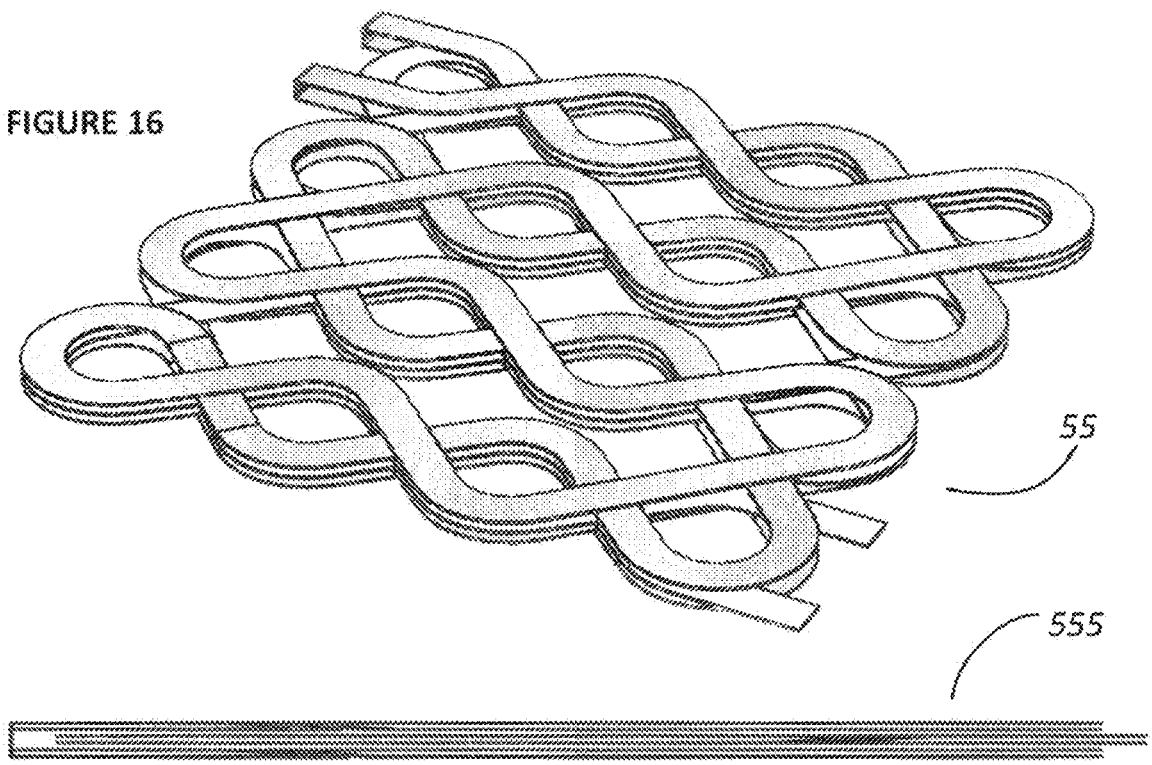
FIG. 16 shows an implementation of the multi-legged magnetic structure without any magnetic material.

In FIG. 16 is presented an air core structure wherein the magnetic core material is totally removed and the windings are implemented in a multiplayer structure, which can be multilayer PCB. Such an air core structure has many advantages one of them being much lower AC losses in the winding at high frequency.

Figure 17:
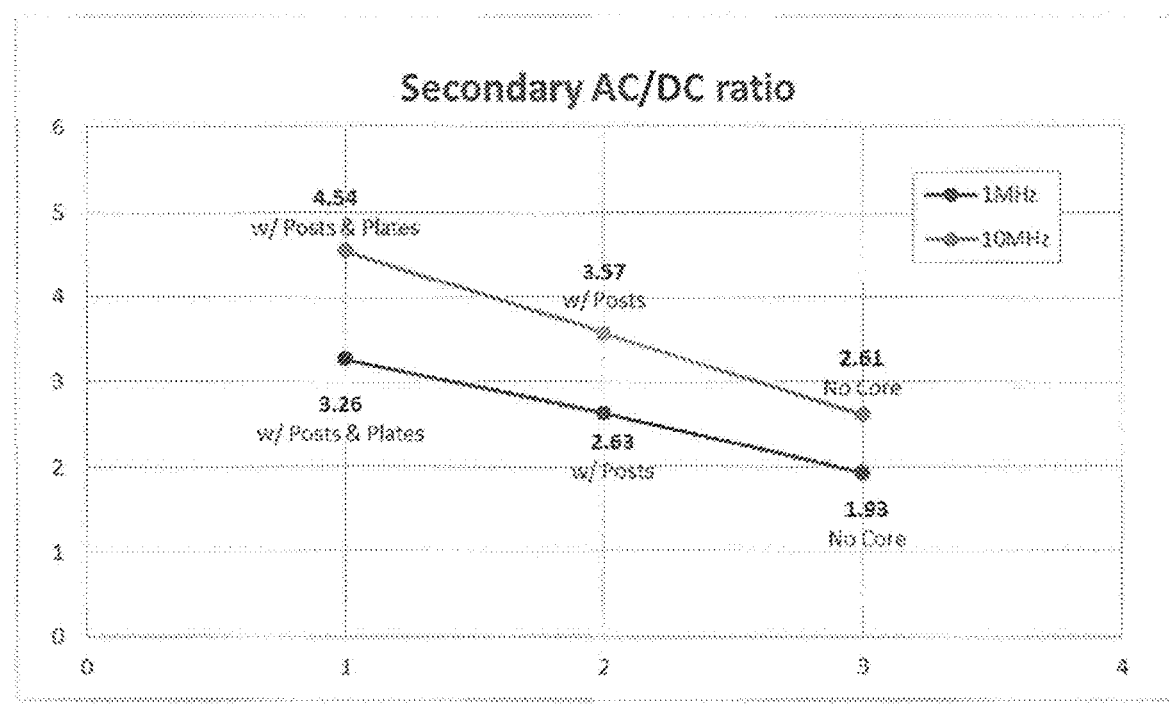
FIG. 17 shows ratio AC/DC in the secondary winding for the magnetic structures presented in FIG. 14, FIG. 15 and FIG. 16.

In FIG. 17 is presented the simulate losses in such structures at 1 Mhz and 10 Mhz using posts and plates of magnetic material, just the magnetic posts of magnetic material and without any magnetic material.

The major advantage of these magnetic structures, especially for the air core implementation is the fact that the magnetic flux does weave from a loop to another reducing significantly the radiation. This magnetic structure with air core described in 554 contains the magnetic field, and forces it to be parallel with the winding, and it is very suitable for magnetic configuration without magnetic core. In addition to this has a low ac loss for very high frequency application wherein this structure may be used. This magnetic structure will allow power conversion at very high frequency in the range of tens of MHz with high efficiency.

Embodiments of FIGS. 18-32C

Figure 18:
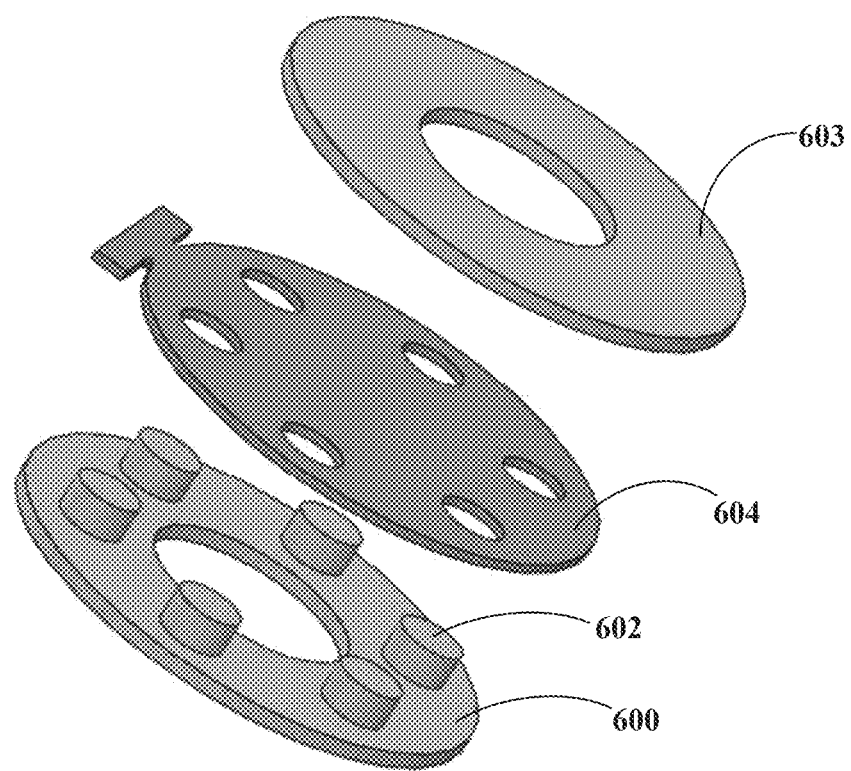
FIG. 18 is a perspective view of elements of a magnetic structure of a multilayer PCB in which six cylindrical posts are used.
Figure 19:
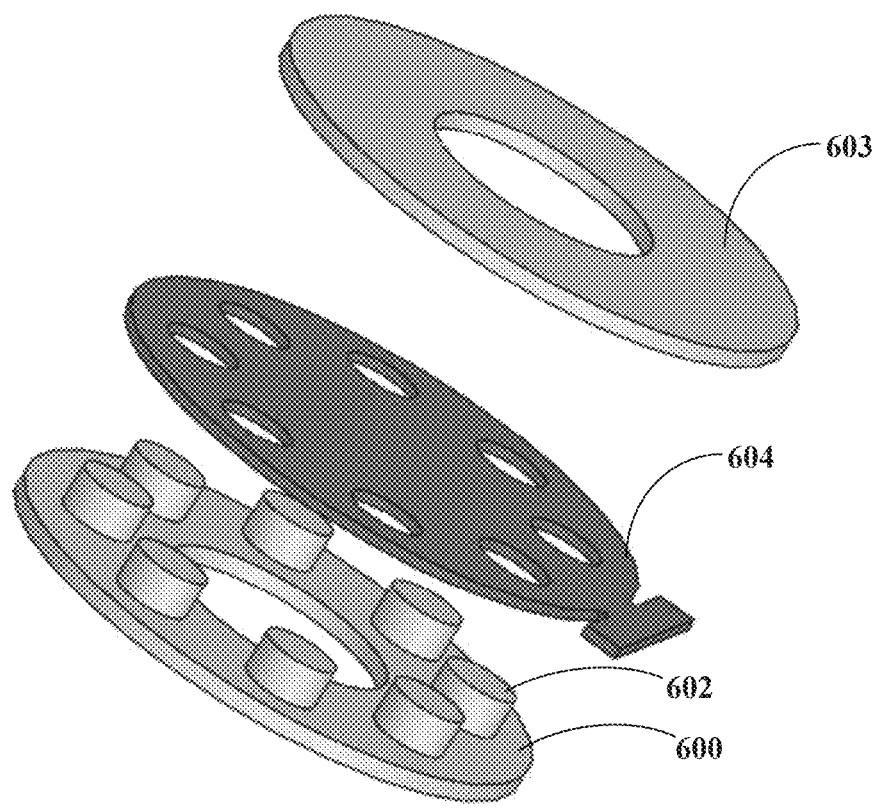
FIG. 19 is a perspective view of elements of a magnetic structure of a multilayer PCB in which eight cylindrical posts are used.
Figure 20A:
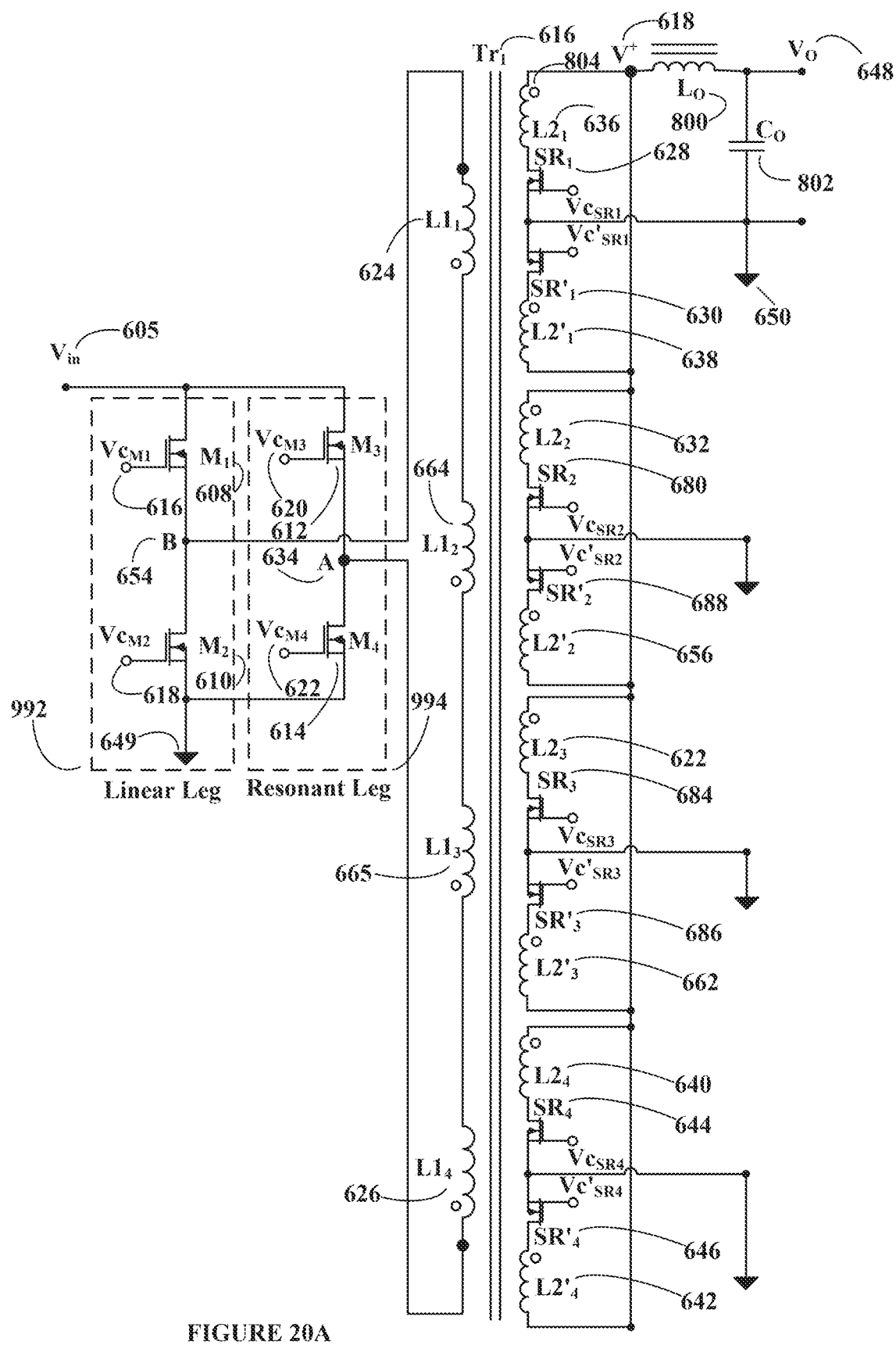
FIG. 20A is an electrical schematic of a power train employing the magnetic structure.
Figure 20B:
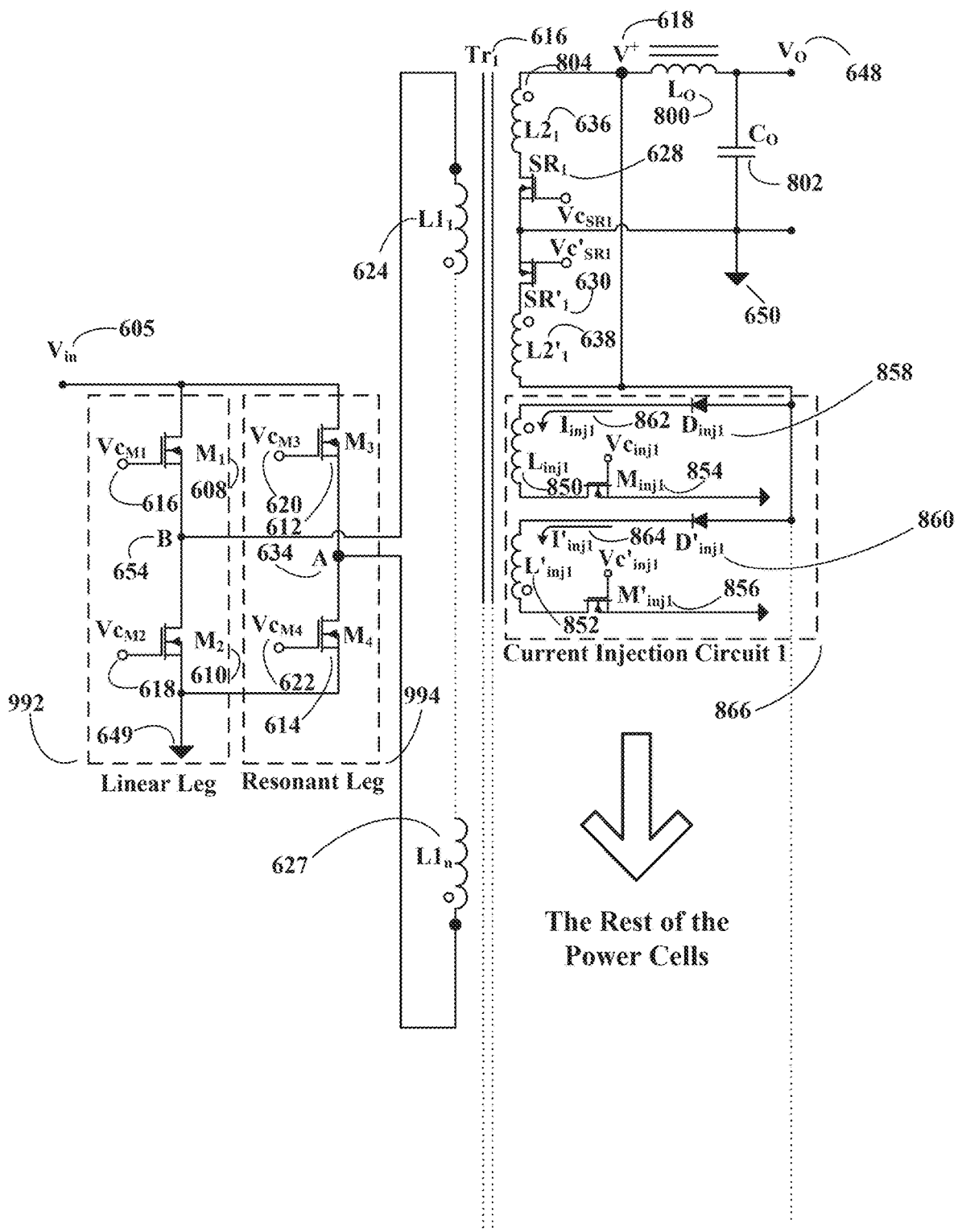
FIG. 20B is an electrical schematic of a power train employing the magnetic structure and Rompower current injection.

In FIG. 18 is presented a magnetic structure having three elements: a magnetic circular plate, 600 with six cylindrical posts, 602, a multilayer PCB, 604, wherein the windings are embedded, multilayer PCB having six round cutouts to accommodate the cylindrical posts, and an additional plate 603. Briefly, the term "novel" is used herein to identify the magnetic structure through the specification, and is not intended to identify novelty, or to limit or otherwise define the scope of this specification in any way. In FIG. 19 is presented a similar magnetic structure as in FIG. 18, with eight cylindrical posts. In FIG. 20A is presented the schematic of a power train having four power processing cells which are part of the transformer, 616. Each cell has a primary winding and secondary windings. In the first cell primary winding is L11, 624, and two power secondary windings, L21, 636 and L21', 638 and further, the fourth cell has a primary winding L14, 626 and two power secondary windings L24, 640 and L24', 642. In FIG. 20B Each power cell besides the primary winding and two power secondary winding contains additional auxiliary windings such as Linj1, 850 and Linj1', 852 which are part of the assembly 866, named "Current Injection Circuit 1" as depicted in FIG. 20B. The current injection circuit which is part of each power cells is described in detailed in "U.S. Pat. No. 10,574,148, which is incorporated herein by reference.". In the magnetic configuration described herein, leakage inductance between primary windings and secondary windings is very small. In full bridge phase shifted topology, zero voltage switching is obtained from the energy in the leakage inductance. In application wherein the leakage inductance is very small zero voltage switching cannot be obtained. To address this matter, current injection technology was developed and that it is presented in the patent application U.S. patent application Ser. No. 16/751,747, which is incorporated herein by reference. In an application wherein the magnetic structure presented herein is used, for the proper functionality of the current injection, the current injection windings such as Linj1, 850 and Linj1', 852 has to be well coupled with the primary and secondary winding per each cell. In conclusion, the current injection circuit such as current injection circuit 1, 866 is preferably part of each power cell.

Each cell contains two rectification means, which in cell 1, is SR1, 628 and SR1', 630. The rectifier means can be diodes or synchronized rectifiers. Each rectifier means has two terminations, a cathode and an anode, wherein the current through the rectifier means circulates unidirectionally from the anode to the cathode. In the case wherein the rectification means is a synchronous rectifier the anode is the source of the Mosfet, or GaN used as synchronous rectifier and the cathode is the drain of the Mosfet or GaN. In FIG. 20A and FIG. 20B the rectification means are depicted as Mosfets. In FIG. 3A is presented a power cell containing a primary winding 36, and two rectifier means, 30 and 32 in secondary and two secondary wining 34 and 36. The rectifier means have a common connection 44, and the secondary windings do connect together at the end which is not connected to the rectifier means. In FIG. 20A and FIG. 20B this common connection of the secondary windings is labeled V+, 618. The secondary windings configuration depicted in FIG. 3A is referred in the power conversion field as center tap. In FIG. 20A and FIG. 20B all the common connection of the secondary windings are connected together at V+, 618 and further connected to the output inductor, Lo, 800. The output inductor Lo, 800 is further connected to the output capacitor Co, 802. The output capacitor has one terminal connected to GND, 650 and the other termination is connected to Vo, 648 wherein the output load is connected.

In FIG. 20A, the number of cells is four, but this concept can be implemented with any number of cells. In a full bridge topology, or in full bridge phase shifted topology which is presented in FIG. 20B, the voltage in the windings has two polarities function of the which pair of primary Mosfets in the primary are turned on. For example, if M3, 612, and M2, 610, are turned on, the voltage across the winding L21, 636 is positive at the dot, 804 and SR1, 628, is conducting and the same applies to SR2, 680, SR3, 684, and SR4, 644. The simultaneous conduction of M3,612, and M2, 610 is referred to herein as phase A. The simultaneously conduction of M1, 608, and M4, 614, wherein SR1', 630, is conducting and the same applies to SR2', 688, SR3', 686, and SR'4, 646. The simultaneous conduction of M1, 608 and M4, 614 is referred to herein as phase B. In full bridge phase shifted there is also a period of simultaneous conduction for M1, 608, and M3, 612 and also a period of simultaneous conduction between M2, 610, and M4, 614, periods referred in the power conversion field as "dead time" wherein the voltage across the transformer windings in primary and secondary is zero.

In FIG. 20B is depicted the same configuration as the one presented in FIG. 20A, and for simplicity is presented only one power cell in the secondary and in addition to that the subcircuit, 866, referred herein as "Current Injection Circuit 1". The current injection circuit contains two additional windings, Linj1, 850 and Linj1', 852 well coupled with the windings in the power cell 1, L11, 624, L21, 636 and L21' 638. In addition, the subcircuit, "current injection circuit 1" contains two current injection switchers, Minj1, 854 and Minj1', 856 and two current injection diodes, Dinj1, 858 and Dinj1', 860. The current injection circuit gets its energy from V+, 618, acting in this way also as a snubber for secondary windings, L21, 636 and L21', 638.

Figure 21A:
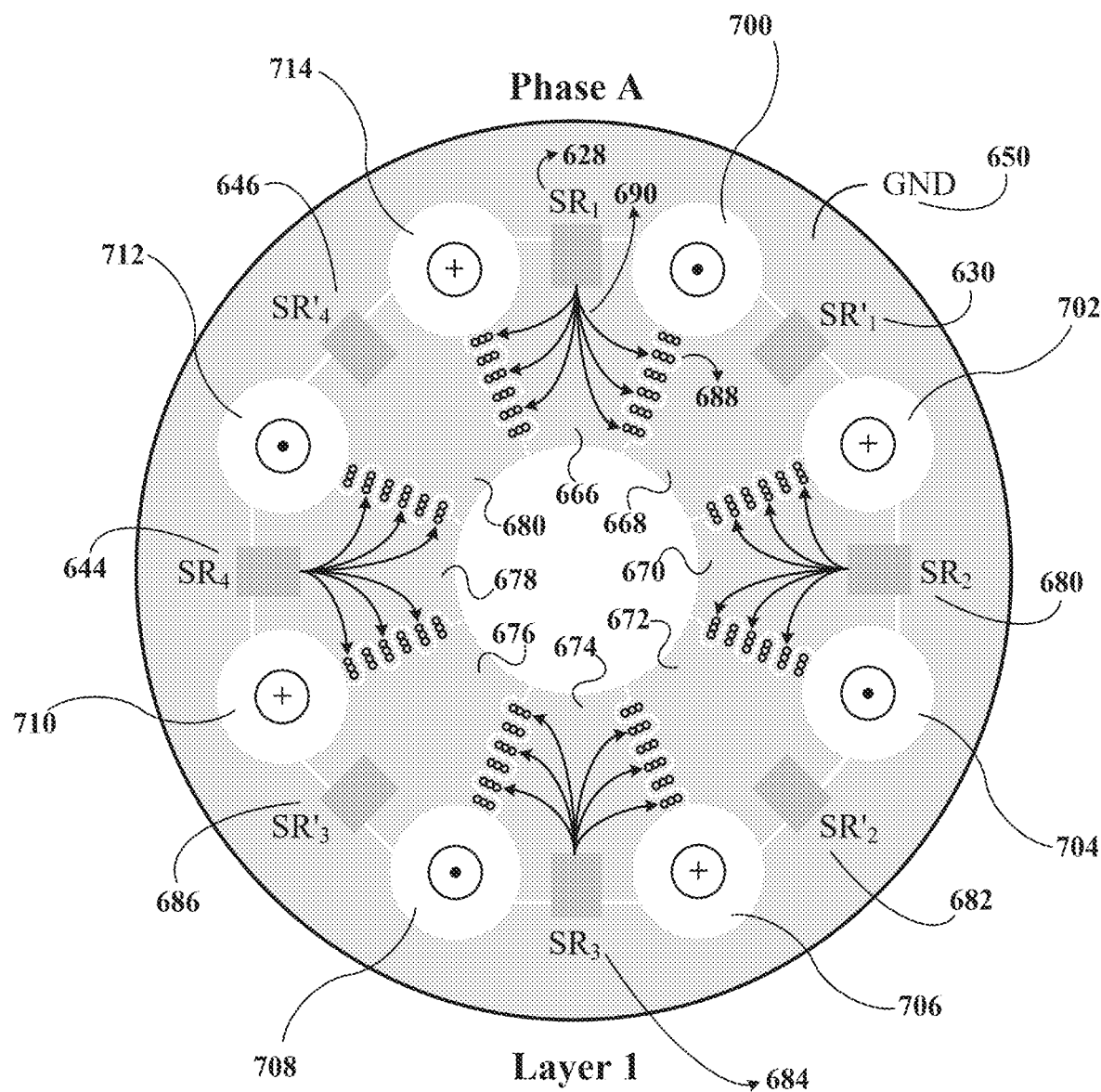
FIG. 21A represents the layout on the top layer of the multilayer PCB depicted in FIG. 19 and the current flow during phase A.

In FIG. 21A is presented in details the top layer, layer 1, of the multilayer PCB 604, from FIG. 19. The top layer of the multilayer PCB contains the rectifier means for all four power cells depicted in FIG. 20. The cutouts to accommodate the magnetic cylindrical posts depicted in FIG. 19 to penetrate the PCB are uniformly distributed on the multilayer PCB, 604. In FIG. 21A is presented the top view of the multilayer PCB with the magnetic posts penetrating through it. The polarity of the magnetic field through the cylindrical posts during the Phase A, is also depicted using the conventional symbolism: when the magnetic field exits from the posts it is shown as a circle with a dot in the center; and when the magnetic field gets into the posts from the top it is shown as a cross within a circle. Clockwise the posts penetrating through the multilayer PCB, are 700, 702, 704, 706, 708, 710, 712 and 714. The top layer, Layer 1, depicted in FIG. 21A, has an outer ring, 650 which is connected to the GND in the schematic presented in FIG. 20A FIG. 20B. The outer ring 650, partially encircles the magnetic cylindrical posts and forms a copper ring encircling all the posts. There are eight copper pads partially encircling the magnetic cylindrical posts isolated from each other and from the outer ring, 650. These copper pads are, 666, 668, 670, 672, 674, 676, 678 and 680. The rectifier means are connected with the anode to the copper ring, 650 and with the cathode to each of the copper pads. For example, SR1 is connected with the anode to the copper ring, 650 and with the cathode to the pad 666.

Figure 21B:
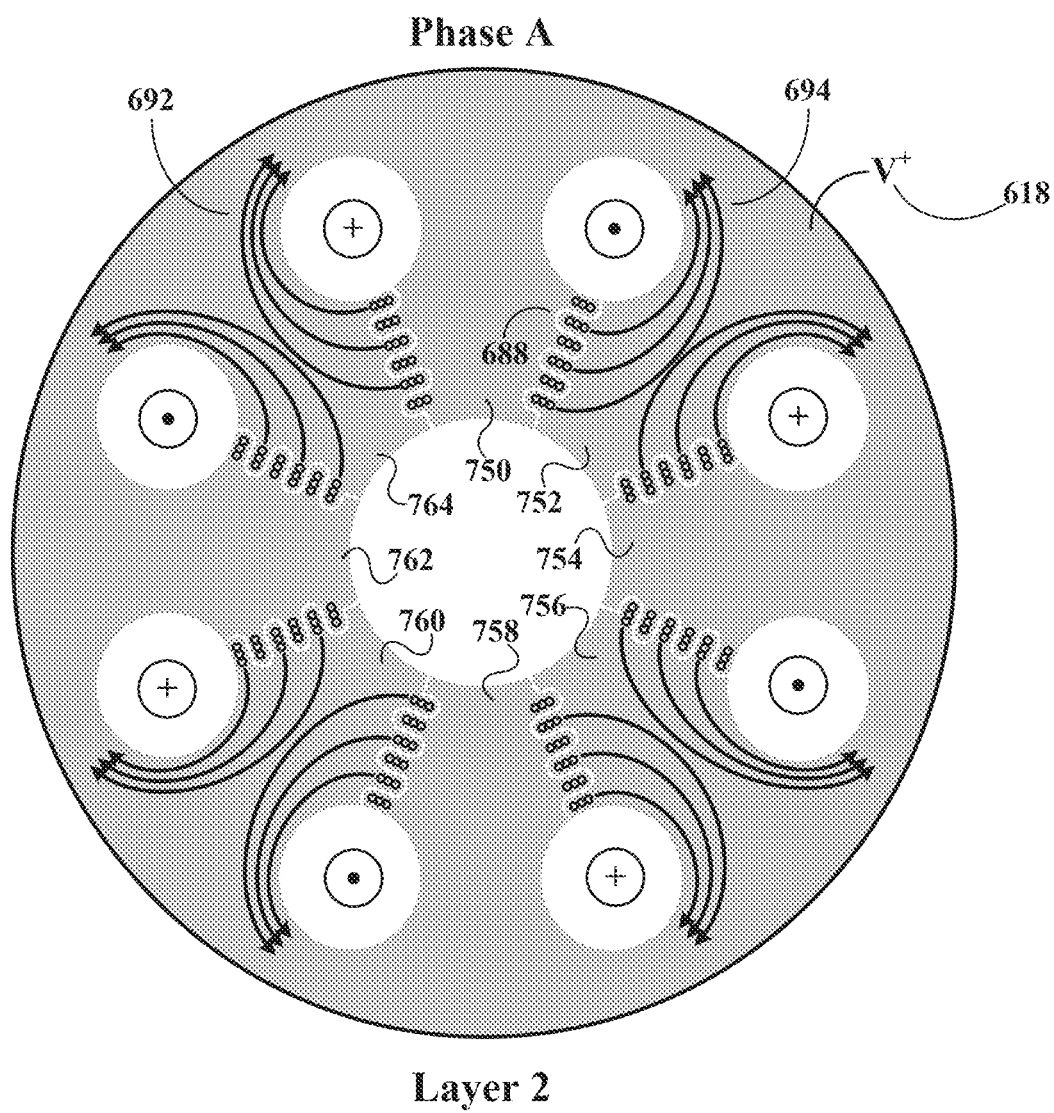
FIG. 21B represents the layout of an inner layer from the multilayer PCB depicted in FIG. 19 and the current flow during phase A.

These copper pads are connected through copper plated vias, such as 688, to another layer which is depicted in FIG. 21B, referred to as Layer 2. On Layer 2 there are eight copper pads which are connected together by an outer ring which is the common electrical connection of all the power cells, V+, 618 as per FIG. 20A and FIG. 20B. The outer ring is further connected to the output inductor 800. The copper pads are isolated from each other from the center of the multilayer PCB, 604, until the cutouts which accommodate the magnetic cylindrical posts.

In FIG. 21A is depicted the current flow through the copper pads during the Phase A when M3, 612, and M2, 610 are conducting. The current is split per each power cell. In the cell 1, the current flows via SR1, 628, from the outer ring, GND, 650, to the anode to the cathode of SR1, 628, and further to the vias, which connect the copper pad 666 from layer 1 to the copper pads 752 and 764 from layer 2, current which will encircle the magnetic post 700 and 714. The current path on layer 1, 690 and the current path on layer 2, 692 and 694 do encircle the post 700 and post 714.

In one of the embodiments presented herein, the output current is split by the number of cells, reducing the current density through the copper per each layer.

Another embodiment is that the current will flow freely through the copper following the minimum impedance and to cancel the magnetic field produced by the primary winding. This leads to a very low leakage inductance between primary and secondary. In prior art with a discrete secondary wire, the current flow is constrained within the physical boundary of the wire. Here, without limiting or defining the scope of this disclosure in anyway, the current is distributed in the copper plane. This optimally cancels the magnetic field produced by the primary winding.

For the magnetic structure with eight cylindrical posts depicted in FIG. 19, in Phase A, the current flows through SR1, 628, SR2, 680, SR3, 684 and SR4, 644, on the layer 1. On the layer 2, depicted in FIG. 21B the current flows towards the outer ring, V+, 618 through the copper pads, 752, 756, 760 and 764.

Figure 22A:
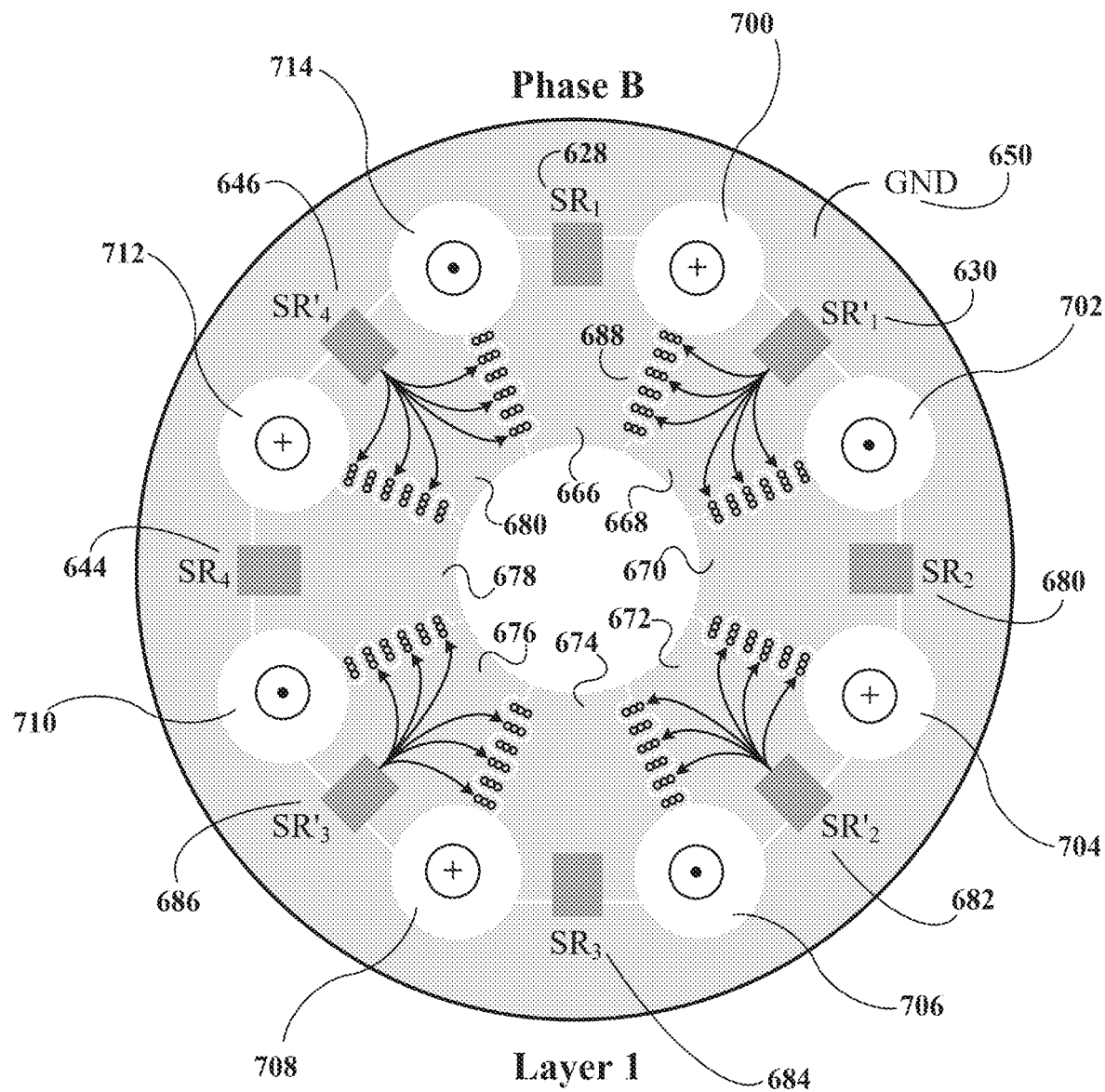
FIG. 22A represents the layout on the top layer of the multilayer PCB depicted in FIG. 19 and the current flow during the phase B.

In FIG. 22A is depicted the current flow through the copper pads during the Phase B when M1, 608, and M4, 614 are conducting. The current is also split per each power cell as it does in Phase A. In the cell 1, the current flows via SR1', 630, from the outer ring, 650, which is the GND, from the anode to the cathode of SR1', and further to the vias, which connect the copper pad 668 to the copper pads 750 and 754, current which will encircle the magnetic post 700 and 702.

Figure 22B:
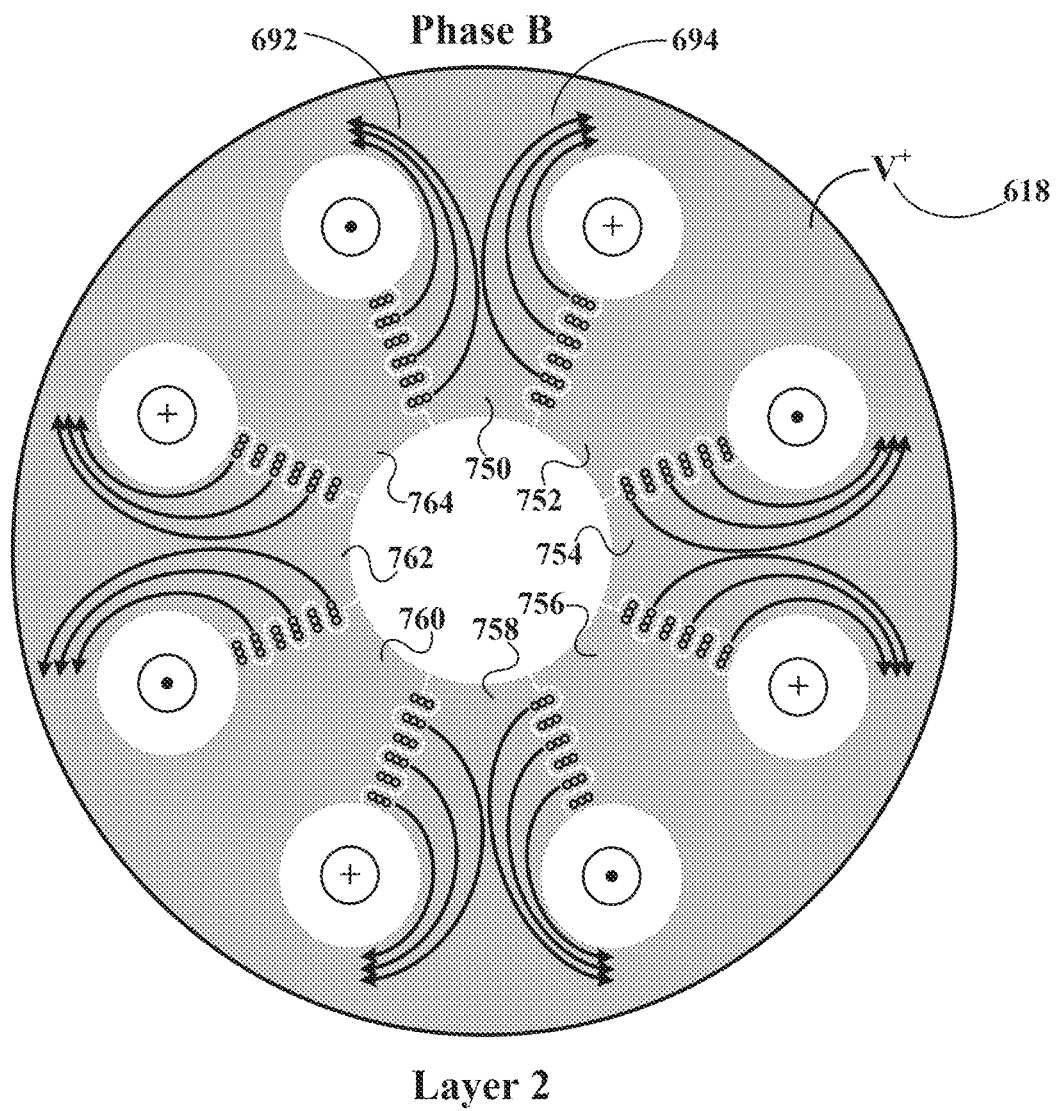
FIG. 22B represents the layout of an inner layer from the multilayer PCB depicted in FIG. 19 and the current flow during phase B.

For the magnetic structure with eight cylindrical posts depicted in FIG. 19, in Phase B, the current flows through SR1', 630, SR2', 682, SR3', 686 and SR4', 646, on the layer 1. On the layer 2, as depicted in FIG. 22B the current flows towards the outer ring, V+, 618 through the copper pads, 750, 754,758, and 762.

Figure 23A:
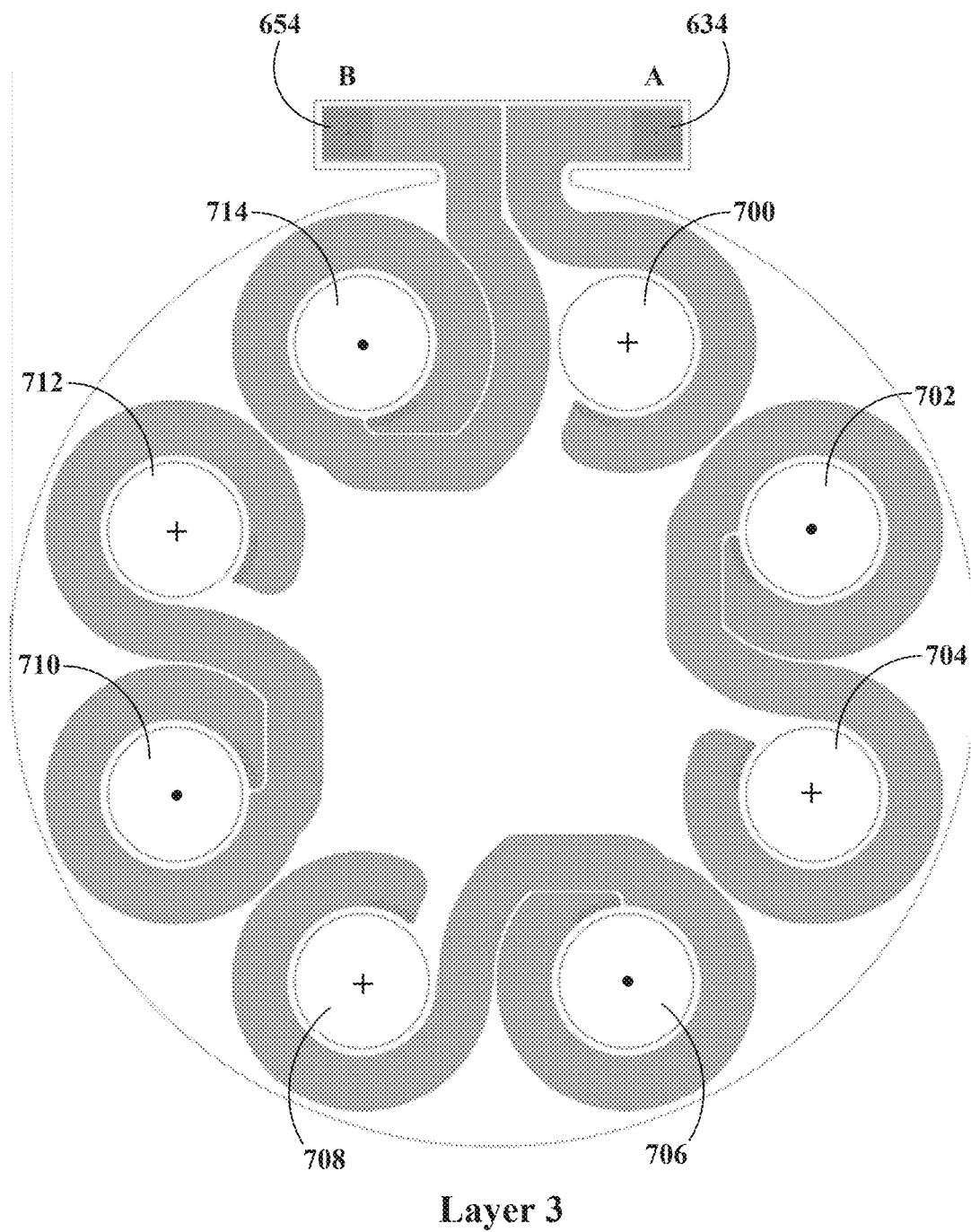
FIG. 23A represents the layout of half of a primary winding on one of the inner layers of the multilayer PCB depicted in FIG. 19.
Figure 23B:
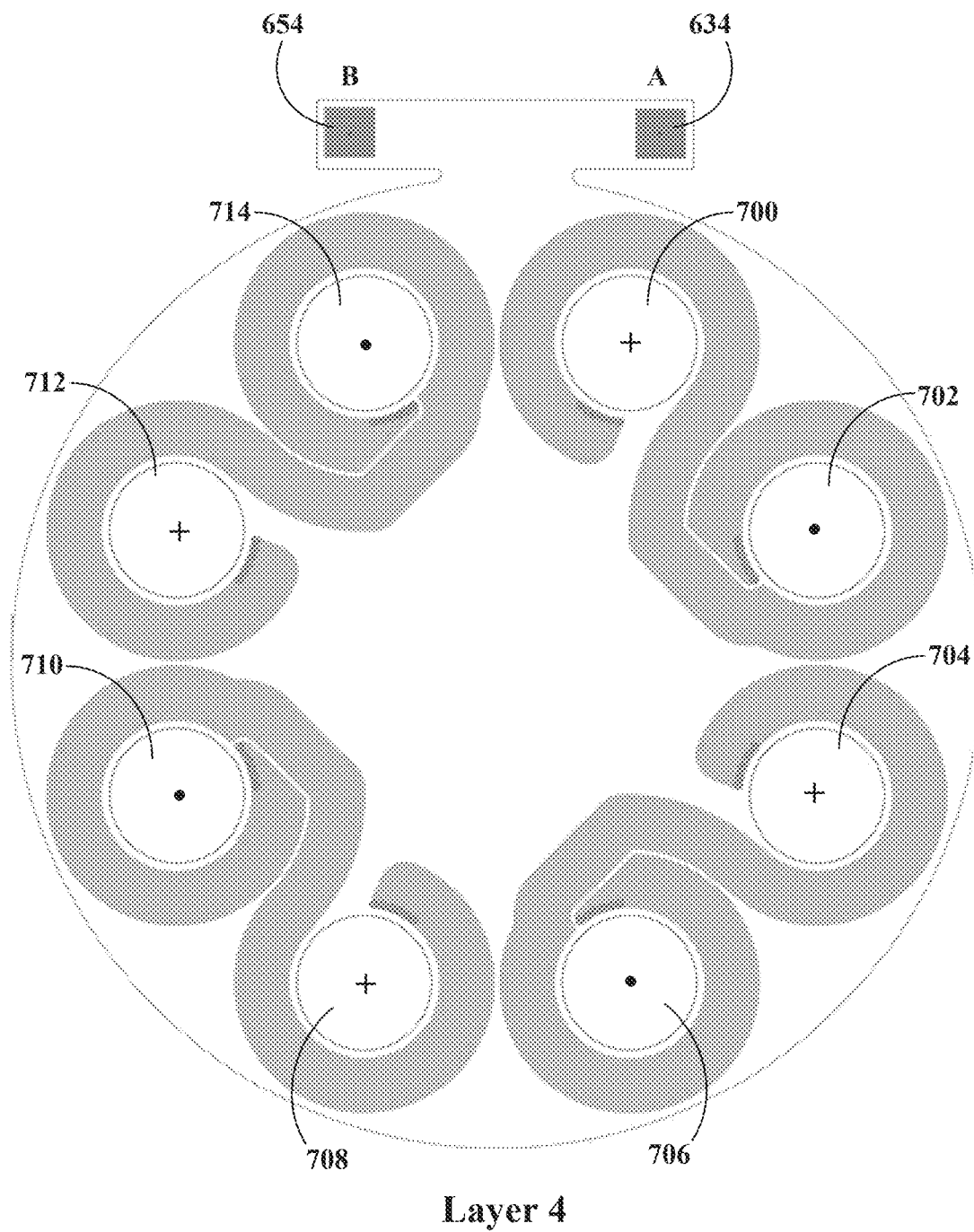
FIG. 23B represents the layout of the second half of primary winding on an inner layers of the multilayer PCB depicted in FIG. 19.

In FIG. 23A is presented the primary winding of the transformer depicted in FIG. 20. The primary winding is wound around each post as depicted in FIG. 23A and FIG. 23B. The polarity of the magnetic field induced during Phase A by the primary winding is also depicted in FIG. 23A and FIG. 23B. The connection to switching node A, 634 and switching node B, 654 is also presented from FIG. 20A and FIG. 20B.

The primary windings are placed on layer 3 and layer 4. The secondary windings depicted in FIGS. 21A and 21B and FIG. 22A and FIG. 22B are on layer 1 and on the layer 2. However, for an interleaved implementation, in which the magnetic field intensity in between primary and secondary is reduced, an additional two layers with the layout of layer 1 and layer 2 has to be added on the other side of the layer 3 and layer 4. In conclusion the secondary windings depicted in FIG. 22A and FIG. 21B sandwich the primary windings located on layer 3 and layer 4. In one option, eight synchronized rectifiers are placed on one side and another eight on the other side of multilayer PCB. In some applications, if a larger leakage inductance is required, placement is split, and on one surface layer is placed the SR1, SR2, SR3 and SR4. and then on the second surface layer, SR1', SR2', SR3', SR4'. In such a configuration during phase A the SRs on only one surface of the multilayer PCB, 604, will conduct and in the phase B the SRs on the opposite surface of the multilayer PCB, 604, phase layer will conduct. Another solution wherein we maintain a very low functional leakage inductance and reduce the number of synchronous rectifiers is placing the SRs from two power cells on one surface of the multilayer PCB and the SRs from another two power cells on the other surface of the multilayer PCB. For example, on one side of the multilayer PCB we place SR1, SR1' and SR3 and SR3'. And on the opposite side of the multilayer PCB, SR2, SR2' and SR4 and SR4'. Such a configuration would be suitable for lower power application wherein 16 SRs would not be an economic choice.

The magnetic structures presented herein, are suitable not only for Full bridge phase shifted topology but also for conventional half bridge and full bridge topologies with and without current injection. The low leakage inductance which is one of the advantages of these magnetic strictures eliminates one of the disadvantages of the convention half and full bridge topology. By using "Rompower current injection technology" presented in U.S. Pat. No. 10,574,148, the conventional half bridge and full bridge topology can have zero voltage switching while eliminating some drawbacks of the full bridge phase shifted topology. The full bridge phase shifted topology has the drawback of an increased RMS current through the primary switching elements. In addition to that the switching nodes A (634) and B (654) do not move in antiphase as it is the case in conventional half bridge and full bridge topology. As a result, a shield may be needed in between the primary winding and secondary winding to reduce the Common Mode EMI. In conventional half bridge and full bridge topology the switching node B (654) and switching node A (634) move towards the primary GND (649) in antiphase. While the voltage in switching node B (654) versus the primary GND (649) increases, the voltage in node A (634) decreases towards the primary GND (649). In such a case, the winding arrangements of the primary winding and secondary winding can be made in a such way that the displacement current injected from the primary winding into the secondary wining can be cancelled by the displacement current of opposite polarity from the primary winding to the secondary winding. The displacement current is the current injected through physical capacitance between the winding. In conclusion, by employing the magnetic structures presented herein, the leakage inductance is reduced substantially, and combining the magnetic structure disclosed herein, together with Rompower current injection technology, the conventional full bridge topology becomes more attractive in respect of performance than the full bridge phase shifted topology. The introduction on a larger scale of the full bridge phase shifted topology in the early 1990s was due at that time for the reason of recycling the leakage inductance energy and due to the fact that energy was used to obtain zero voltage switching across the primary switching elements of the full bridge. The significant reduction of the leakage inductance in the transformer by using the magnetic structure presented herein, together with the use of Rompower current injection technology, makes the conventional full bridge topology a better solution than the full bridge phase shifted topology, which was a preferred solution for more than 30 years.

The general concept of one of the parent applications to this specification, and without limiting or defining that application or this specification in any way, but rather only to provide a very quick summary of some embodiments, was to create new magnet core structures, with advantages in respect of magnetic parameters such as leakage inductance in the transformers, lower core volume for a given cross-section and higher efficiency and solutions to minimize the gap effect in transformers and minimize the and gap effect in inductive elements.

Figure 24:
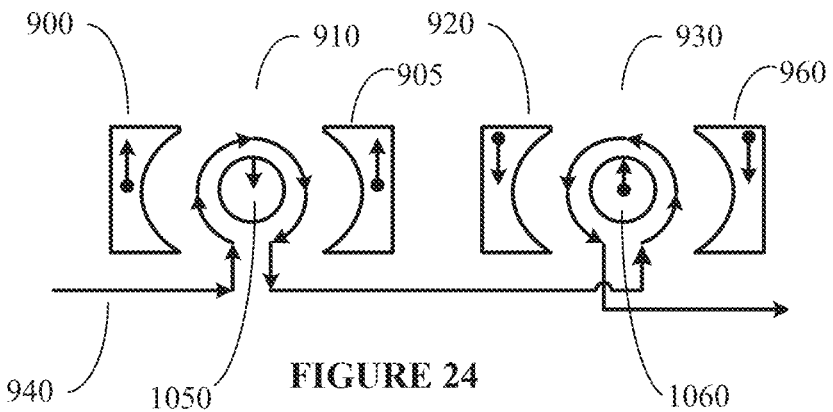
FIG. 24 illustrates two magnetic cores and two windings around a center post of the magnetic cores and the polarity of the magnetic field through each leg of the two cores.

The embodiments of this specification can apply to transformers and also to inductive elements. In FIG. 24, two E shape cores, 910 and 930 are shown, each one contains a central post and two outer legs, the core in the left side, 910 has a central post, 1050 and two outer legs 900 and 905, and the magnetic core in the right, 930 has a central post 1060 and two outer leg 920 and 960.

A winding 940 is wound around the center post magnetic core on the left, 910 and around the center post of the core on the right, 930, while the winding sense around the second center post, 1060 is in opposite direction of the winding sense around the first center post, 1050. In FIG. 24 is depicted also the polarity of the magnetic field in the center leg and in the outer legs for a current flow through the winding 940 as depicted. It is noticeable that the polarity of the magnetic field in the right leg, 905, of the magnetic core on the left, 910, has the opposite polarity of the magnetic field through the left leg, 920, of the core on the right, 930.

Figure 25:
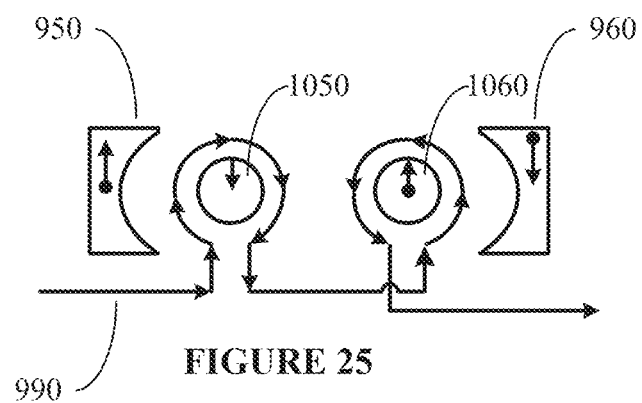
FIG. 25 illustrates the merge of the cores depicted in FIG. 24.

Because the magnetic field in the right leg, 905, of the core in the left, 910, is opposite in polarity to the magnetic field through the left leg, 920, of the core in the right, 930, the two cores can merge, and the magnetic structure depicted in FIG. 25 is created wherein the outer leg, 905 and the outer leg, 920 can be removed. This eliminates two outer legs and reduces the core volume of the magnetic structure depicted in FIG. 25.

Figure 26:
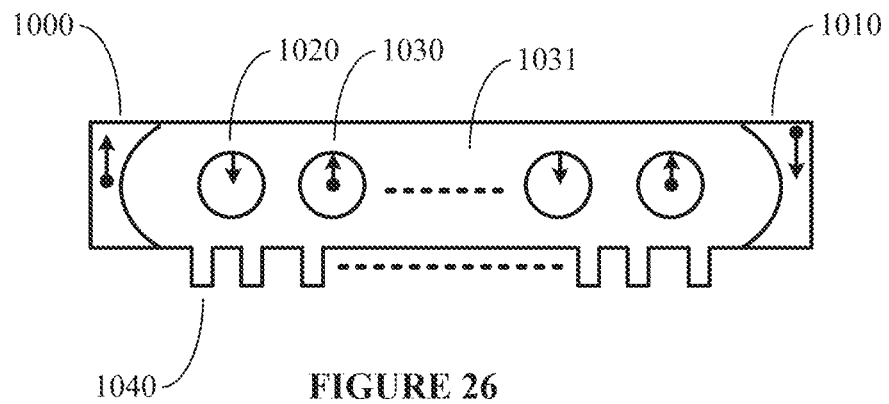
FIG. 26 illustrates an in line multiple inner posts magnetic structure.

The same logic can apply to a larger number of cores in line as depicted in FIG. 26. To be able to do this, the winding which surrounds the center post per each core should create a magnetic field through each post which has the opposite polarity of the magnetic field of the adjacent posts. In FIG. 26 the winding is embedded in a multilayer PCB structure 1031. In FIG. 26 we have a magnetic core formed by a chain of inner posts such as 1020, 1030 and so on, wherein the magnetic field through each of the posts have the same amplitude and of opposite polarity to the adjacent post. There are also two outer posts 1000 and 1010 which have a magnetic field of opposite polarity to the post adjacent to it and half amplitude. The cross-section of the outer legs 1000 and 1010 it is smaller than the cross-section of the inner legs, 1020, 1030 and so on, and said cross-section of the outer legs can be between half of the cross-section of the inner legs to the cross-section of the inner legs.

Figure 28A:
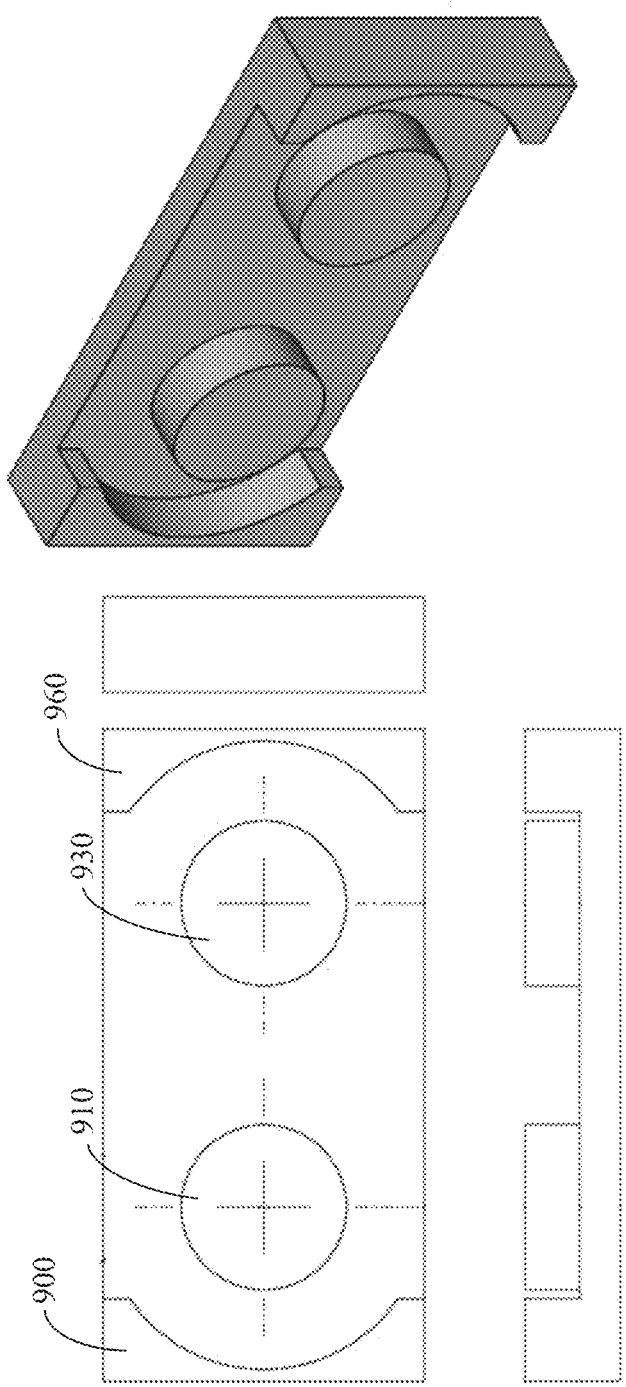
FIG. 28A illustrates a dual inner leg magnetic core in plan, side, front, and perspective views.
Figure 28B:
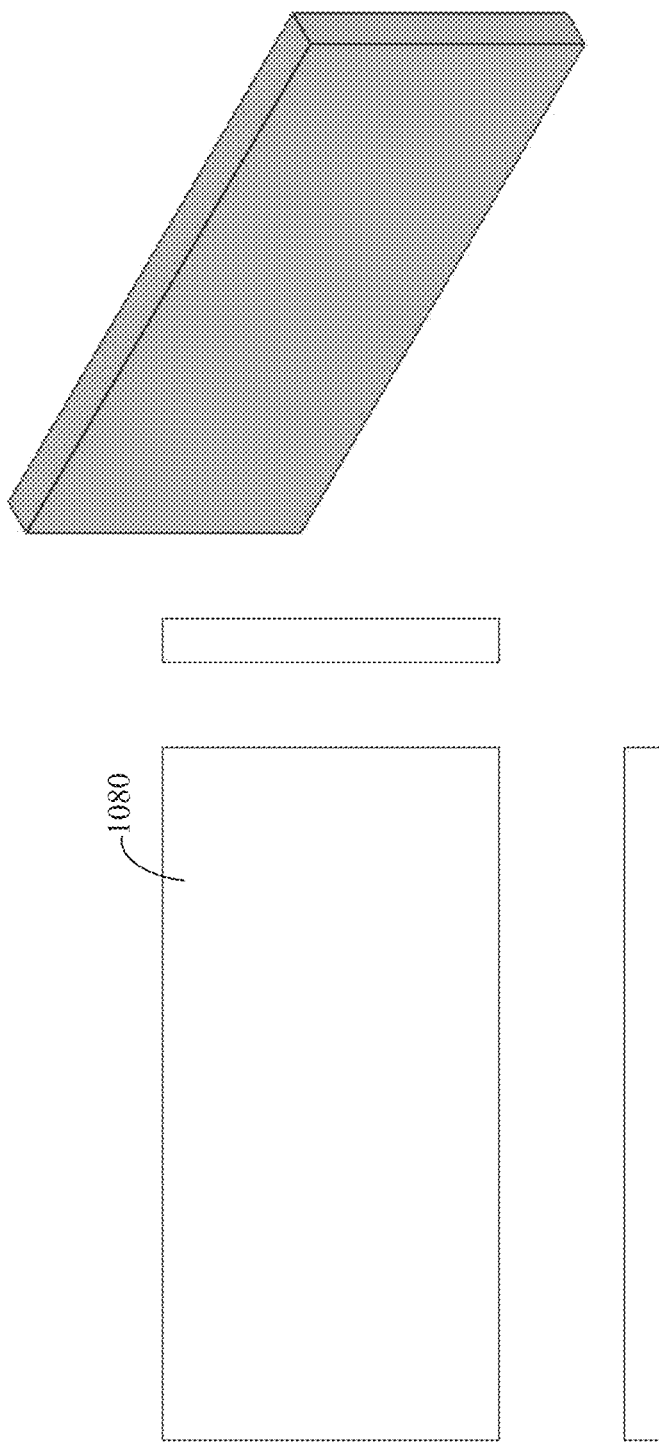
FIG. 28B illustrates an I section core which is used together with the magnetic core from FIG. 28A, shown in plan, side, front, and perspective views.

In FIG. 28A is presented the mechanical drawing of a core having two inner posts, 910 and 930 posts and two outer legs, 900 and 960. The cross sections of the outer posts are half of the cross section of the inner posts; in other embodiments, the cross sections of the outer posts are equal to those of the inner posts, and in other embodiments, the cross sections of the outer posts are between half of and equal to the cross sections of the outer posts. This magnetic structure, is referred to herein as "dual inner posts, E core." A complete magnetic core can be formed by using two "dual inner post E core" or by using only one "dual inner posts E core" structure together with an I plate, 1080 as depicted in FIG. 28B.

Figure 27:
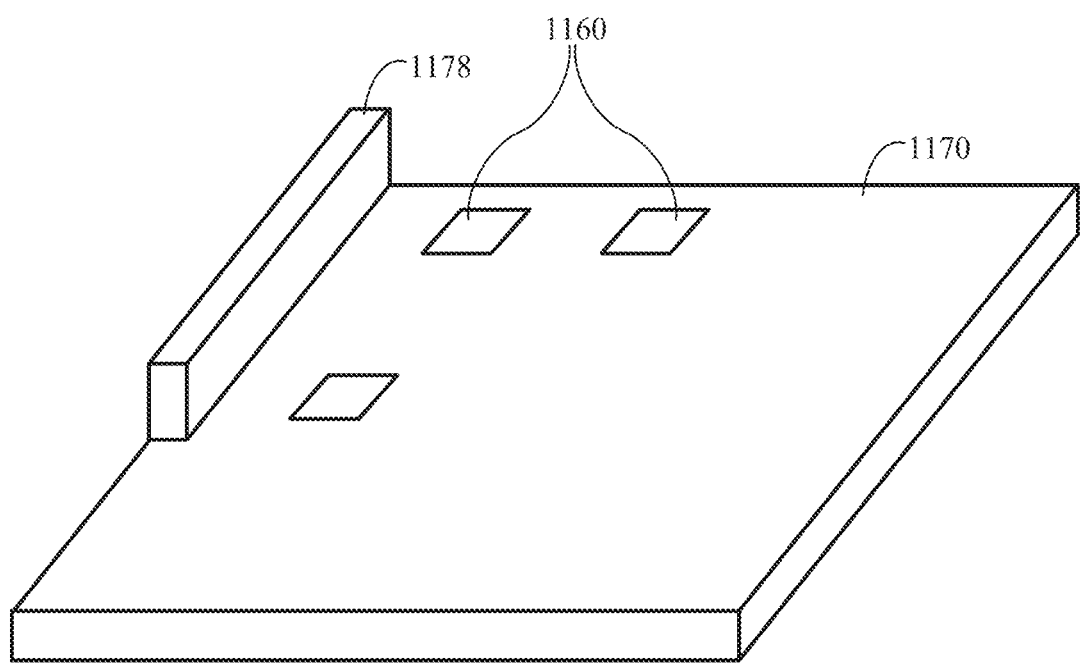
FIG. 27 illustrates packaging in which the magnetic structure of FIG. 26 is used.

In FIG. 26 the multilayer PCB magnetic structure, 1031, has pins, 1040, which are used for the interconnection with the mother board 1170 as depicted in FIG. 27 and also for mechanical support. In FIG. 27 is presented a simplified package of a power converter which contains a mother board, 1170, several SMD components such as 1160 and a vertically mount magnetic element m 1178. The vertically mount magnetic element can be the magnetic element of FIG. 26, wherein its pins, 1040 are inserted into the mother board 1170. Inductors and transformers may be wound on this magnetic core. In FIG. 25 is depicted the dual inner post magnetic core with a winding arrangements for using this core as an inductor. The air gap wherein most of the energy is stored can be placed in the inner posts only in most of the applications or can be distributed and placed in the outer legs as well. This magnetic structure can be also easy to gap the inner posts, which is a cost advantage. The advantage of using this magnetic core which is also referred to herein as "in line multiple inner posts magnetic core", as an inductor is that it creates a distributed gap inductance which will significantly reduce the gap effect wherein the fringe magnetic field cut into the copper winding and leads to power dissipation reducing the efficiency of the inductor.

Another advantage of this multiple inner posts magnetic core is that is shaped in a way wherein we can reduce the diameter of the inner posts and have a low profile vertically mount inductor as depicted in FIG. 27. In vertically mount conventional E core in order to reduce the height, for vertical mounting, is needed to reshape the round center post into an oval shape and the outer legs would be on top and bottom of the low-profile magnetic element, reducing the winding area for a given maximum height specification.

In the "in line multiple inner posts magnetic core" the outer legs are reduced to the left outer leg and the right outer leg and the space in between the inner posts are used for the winding only. This is possible because the magnetic field is weaving through each inner post and through the plates which are attached by the inner posts. Because the magnetic field is weaving though the inner posts and the plates surrounding the inner posts, the magnetic field is mostly parallel the copper winding embedded in the multilayer PCB reducing the proximity losses.

This type of inductive element using the multiple inner posts magnetic core can be used for building the inductive element for the PFC choke or other similar application such as output inductance in buck converters or other type of similar applications. The distributed air gap in the multiple inner posts is a major advantage in such applications, reducing the gap loss and reducing the EMI.

Figure 29:
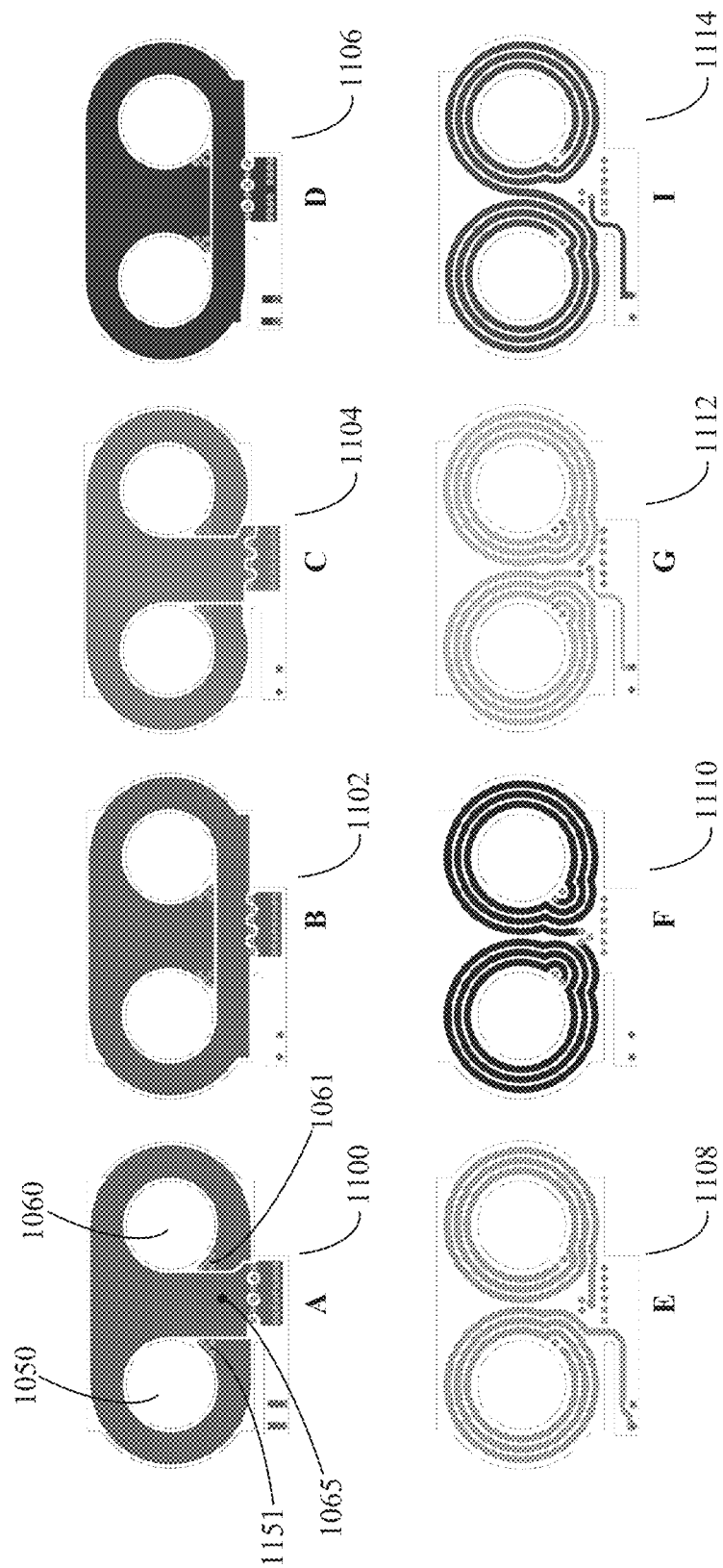
FIG. 29 illustrates the windings in an eight layer multilayer PCB using the core of FIG. 28A.

The magnetic core structure, referred to also as multiple inner posts magnetic core, can be used also in transformer structures such as one depicted from FIG. 29 wherein the inner layers of the multilayer PCB are presented for a turn ratio of 12:2 per each inner leg. The layers in the multilayer PCB are designed for a dual inner leg structure depicted in FIG. 25.

In FIG. 29, layer A, is presented the winding technique for one turn around each inner leg 1050 and 1060. Both windings originate from the trace 1065, located in between the inner posts, 1050 and 1060. The one turn winding around the post 1050 is wound counterclockwise and encircles the inner post 1050 and connected to the via 1051. The other one turn winding around the post 1060 is wound clockwise and encircles the post 1060 and further connects to the via 1061. Both one turn windings encircle the post 1050 and 1060 and continue on the layer B, 1102. The one turn winding encircles the inner post 1050 counterclockwise and the other one turn winding encircles the inner post 1060 clockwise. Both one turn windings form the layer B,1102 are connected together via the trace 1063.

These two turns wound around each inner leg are in parallel with common connection at the trace 1065 at one end and at the trace 1063 at the other end. Using this winding technique on layer A,1100 and layer B, 1102, two turns are wound around each of the inner posts 1050 and 1060 and both of the two turns around each inner posts are in parallel with each other. This winding technique leads to a very low impedance by comparison with standard winding techniques and it is one of the embodiments presented herein.

The primary windings are wound on the layer, E,1108, F, 1110, G, 1112 and I, 1114. There are a total of twelve turns wound around the inner leg 1050, anticlockwise and 12 turn are wound around the post 1060 clockwise. The twelve turns wound around the inner post 10590 are in series with the twelve turns wound around the inner post 1060.

A transformer using the winding technique depicted in FIG. 29, on a dual inner leg, has a very low leakage inductance and a very low dc impedance on the secondary windings in case wherein the winding technique form FIG. 19 is implemented. The secondary windings were embedded in the layer A, 1100, B, 1102, C, 1104 and D, 1106.

Figure 30:
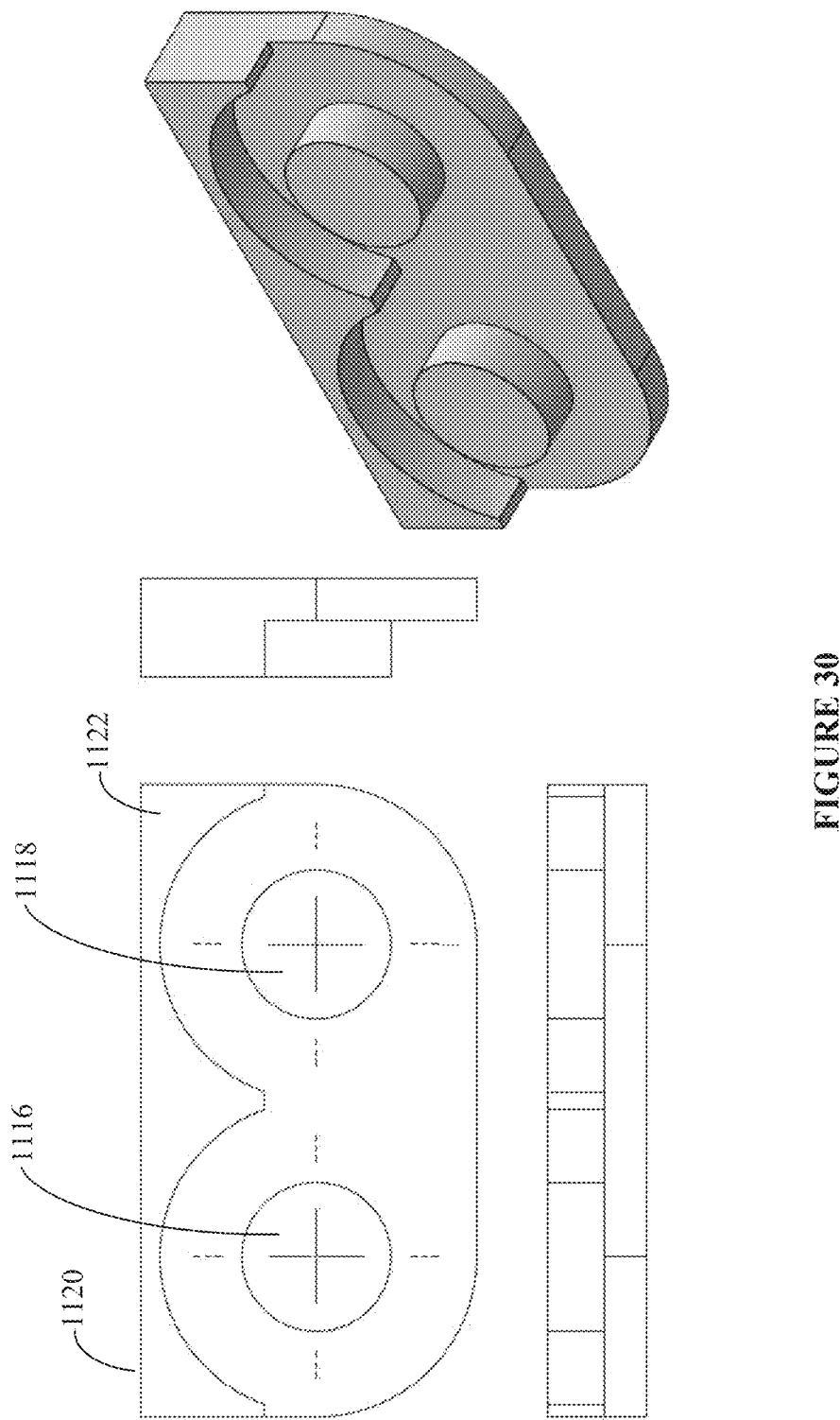
FIG. 30 illustrates another embodiment of the dual inner leg magnetic structure, in plan, side, front, and perspective views.
Figure 31:
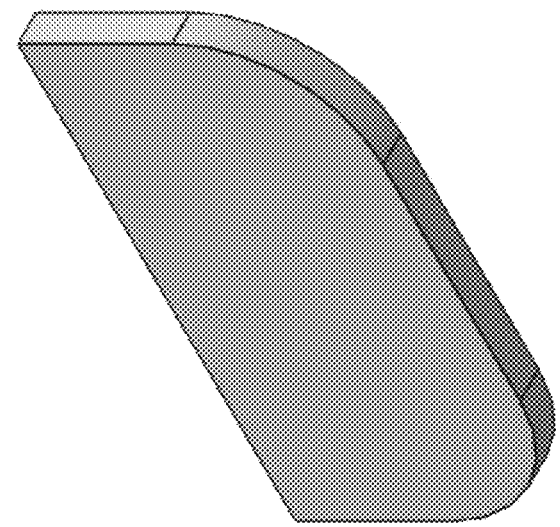
FIG. 31 illustrates the I section of the magnetic core from FIG. 30, in plan, side, front, and perspective views.
Figure 31:
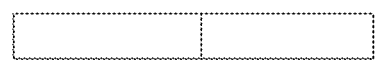
Figure 31:
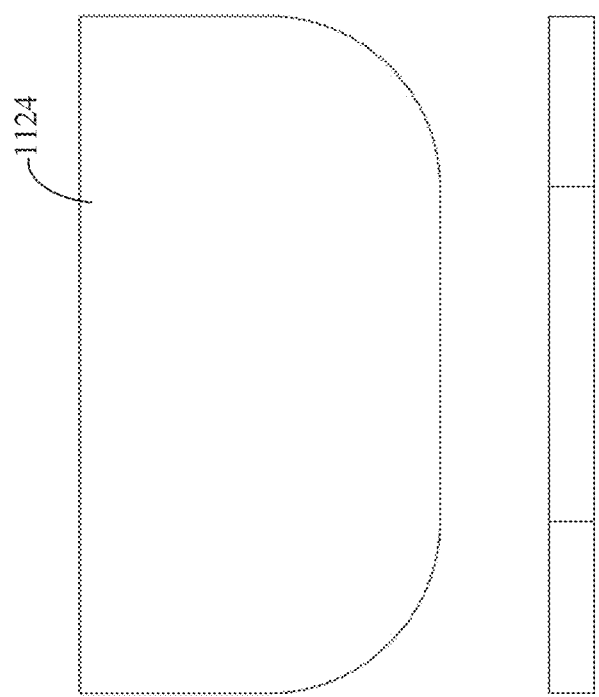

In some applications, the outer legs of the dual inner post magnetic structure depicted in FIG. 15 and FIG. 29 (the A layer), are rotated 90 degrees; such a magnetic core is depicted in FIG. 30. In the magnetic structure from FIG. 30 there are two inner posts 1116 and 1118 (shown in plan view in an engineering drawing and in perspective view) and the outer legs 1120 and 1122 are rotated 90 degrees. This magnetic structure has all the properties of the in line dual center post and has the advantage of a reduced length. In FIG. 31, is depicted the I section, 1124, associated with magnetic structure depicted in FIG. 30.

Figure 32A:
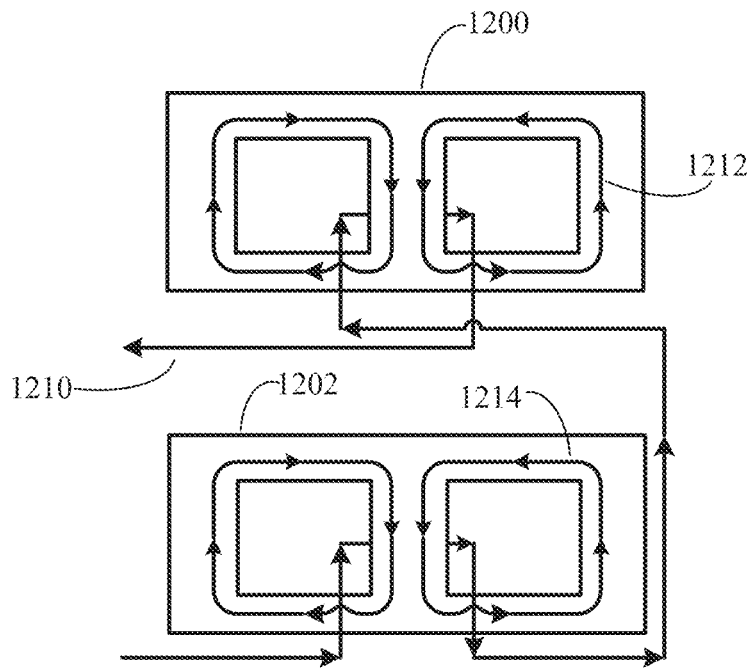
FIG. 32A is an electrical schematic illustrating two magnetic cores and two winding around the center post of the magnetic cores and the polarity of the magnetic field through each leg of the two cores.
Figure 32B:
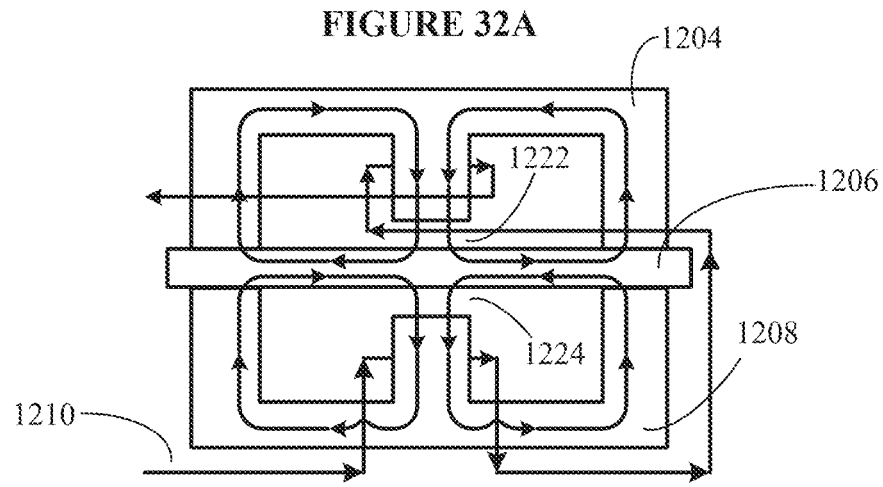
FIG. 32B is an electrical schematic illustrating the merge of the cores depicted in FIG. 32A.

In FIG. 32A are depicted two magnetic cores 1200 and 1202. A winding 1210 is wound around the center post of the core 1202 and around the center post of 1200. The magnetic field is produced in both cores, 1212 in the core 1200 and 1214 in the core 1202. In the event the core 1200 is placed on top of the core 1202 the magnetic field through the bottom side of the core 1200 is in opposite direction of the magnetic field through the top section of the magnetic core 1202. As a result, a core structure can be described by merging the cores 1200 and the core 1202, and this magnetic structure is formed by the core 1204, the magnetic plate 1206 and the core 1208. The magnetic field through 1206 is very small because the magnetic field produced by the winding 1210 in the core 1208 it is in opposite direction of the magnetic field produced by the winding 1210 through the core 1204. The plate 1206 can be much thinner than the plates of the cores 1204 and core 1208. The winding 1210 can be conventional winding or can be embedded in multi-layer PCB in the way is depicted in FIG. 32C.

Figure 32C:
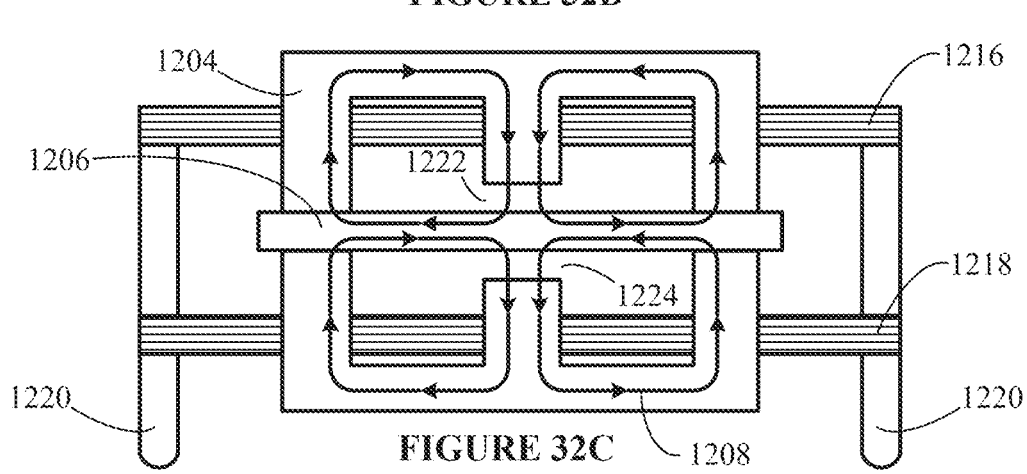
FIG. 32C is an electrical schematic illustrating the magnetic structure depicted in FIG. 32B wherein the windings are embedded in two multilayer PCB.

In FIG. 32C the winding 1210 is embedded in two multilayer PCB 1216 and 1218. The pins 1220 merge the connection between the winding embedded in multilayer PCB 1216 and 1218 and the mother board.

By merging two magnetic cores when the magnetic field in the bottom of one core is it in of opposite polarity of the magnetic field through the top of the second core, the plates which are connected can be reduced in size because the magnetic field is cancelled. The common plate 1206 can be totally removed but, in many applications, it is kept in order to accommodate two air gaps such as 1222 and 1224 from FIG. 32B and FIG. 32C.

Referring back to FIG. 3A, shown there is a circuit having a transformer structure with a primary winding (38) and a center tap secondary winding formed by winding 34 and winding 36 and two rectifiers means 30 and 32. The secondary windings not connected to the rectification means are connected together to "+", (46) The common" connection of the rectifier means 30 and 32 are also connected together to "−", (44).

FIG. 3B depicts an implementation of the circuit from FIG. 3A on a U magnetic core, wherein the common connection of rectifiers means (30) and (32) are connected to a conductive ring which encircle the magnetic core legs 54A and 54B.

In the implementation presented in FIG. 3B, the common connection between 30 and 32 is electrically connected to the conductive ring 44 referred also as "−". The common connection of the secondary windings 34 and 36 is electrically connected to the ring 46, referred also as "+".

In the event that the circuit from FIG. 3A implemented as in FIG. 3B applies to a Pulse Width Modulation topology in between "+" and "−", there is a voltage swing with high dv/dt. The parasitic capacitance created by the totem pole placement of 44 and 46 negatively impacts the operation of the converter in which the circuit from 3A and the magnetic structure from 3B is implemented.

Figure 4A:
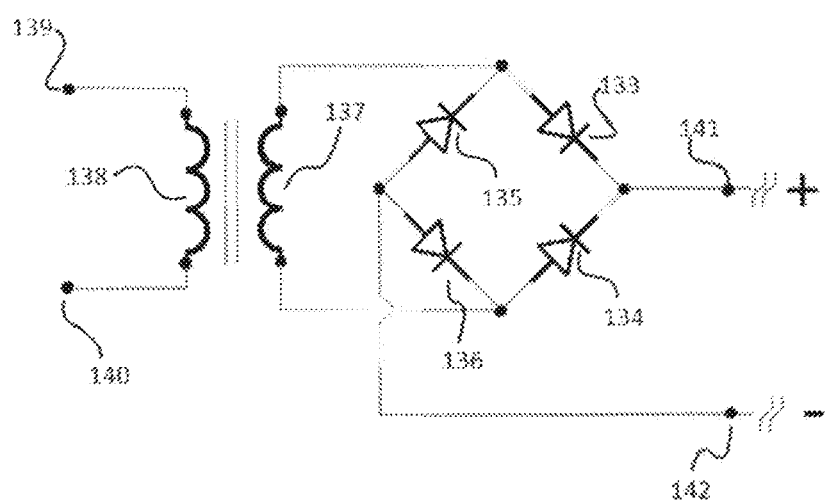
FIG. 4A shows a transformer structure without the center tap using a full bridge rectification.
Figure 4B:
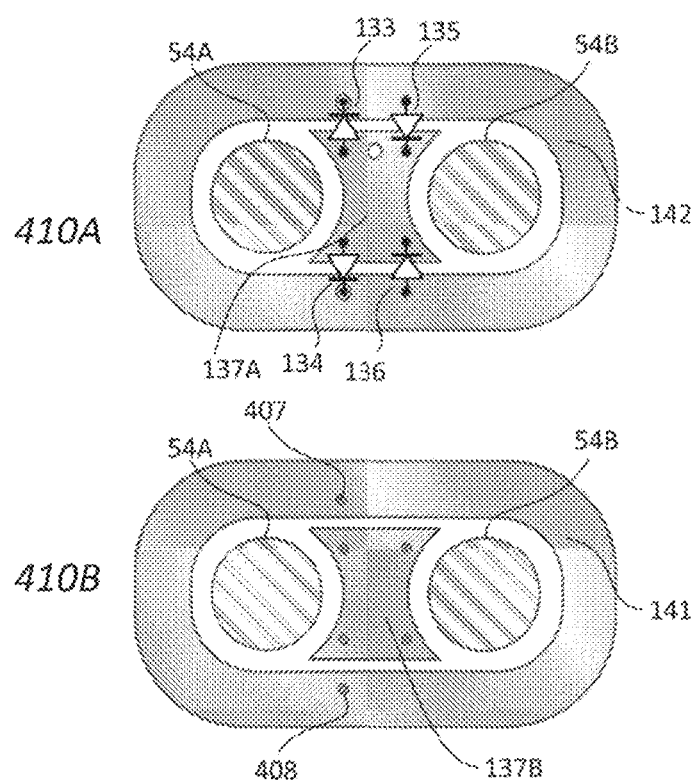
FIG. 4B shows the secondary winding implementation of the transformer presented in FIG. 4A.

FIG. 4A presents another circuit which has only one primary winding 138 and only one secondary winding 137. There are four rectifier means 133, 134, 135, and 136, connected in bridge, and the common connection between 133 and 134 form the "+" connection and the common connection between 135 and 136 form the "-m" connection. In FIG. 4B, the "+" connection is electrically connected to the conductive ring 142 and the "−" connection is electrically connected to the "−" conductive ring, 141, and these two rings are placed on top of each other. As a result, a parasitic capacitance is formed. This parasitic capacitance negatively impacts the operation of the converter wherein the subcircuit from FIG. 4A is implemented in a circuit wherein Pulse with Modulation topology is used.

In a Pulse Width Modulation topology such as half bridge, full bridge, or double ended forward topology, a parasitic capacitance in between "+" and "−" has a negative effect.

FIG. 5A presents the equivalent electrical circuit wherein the transformer uses a four-leg magnetic core as depicted in FIG. 11. The rectifier means 376, 380, 374, and 378 have the anode connected together and are connected to "V−". The magnetic implementation depicted in FIG. 5B, wherein the rectifier means have the anodes connected together to the electrically conducting ring, 384, which encircles all four magnetic core legs, 386A, 386B, 386C, and 386C. The "V+" is connected to the electrically conductive circle 382. The electrically conductive ring, 384, is placed on layer 70a and 70b. The electrically conductive ring 382 is placed on the layer 70c and 70d. Parasitic capacitances are developed between 382 ring and 384 ring. In the event the electrical-magnetic circuit depicted in FIG. 5A is implemented as described in FIG. 5B and is used in a pulse width modulation topology, the parasitic capacitances between 384 and 382 negatively impact the operation.

Another implementation of the circuit depicted in FIG. 5A is depicted in FIG. 7A wherein the implementation for the secondary winding is done in only two layers.

One layer is connected to the anodes of the rectifier means 376, 380, 374, and 378, and that layer is "V−", layer labeled 384. The second layer connected to "V+", is 382. The second 384 and 382 are placed on top of each other and, as a result, this will create a parasitic capacitance. In the operation of a pulse width modulation topology, the parasitic capacitance has a negative impact in the operation of the converter. This is because the parasitic capacitance is between two layers which experience a large dV/dt in between each other.

This magnetic structure is suitable for topologies wherein the "V+" and "V−" do not move against other with a high dV/dt. Such a topology is the resonant topology such as LLC. In such topologies, a resonant capacitor CR is placed in between "V+" and "V−". Such a circuit is presented in FIGS. 33A and 33B.

Embodiments of FIGS. 33-41

Figure 33A:
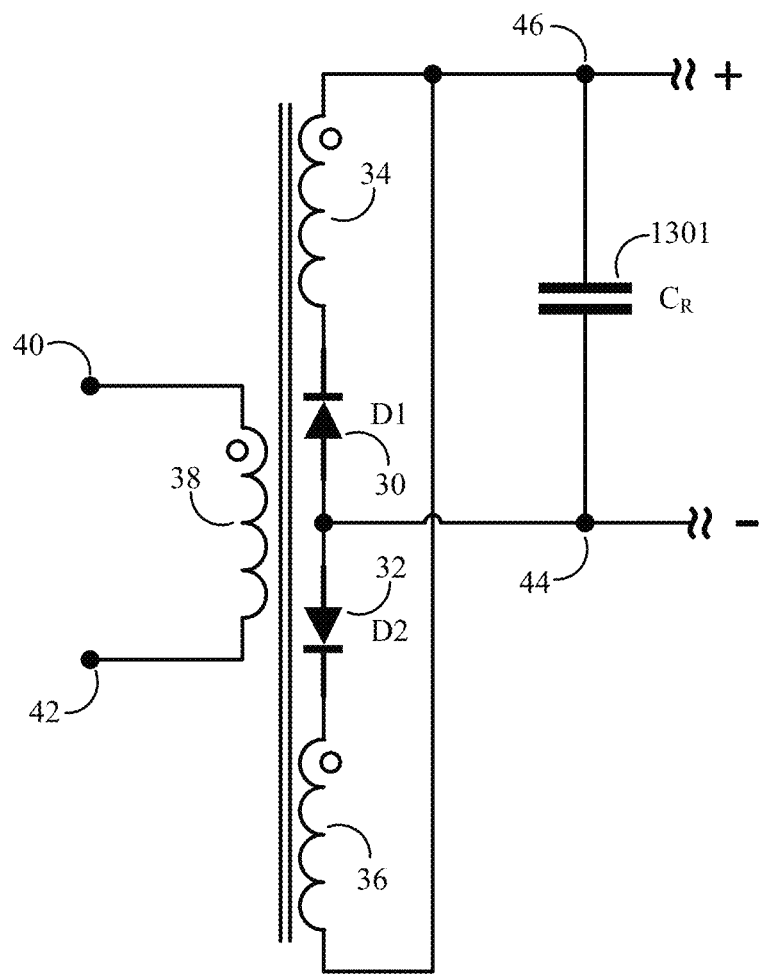
FIG. 33A depicts a center tap double ended resonant power train.
Figure 33B:
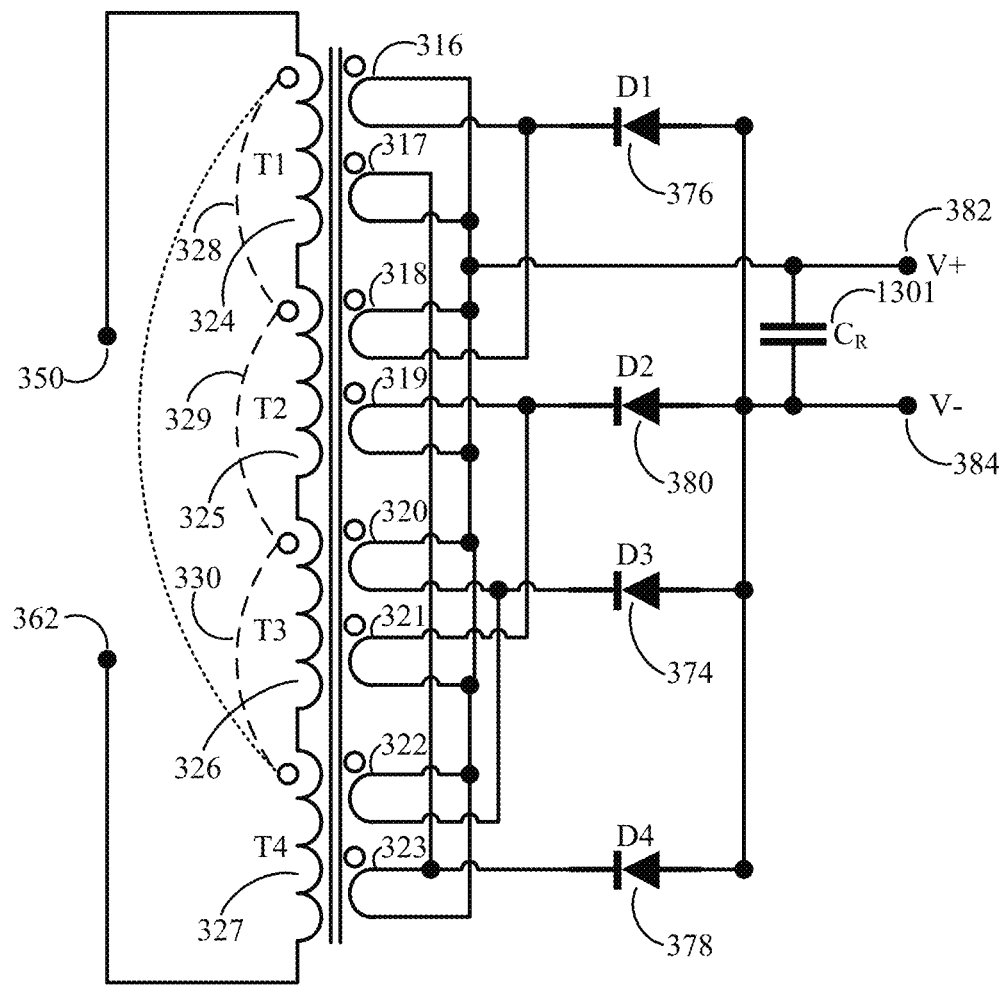
FIG. 33B depicts a center tap double ended resonant power train in a four-legged magnetic configuration.

The embodiments shown in FIGS. 33A and 33B include a resonant capacitor between "V+" and "V−". This gives an advantage to the magnetic implementation presented in FIG. 3B, 4B, 5A and 7A. That is presented in FIGS. 33X, 33C, and 33D.

The double ended topologies such as half bridge and full bridge have an operation with two phases. In one of the phases, one of the secondary rectifiers is conducting, and in the other phase, the second rectifier means is conducting. This description defines "phase A" for the conduction of one of the rectifier means and "phase B" wherein the second rectifier means is conducting. For example, in FIG. 33A, during phase A, D1,30, is conducting, and during the phase B, D2, 32, is conducting. In FIG. 33B, in phase A, D1, 376, and D2, (380) are conducting, and during phase B, D3, 374, and D4, 378, are conducting.

Figure 33X:
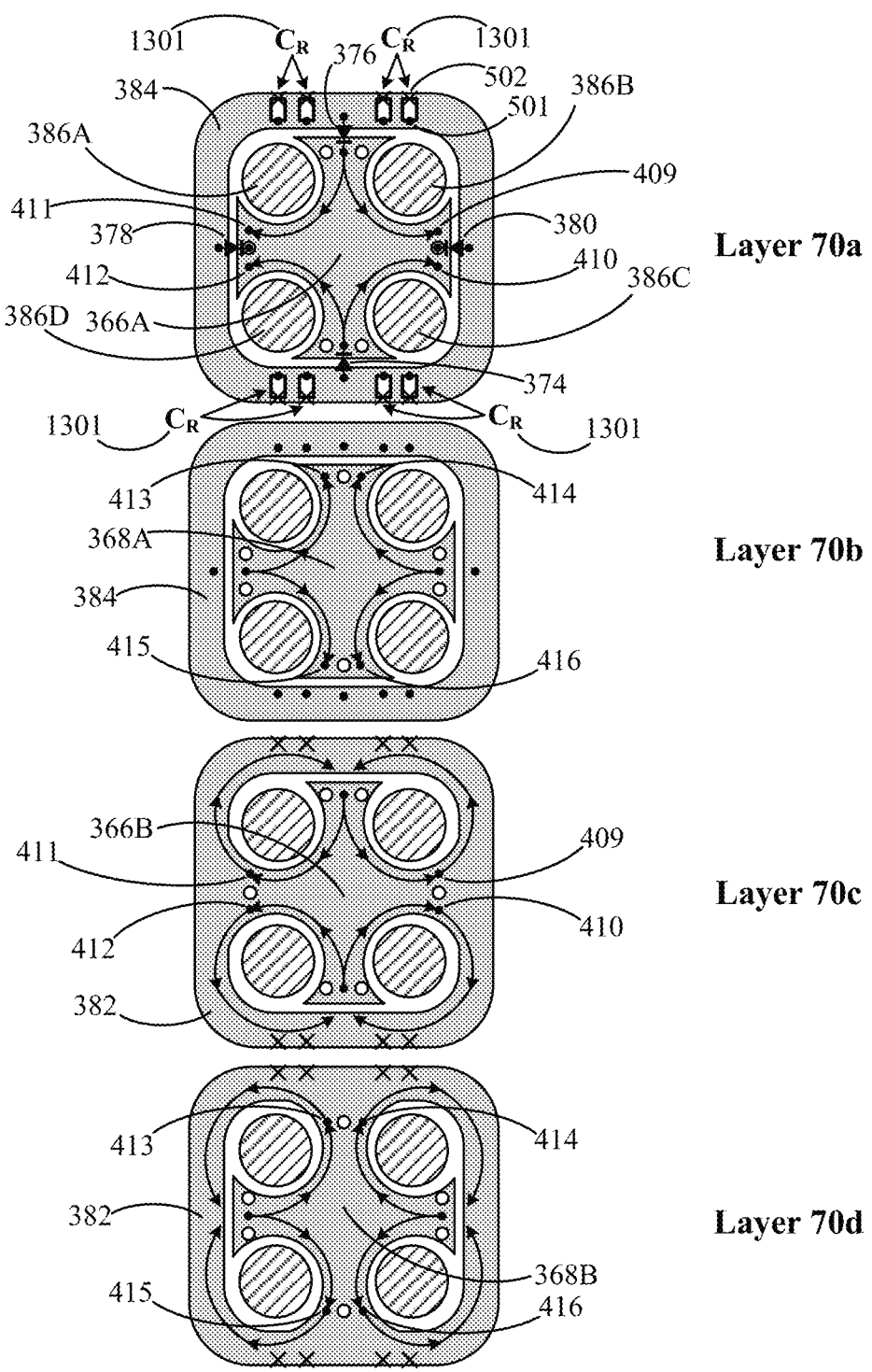
FIG. 33X depicts the multilayer implementation of the double ended resonant power train in a four-legged magnetic configuration and using four layers for the secondary.

In FIG. 33X, during phase A, the current in the secondary circulates on layer 70a via the rectifier means (376) and via the rectifier means (374), from the conductive ring, 384, through the copper pads placed in between the magnetic core posts, 386A, 386B, 386C and 386C. towards the vias 409 and 411 respectively 410 and 412. Further on layer 70c the current circulates through the electrically conductive ring, 382, which encircles from outside all the magnetic flux conductive posts, 386A, 386B, 386D, 386C.

In FIG. 33X, during phase B the current in the secondary circulates on layer 70b via the rectifier means (378) and via the rectifier means (380) from the conductive ring, 384, and further through the copper pads placed in between the magnetic core posts, 386A, 386B, 386C and 386C, towards the vias 413 and 414 respectively 415 and 416. Further on layer 70d the current circulates through the electrically conductive ring, 382, which continuous ring encircles from outside all the magnetic flux conductive posts, 386A, 386B, 386D, 386C. The presence of the conductive outer rings 384 and 382 yields an advantage to the magnetic structure presented in FIG. 33X in applications such as, without limitation, LLC magnetic configuration. The presence of the conductive outer rings enables an effective cancellation of the magnetic field produced by primary windings which encircle the four posts, 386A, 386B, 386C and 386C.

The presence of the conductive outer rings enables a symmetrical distribution of the current flow in the secondary, and the presence of the large inner conductive pads to which all the rectifiers' means are connected such as 376, 380,378 and 374 enables the secondary current to flow freely on the optimized path in order to cancel the magnetic field produced by the primary windings.

Resonant capacitors, CR, 1301, are placed on the conductive ring 384. These resonant capacitors are electrically connected between the ring 384 and the ring 382, which means that there are connected between "−" and "+". The resonant capacitors are placed on the surface of the PCB, on the surface which has the ring 384 and on the other surface of the PCB which has the ring 382.

Figure 34A:
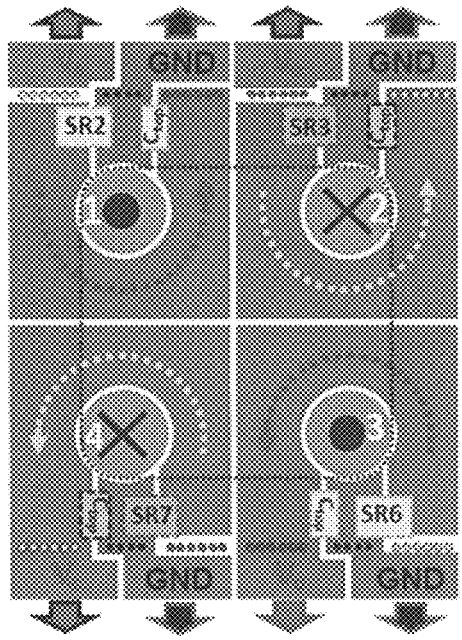
FIGS. 34A, 34B, and 34C depict a four-legged magnetic structure in a LLC topology.
Figure 34B:
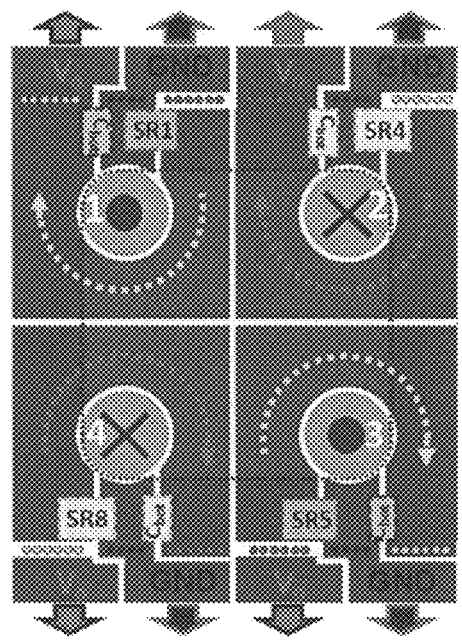
Figure 34C:
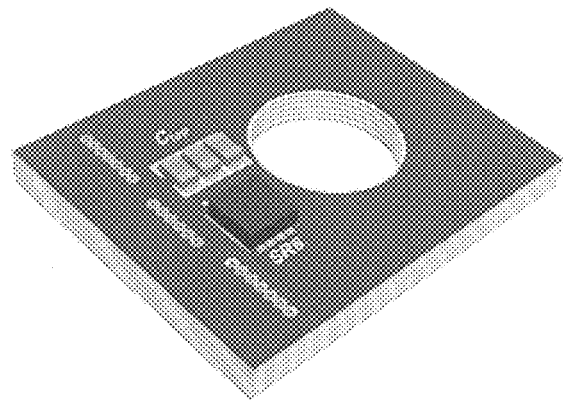

In FIGS. 34A, 34B, and 34C, the resonant capacitors and the rectifier means are independent per each leg and there is not a continuous copper plane for "V+" 382 and "V−" 384 to allow the secondary currents to optimally cancel the magnetic field produced by the primary. As presented in FIGS. 34A, 34B, and 34C, the copper plane is cut in order to separate the resonant capacitors and the rectifier means per each leg, and that reduces the effectiveness of the minimum impedance current flow for the cancellation of the magnetic field produced by the primary.

In one of the embodiments of this specification, the inner conductive pads together with the rectifier means and conductive outer rings, all of which surround the magnetic posts, form a continuous conductive path allowing the secondary currents to flow freely on the most optimized conductive path in order to cancel effectively the magnetic field produced by the primary winding. This minimizes the effective impedance of the secondary winding, reduces the termination losses, and reduces the leakage inductance between the primary and secondary winding.

FIGS. 33C and 33D illustrate a layout implementation of the circuit presented in FIG. 33B.

The implementation is formed by two layers, the layer 1, 1330, electrically connected to "V−", 384, and the layer 2, which is electrically connected to "V+", 382. The resonant capacitors can be placed on layer 1 or layer 2 or both, wherein layer 1 (1330) and layer 2 (1340) are placed on the surface of the multilayer PCB which contains layer 1 and layer 2 and the layers wherein the primary windings are placed.

In FIG. 33C, the resonant capacitors placed on layer 1 are in parallel and labeled CR, 1301. The capacitors forming CR, 1301 are electrically connected between "V−" (384) and "V+", 382. The resonant capacitors are preferably spread around the copper ring 1323 from FIG. 33C and/or on the copper ring 1324. The resonant capacitors CR, 1301, are preferably spread uniformly around the multilayer PCB which surrounds the four magnetic posts 386A, 386B, 386C and 386D in such way that the current that flows around each of those magnetic posts and closes to each end of said resonant capacitors. The uniform spread of the resonant capacitors minimizes the impedance path of the current flowing in the secondary through the rectifier means, D1, D2, D3 and D4, the copper pads in between the said magnetic posts, 1321, through the copper rings 1323 and 1324 and the resonant capacitors CR, 1301, in such a way that the magnetic field produced by the primary winding surrounding said magnetic posts is cancelled. FIG. 7b on layer 3, 4, 5, 6, 7 and 8 presents an example of the primary winding which surrounds said magnetic posts.

As presented in FIG. 33C and FIG. 33D, there are at least two rectifier means for each phase. For the first phase A, D1, (376) and diode D2, (374) conduct. During the phase B, D4, (378) and D3, (380) conduct.

The resonant capacitors which form CR (1301) are placed on the copper ring which surrounds the four magnetic posts, 386A, 386B, 386D and 386C in a uniform equidistant way. Each resonant capacitor is connected with one end to "V−" (384) and with the second end to "V+" (382) through the vias.

During phase A (from FIG. 33C), the current flows via D1, (376) and D2, (374) into the copper pad 1321, which is placed in between the magnetic posts 386A, 386B, 386C and 386D. The current flows on the minimum impedance path towards the vias 315, 316, 317 and 318, or any other vias which can be additionally placed to minimize the conductive path impedance and further to the layer 2, (1340) which is connected to "V+', (382) flowing to the vias placed close to one end of capacitors CR, 1301 which capacitors are connected with the other end to the conductive ring 1323 on the layer 1, 1330.

During the phase B (from FIG. 33D), the current flows via rectifier means D3, (380) and D4, (378), to the vias 311 and 314 to the layer 2 (1340), around the magnetic posts and to the vias which are connected to one end of the resonant capacitors CR, 1301, as depicted in FIG. 33D, said CR capacitors having the other end connected to the conductive ring 1323 on the layer 1, 1330.

In the implementation depicted in FIGS. 33C and 33D, the secondary winding, for one turn implementation, is implemented on only two layers. The current flows on both layers surrounding the four magnetic posts 386A, 386B, 386C and 386D, on the lowest impedance path to cancel the magnetic field produced by the primary winding as depicted in FIGS. 33C and 33D. The resonant capacitors CR are placed around the magnetic posts 386A, 386B, 386C and 386D in such way that the secondary current flowing through the rectifier means D1, D2 D3 and D4 further flows through the copper pads, 1321 in between said posts and further through the copper rings around said magnetic posts 386A, 386B, 386C and 386D to the termination of resonant capacitors CR (1301) in order to follow the minimum impedance path and minimize the conduction.

One implementation solution is to place the primary windings on a number of layers inside of the multilayer PCB. The primary windings in the multilayer PCB are sandwiched between two sets of two-layer PCBs, and one layer of the set is placed towards the primary windings and the other layer of the set is on the surface of the final structure. The layers containing the primary winding are sandwiched in between two sets of two layers of PCB, each one having a layer 1, 1330 and layer 2, 1340 wherein layer 1 of each set of two layers PCB is on top of the final PCB structure and the layer 2 is placed towards the multilayer PCB containing the primary windings.

One implementation solution is to place the primary windings on a number of layers inside of the multilayer PCB and have two sets of two layers PCB, each one having a layer placed towards the primary windings and the second layer on the surface of the final structure which contains the primary windings and the additional two sets of layers of two layers PCB. The layers containing the primary winding are sandwiched in between two sets of two layers PCB, each one having a layer 1, 1330 and layer 2, 1340 wherein layer 1 of each set of two layers PCB is on top of the final PCB structure and layer 2 is placed towards the layers containing the primary winding.

For applications for higher output currents, one turn secondary is a preferred embodiment. The placement of the rectifiers can be implemented as suggested in FIGS. 33C and 33D. The primary winding is wound around each post as depicted in FIG. 7B on the layers, 3, 4, 5, 6, 7 and 8. For a larger input voltage range, for which more turns are needed, more magnetic posts can be also utilized. Magnetic length will be longer and that will impact the reluctance of the magnetic core. An increased number of magnetic posts as presented in FIGS. 18 and 19 and using one turn secondary will lead to better coupling and a lower leakage inductance.

Another embodiment uses an increased number of magnetic posts by using a multitude of four leg core. A magnetic structure uses 4, 8, 12, n*4 numbers of posts, where "n" being the number of four legged cores. The primary winding is wound around the n*4 magnetic posts and with one turn in secondary; this creates an increased coupling which means very low leakage inductance. The rectifier means is preferably placed as shown in FIGS. 5B, 33X, 33B, and 33C.

Each four-legged magnetic core forms a magnetic cell. A magnetic cell is a magnetic element formed by four identical magnetic flux conductive posts placed equidistant between two continuous magnetic flux conductive plates, each plate shaped to ensure a continuous flow of magnetic field successively through adjacent magnetic flux conductive posts. In an embodiment, a multilayer structure is formed with an electrical conductive material. Said multi-layer structure includes multiple layers forming a stack along length of the posts, and the multilayer structure is configured as primary and secondary windings of a transformer. The primary winding is embedded in the multi-layer structure and wound around the magnetic flux conductive posts in such a way that a magnetic field induced in each of the magnetic flux conductive posts has a magnetic field polarity opposite to a polarity of the respective magnetic field of the magnetic flux conductive post adjacent the respective magnetic flux conductive post.

At least two layers of the multilayer structure form the secondary winding, referred to as secondary layers. On at least one of these secondary layers are placed semiconductor devices and capacitors; the capacitors are electrically connected to the secondary windings and the semiconductor.

On each of the secondary layers, there is a continuous ring made of conductive material, which encircles from outside all the magnetic flux conductive posts. The current flows through the semiconductor devices to the continuous ring, and each semiconductor device is connected to copper pads placed between adjacent magnetic flux conductive posts. The current flowing through the semiconductor devices encircles each of the magnetic flux conductive posts. A part of the conduction path is through the rings. A power cell contains a magnetic cell and a multilayer structure formed with an electrically conductive material and the semiconductor devices and the capacitors.

Figure 40:
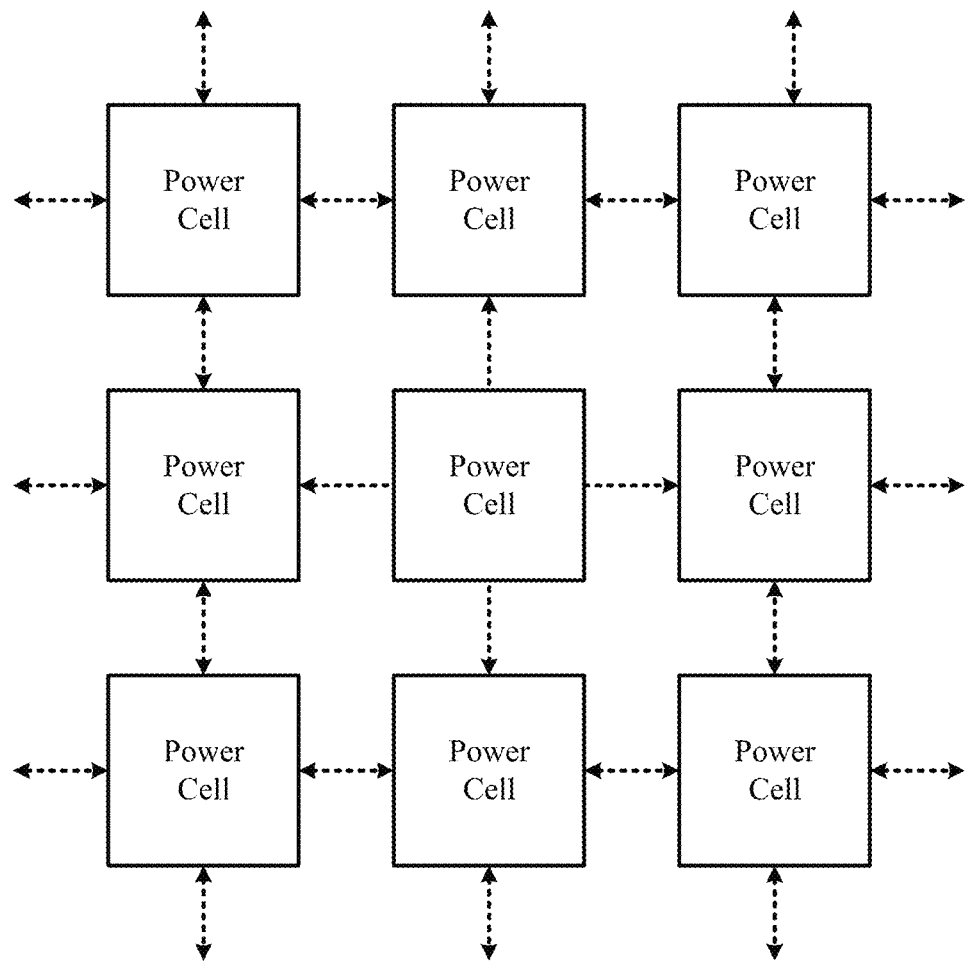
FIG. 40 depicts an implementation of the multicell embodiment.

FIG. 40 presents a power train formed by a group of power cells which are connected together. The power train can expand in both directions incorporating an increased number of cells on the same multilayer PCB. The primary winding can be connected from one cell to another in series or in parallel.

The secondary "V+" and "V−" can be shared on all the power cells in which case the secondaries are in parallel. The secondaries can be also in series in which case the output voltage is (V+−V−)*n, where n is the number of cells places in series. The input of the cells can be in series or can be in parallel. Placing the inputs of the cells in series and applied to an input voltage source, the voltage across each cell is a divided function of the number of cells in series.

Figure 41A:
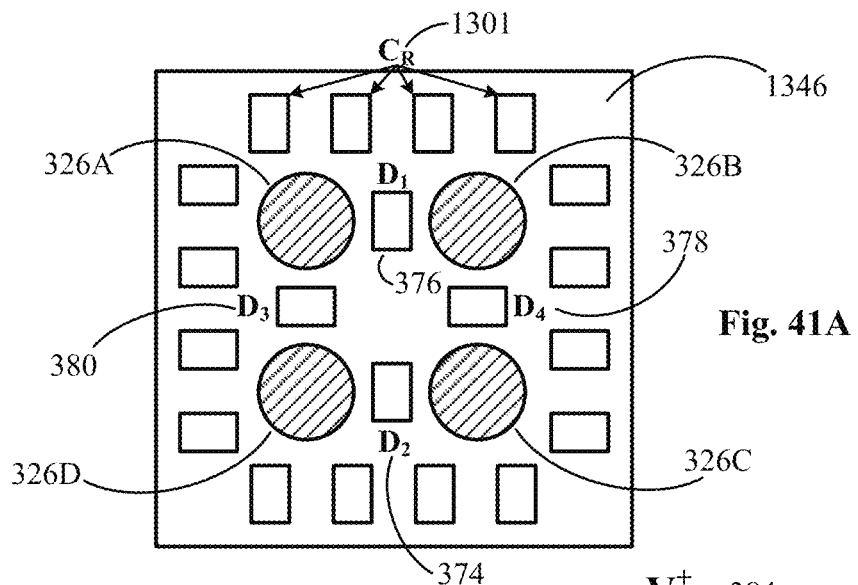
FIG. 41A depicts packaging implementation of the power cell.

FIG. 41A presents a power cell which contains the magnetic structure with four posts, (326A), (326B), (326C), and (326D) penetrating through the multilayer PCB (1346), the ceramic capacitors Cr (1301), the rectifier means D1 (376), D2 (374), D3 (380), and D4 (378).

Where the primary winding has one turn around each magnetic post and the secondary winding has one turn, the turns ratio for the power cell is 4:1. To obtain an 8:1 turns ratio, there may be two turns around each post or only one turn around each post in the secondary and two power cells in which the primary windings are in series.

Figure 41B:
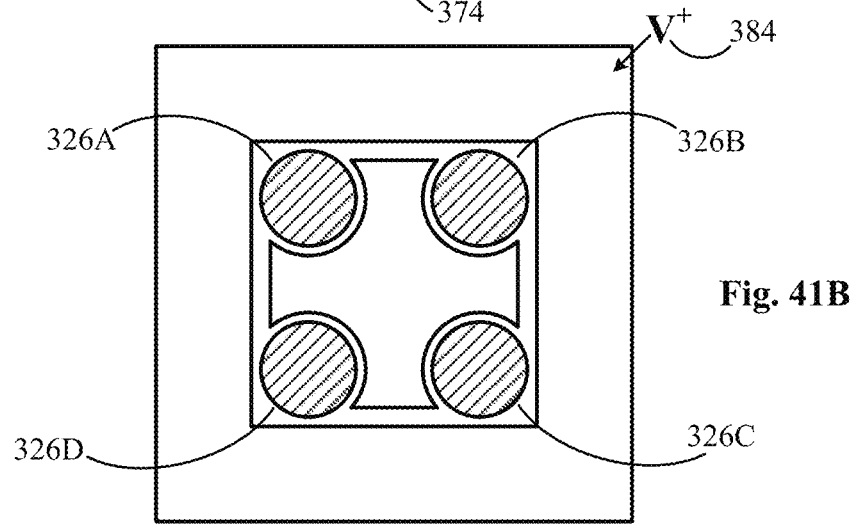
FIG. 41B depicts the secondary winding implementation of the power cell for V+.
Figure 41C:
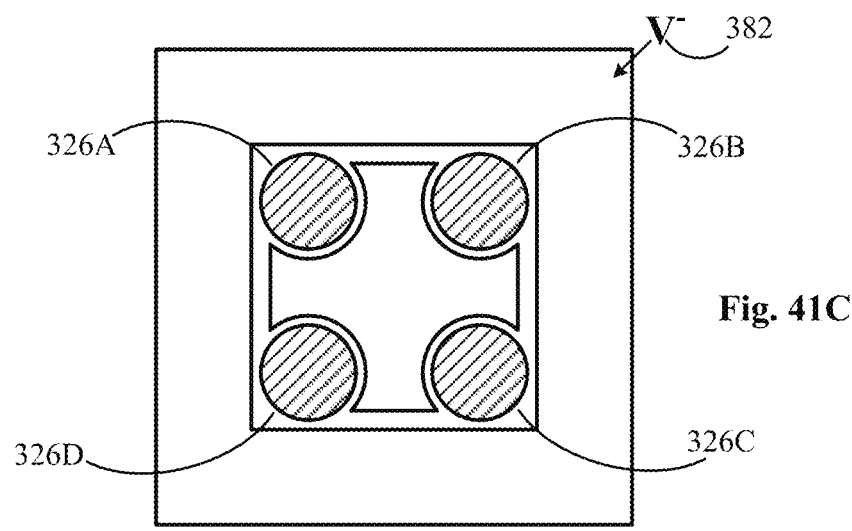
FIG. 41C depicts the secondary winding implementation of the power cell for V−.

There are at least two layers (384) and (382) which form the secondary layers having continuous rings which encircle from outside all the magnetic flux conductive posts. In secondary parallel configuration, the V+ and V− are common for all the cells. In FIGS. 41B and 41C, there are two of the secondary layers. In the implementation from FIGS. 33C and 33D, the secondary layers contain at least two layers wherein the continuous ring which encircles from outside the four magnetic posts can be connected to V+ and from the second layer to V−.

The resonant topologies are very suitable with the packaging concept of a power cell previously presented. FIG. 35A presents a half bridge resonant power cell containing two totem pole capacitors C1 and C2, the primary power switchers M1 and M2, a transformer Tr, having a primary winding LP, (1362), two secondary windings 1364, 1366. FIG. 35B presents a full bridge LLC topology, formed by four primary switchers M1, M2, M3 and M4, a resonant capacitor CR, a primary winding LP, 1362, and two secondary windings 1364 and 1366.

Figure 36:
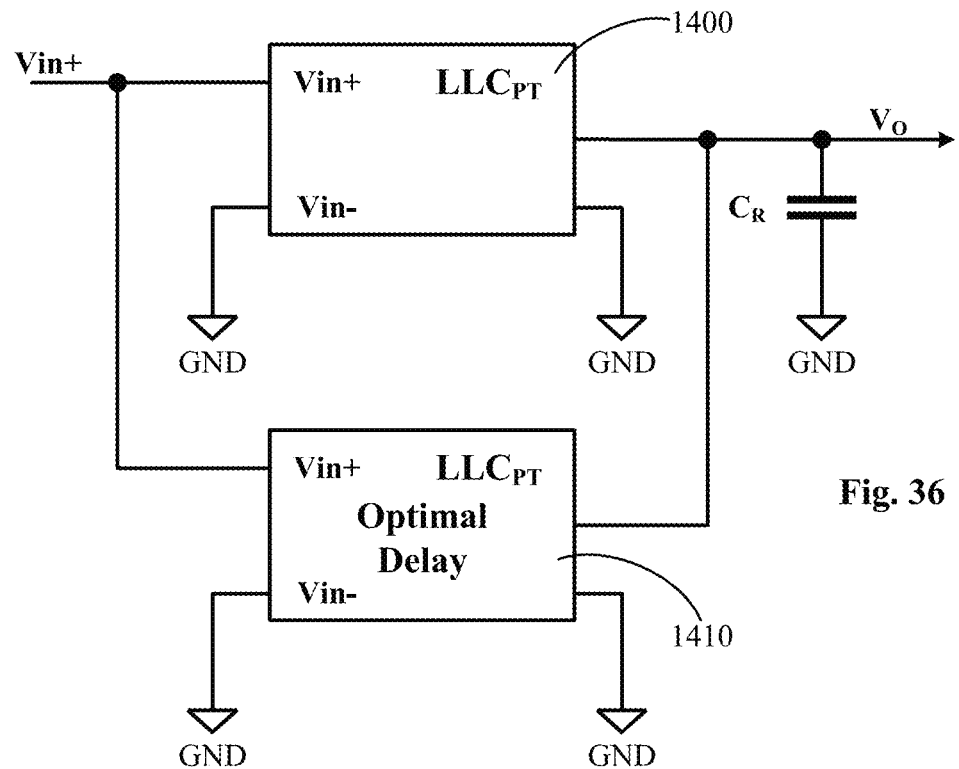
FIG. 36 depicts two LLC power trains, wherein the second power train has an optimized delay to minimize the current ripple through CR.

FIG. 36 presents two LLC power cells, 1400 and 1410. The power cell labeled "Optimal Delay' is placed in parallel with the power cell 1400.

Figure 37:
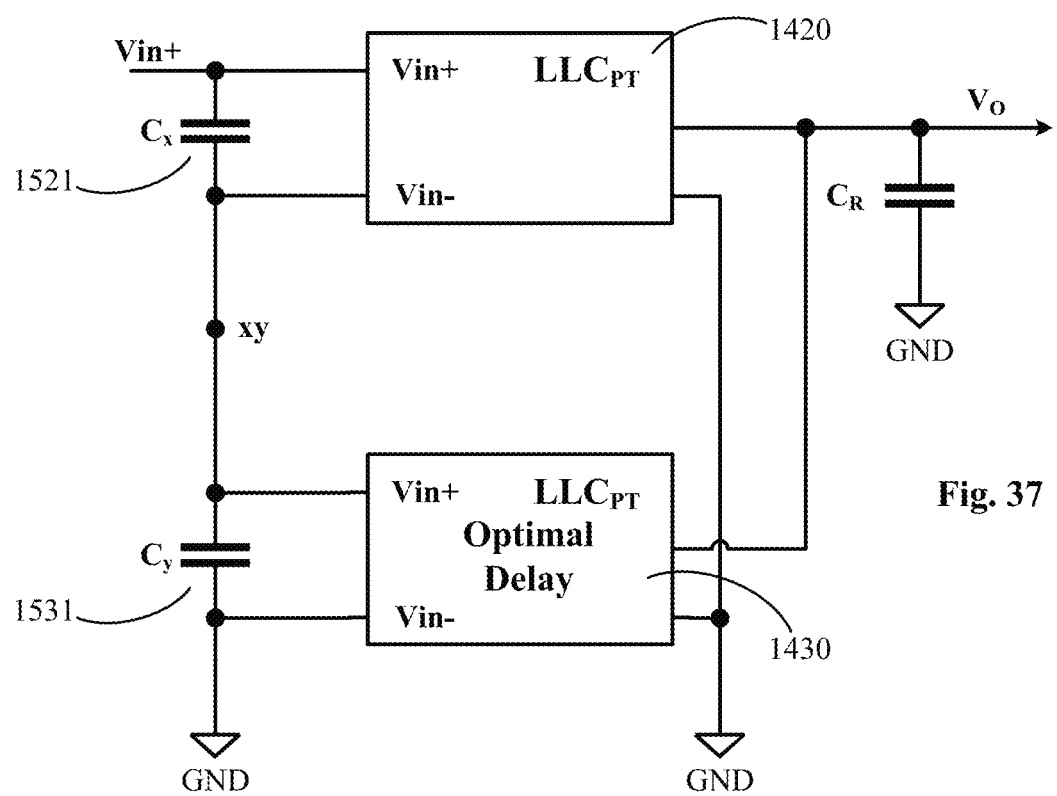
FIG. 37 depicts two LLC power trains, wherein the second power train has an optimized delay to minimize the current ripple through CR and the two power cells split the input voltage to reduce the voltage stress.

FIG. 37 presents two LLC power cells, 1420 and 1430. These two LLC power cells are connected at the input to two totem pole capacitors Cx, 1521 and Cy, 1531. The two LLC power cells 1420 and 1430 have the secondary in parallel and the power extracted through Cx and Cy is the same in such way that the switching node XY is half of the input voltage Vin+. To balance the power processed by the LLCPT 1420 with the LLCPT, optimal delay, there is a control loop which monitors the node XY and modulates the frequency in a narrow range of one of the power train such as 1420 or 1430 to ensure the power matching. In sophisticated control methods, the power processed by each module is controlled in a narrow range to ensure that the voltage in XY is half of the voltage Vin+.

Figure 38:
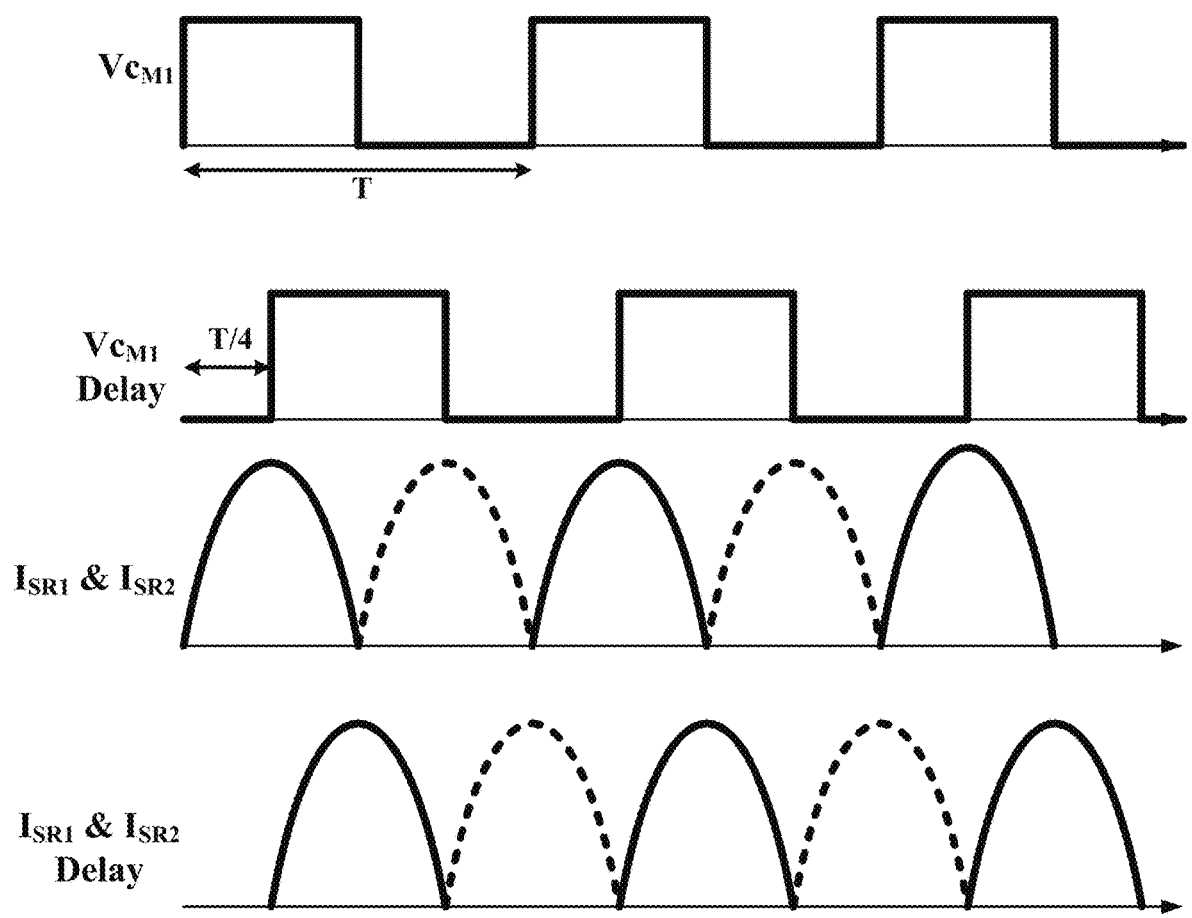
FIG. 38 depicts waveforms of the circuit from FIGS. 36 and 37.

FIG. 38 presents two control signals for LLC power cells in which the VcM1 Delay is delayed from the VCM1 by T/4, where T is the period, (T=1/Freq). FIG. 38 depicts the current through the secondary rectifiers SR1 and SR2 of the LLC power cell 1400. FIG. 38 also presents the current through SR1 and SR2 of the power train "Optimal Delay", 1430.

The solution of interleaving two LLC power train, where the second power train is delayed by T/4, minimizes the current ripple via CR of the power converter from FIG. 36, as significantly as up to ten times in some cases.

Another implementation of the minimum output ripple is depicted in FIG. 37, where two power trains 1420 and 1430 are used, and the power train 1430 has delay of T/4. This embodiment applies also to a number of N cells converter using a first power cell followed by a number of (N-1) power trains sifted in regard to the previous power train by a determined delay in such a way that the output ripple across the output wherein all said power trains while connected in parallel is minimized. For example, for two cells, the delay is T/4.

Figure 39:
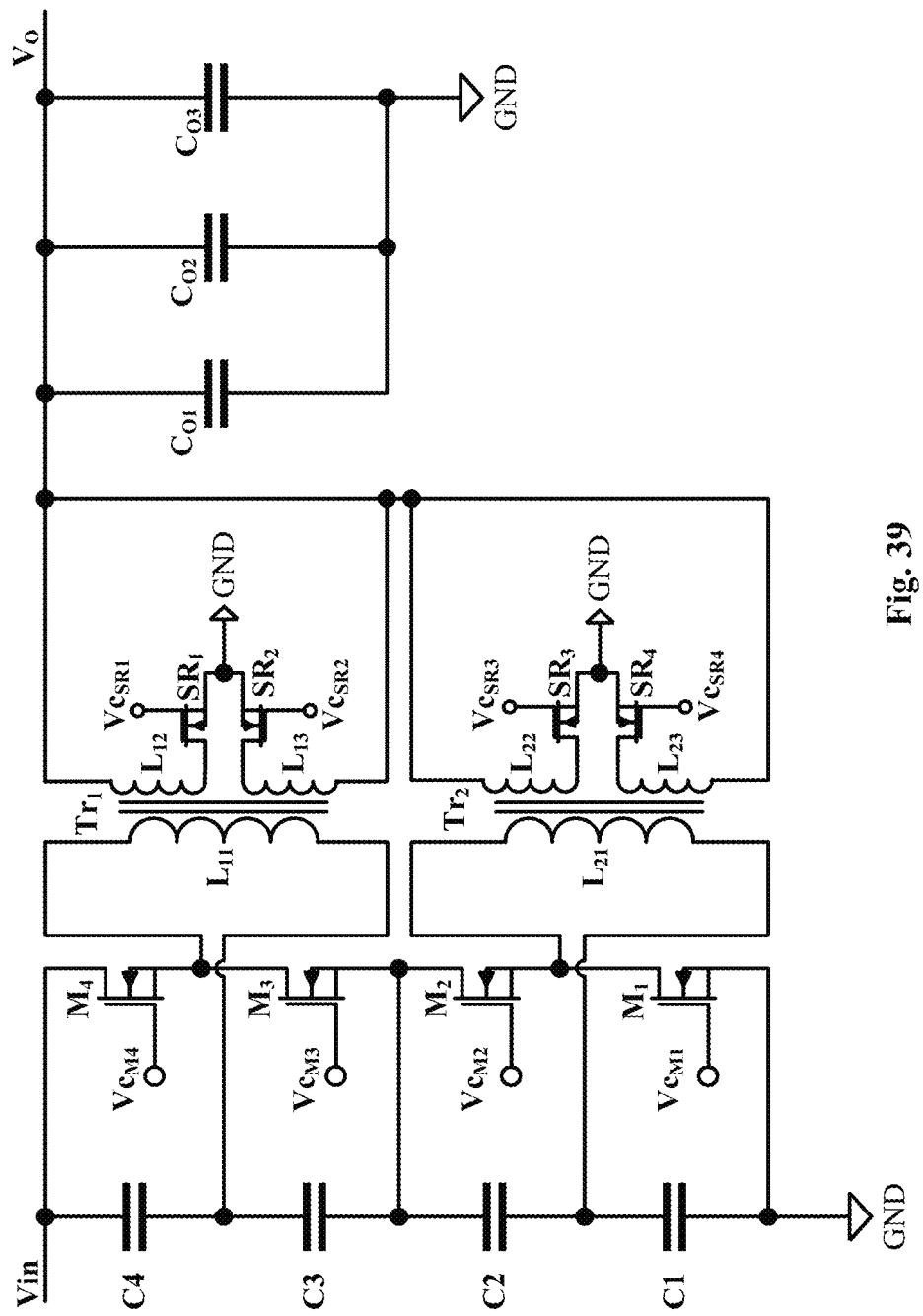
FIG. 39 depicts a detailed implementation of the circuit depicted in FIG. 37.

FIG. 39 presents two LLC power cells in totem pole configuration in the primary and secondaries in parallel after rectification. The first power cell has two power switches M4 and M3. The second LLC power cell has two switches in the primary M2 and M1. The purpose of this configuration is to reduce the voltage stress for the primary switches.

One of the embodiments of this specification creates a delay for the second power cell in relation of the first power cell or vice versa, a delay of the second power cell versus the first power cell of T/4 in such way to reduce the ripple through the capacitors Co2, Co2 and Co3. Such a configuration and operation accomplishes two goals: a reduction of the voltage across the primary switching elements, and a reduction of the output ripple through the output capacitors.

The invention claimed is:

1. A power cell comprising:
   a differential input and a differential output;
   a frequency of operation and a period T, wherein the period T is an inverse of the frequency of operation;
   a magnetic element formed by four identical magnetic flux conductive posts placed equidistant between two continuous magnetic flux conductive plates, each of the plates shaped to ensure a continuous flow of magnetic field through adjacent magnetic flux conductive posts;
   a multilayer structure formed with an electrically conductive material, said multilayer structure including multiple layers forming a stack along length of the posts, and said multilayer structure configured as primary and secondary windings of a transformer;
   the primary winding is embedded in the multilayer structure and wound around the magnetic flux conductive posts in such a way that a magnetic field induced in each of the magnetic flux conductive posts has a magnetic field polarity opposite to a polarity of the respective magnetic field of the magnetic flux conductive post adjacent the respective magnetic flux conductive post;
   at least two layers of the multilayer structure, forming the secondary winding, referred to as secondary layers;
   semiconductor devices on at least one of the secondary layers, said semiconductor devices positioned radially between the magnetic flux conductive posts;
   resonant capacitors electrically connected to the secondary windings and the semiconductor devices;
   on each of the secondary layers, a continuous conductive ring made of conductive material and which encircles from outside all the magnetic flux conductive posts;
   copper pads placed between adjacent magnetic flux conductive posts, connected to the semiconductor devices; and
   a current flowing through the semiconductor devices, the resonant capacitors, the continuous conductive ring, and the copper pads, wherein the current encircles each of the magnetic flux conductive posts, and a part of a conduction path is through the continuous conductive rings.

2. The power cell of claim 1, wherein the resonant capacitors are placed uniformly on the conductive rings encircling from outside the magnetic flux conductive posts, wherein a difference of a radius for each resonant capacitor varies by no more than 30%.

3. A power converter comprising at least two power cells, wherein each power cell comprises:
   a differential input and a differential output;
   a frequency of operation and a period T, wherein the period T is an inverse of the frequency of operation;
   a magnetic element formed by four identical magnetic flux conductive posts placed equidistant between two continuous magnetic flux conductive plates, each of the plates shaped to ensure a continuous flow of magnetic field through adjacent magnetic flux conductive posts;
   a multilayer structure formed with an electrically conductive material, said multilayer structure including multiple layers forming a stack along length of the posts, and said multilayer structure configured as primary and secondary windings of a transformer;
   the primary winding is embedded in the multilayer structure and wound around the magnetic flux conductive posts in such a way that a magnetic field induced in each of the magnetic flux conductive posts has a magnetic field polarity opposite to a polarity of the respective magnetic field of the magnetic flux conductive post adjacent the respective magnetic flux conductive post;
   at least two layers of the multilayer structure, forming the secondary winding, referred to as secondary layers;
   semiconductor devices on at least one of the secondary layers, said semiconductor devices positioned radially between the magnetic flux conductive posts;
   resonant capacitors electrically connected to the secondary windings and the semiconductor devices;
   on each of the secondary layers, a continuous conductive ring made of conductive material and which encircles from outside all the magnetic flux conductive posts;
   copper pads placed between adjacent magnetic flux conductive posts, connected to the semiconductor devices; and
   a current flowing through the semiconductor devices, the resonant capacitors, the continuous conductive ring, and the copper pads, wherein the current encircles each of the magnetic flux conductive posts, and a part of a conduction path is through the continuous conductive rings.

4. The power converter of claim 3, further comprising:
   an input voltage;
   an output voltage;
   wherein the differential inputs and differential outputs are connected together; and
   power is processed by the two power cells in parallel.

5. The power converter of claim 3, further comprising:
an input voltage;
an output voltage;
the differential inputs are connected together;
the differential outputs are connected in series; and
a total output voltage of the power converter is equal to a summation of an output voltage of the at least two power cells.

6. The power converter of claim 3, further comprising:
an input voltage;
an output voltage;
wherein the differential inputs are connected in series;
the differential outputs are connected together; and
power is processed by the two power cells in parallel.

7. The power converter of claim 3, further comprising:
an input voltage;
an output voltage;
the differential inputs are connected in series;
the differential outputs are connected in series; and
a total output voltage of the power converter is equal to a summation of an output voltage of the at least two power cells.

8. The power converter of claim 3, further comprising:
an input voltage;
an output voltage;
two totem pole input capacitors placed across the input voltage;
wherein the at least two power cells include a first power cell and a second power cell; and
the first power cell and the second power cell are placed with the differential inputs across each of the input capacitors and the differential output in parallel, wherein the output voltage of the power converter is equal to the output voltage across each differential output of the first and second power cells.

9. The power converter of claim 8, wherein the period T of the second power cell is delayed by T/4 in relation to the period T of the first power cell, such that an RMS current through the resonant capacitors of the first and second power cells is minimized.

10. The power converter of claim 3, further comprising:
an input voltage;
an output voltage;
two totem pole input capacitors placed across the input voltage;
wherein the at least two power cells include a first power cell and a second power cell; and
the first power cell and the second power cell are placed with the differential inputs across each of the input capacitors and the differential output in series, wherein the output voltage of the power converter is a summation of the output voltage of the first and second power cells.

11. The power converter of claim 10, wherein the period T of the second power cell is delayed by T/4 in relation to the period T of the first power cell, such that an RMS current through the resonant capacitors of the first and second power cells is minimized.

12. The power converter of claim 3, further comprising:
an input voltage;
an output voltage;
a chain of totem pole input capacitors placed across the input voltage;
wherein the at least two power cells comprise a chain of power cells; and
the chain of power cells are placed with the differential inputs across each of the input capacitors and the differential output in parallel, wherein the output voltage of the power converter is equal to the output voltage across each differential output of the chain of power cells.

13. The power converter of claim 12, wherein, for each power cell in the chain of power cells, the period T of the respective power cell is delayed by a fraction of the period T in relation to the immediately preceding power cell in the chain of power cells, such that an RMS current through the resonant capacitors of the chain power cells is minimized.

14. The power converter of claim 12, wherein each power cell in the chain of power cells is operated with a delay of a fractional period T relative to the immediately preceding power cell in the chain of power cells, such that an RMS current through the resonant capacitors of the chain power cells is minimized.

* * * * *